US007892449B2

(12) United States Patent
Okabe et al.

(10) Patent No.: US 7,892,449 B2
(45) Date of Patent: Feb. 22, 2011

(54) LIQUID CRYSTAL DISPLAY AND MANUFACTURING METHOD OF SAME

(75) Inventors: Masato Okabe, Tokyo (JP); Naoko Saruwatari, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 823 days.

(21) Appl. No.: 11/437,778

(22) Filed: May 18, 2006

(65) Prior Publication Data

US 2007/0026165 A1 Feb. 1, 2007

(30) Foreign Application Priority Data

| May 19, 2005 | (JP) | 2005-147241 |
| May 19, 2005 | (JP) | 2005-147244 |
| May 19, 2005 | (JP) | 2005-147246 |

(51) Int. Cl.
- C09K 19/00 (2006.01)
- C09K 19/06 (2006.01)
- C09K 19/52 (2006.01)
- G02F 1/1333 (2006.01)

(52) U.S. Cl. .............................. 252/299.01; 252/299.6; 430/20; 428/1.1; 428/1.2; 428/1.3

(58) Field of Classification Search ............ 252/299.01, 252/299.6; 428/1.1–1.3; 430/20
See application file for complete search history.

(56) References Cited

U.S. PATENT DOCUMENTS

| 5,539,546 A * | 7/1996 | Koden et al. .................. 349/86 |
| 5,617,229 A | 4/1997 | Yamamoto et al. |
| 5,812,230 A * | 9/1998 | Sakaigawa et al. .......... 349/166 |
| 7,402,332 B2 * | 7/2008 | Sawatari et al. .............. 428/1.3 |
| 2002/0085153 A1 | 7/2002 | Choi et al. |
| 2005/0233094 A1 * | 10/2005 | Sawatari et al. .............. 428/1.1 |
| 2006/0082719 A1 * | 4/2006 | Okabe et al. ................. 349/172 |
| 2008/0124493 A1 * | 5/2008 | Sawatari et al. .............. 428/1.2 |

FOREIGN PATENT DOCUMENTS

| JP | 62-182719 A | 8/1987 |
| JP | 63-309920 A | 12/1988 |
| JP | 01-105912 A | 4/1989 |
| JP | 7-239485 A | 9/1995 |
| JP | 11-084390 A | 3/1999 |
| JP | 2000-010076 A | 1/2000 |
| JP | 2002-303891 A | 10/2002 |
| JP | 2002-532755 | 10/2002 |
| JP | 2003-005223 | 1/2003 |
| JP | 2004-279549 A | 10/2004 |

OTHER PUBLICATIONS

Patel, J.S., et al. (1985) Alignment of liquid crystals which exhibit cholesteric to smectic C* phase transitions. J. Appl. Phys. 59:2355-2360.

Toshiaki, N., et al. (1999) Material characteristics of an active matrix LCD based upon chiral smectics. Journal of Liquid Crystals 26: 1599-1602.

Yuji Murakami, et al; "Intrinsic Half-V-Mode Ferroelectric Liquid Crystal Displays Fabricated Using Hybrid Alignment Exhibiting High Contrast Ratio and High Reliability without DC Voltage Application to Remove Layer Degeneracy and Their Electro-Optic Characteristics", Jpn. J. Appl. Phys., vol. 42, pp. 2759-2761; May 2003.

* cited by examiner

*Primary Examiner*—Geraldina Visconti
(74) *Attorney, Agent, or Firm*—Ladas & Parry LLP

(57) ABSTRACT

A main object of the present invention is to provide a liquid crystal display using a ferroelectric liquid crystal, with the ferroelectric liquid crystal in the mono-stability state and the excellent alignment stability. To achieve the above-mentioned object, the present invention provides a liquid crystal display comprising: a reactive liquid crystal side substrate having a first substrate, an electrode layer formed on the first substrate, a first alignment layer formed on the electrode layer, and a reactive liquid crystal layer with a reactive liquid crystal fixed and formed on the first alignment layer; and a counter substrate having a second substrate, an electrode layer formed on the second substrate, and a second alignment layer formed on the electrode layer, wherein the reactive liquid crystal layer of the reactive liquid crystal side substrate and the second alignment layer of the counter substrate are disposed to face each other such that a liquid crystal layer including a ferroelectric liquid crystal and a polymerized product of a polymerizable monomer is sandwiched between the reactive liquid crystal side substrate and the counter substrate.

48 Claims, 7 Drawing Sheets

BRIGHT

DARK

LIQUID CRYSTAL DISPLAY AND MANUFACTURING METHOD OF SAME

BACKGROUND OF THE INVENTION

1. Field of the Invention

The present invention relates to a liquid crystal display with the alignment of the ferroelectric liquid crystal controlled and a manufacturing method of the same.

2. Description of the Related Art

Since liquid crystal displays have features that it is thin and is low in power consumption and other features, the use thereof has been expanding in various articles from large-sized displays to portable information terminals and the development thereof has been actively made. Conventionally, for liquid crystal displays, a TN system, an STN multiplex driving system, an active matrix driving system in which thin film transistors (TFTs) are used in TN, and others have been developed and made practicable. However, since nematic liquid crystal is used therein, the response speed of the liquid crystal material is as small as several milliseconds to several tens of milliseconds and it cannot be said that these sufficiently cope with display of moving images.

Ferroelectric liquid crystal (FLC) exhibits a very fast response in order of microseconds, and thus FLC is a liquid crystal suitable for high-speed devices. About ferroelectric liquid crystal, there is well known a ferroelectric liquid crystal, there is well known a bistable liquid crystal which has two stable states when no voltage is applied thereto and is suggested by Clark and Lagerwall (FIG. 7). However, the liquid crystal has a problem that the liquid crystal has memory property but gray scale display cannot be attained since the switching thereof is limited to two states, namely, bright and dark states.

In recent years, attention has been paid to ferroelectric liquid crystal in which the liquid crystal layer thereof is stable in a single state (hereinafter referred to as "monostable") when no voltage is applied thereto as a liquid crystal making it possible to attain gray scale display by the matter that the director (the inclination of the molecule axis) of the liquid crystal is continuously changed by a change in applied voltage so as to analogue-modulate the light transmission thereof (NONAKA, T., LI, J., OGAWA, A., HORNUNG, B., SCHMIDT, W., WINGEN, R., and DUBAL, H., 1999, Liq. Cryst., 26, 1599, FIG. 7). As the ferroelectric liquid crystal showing the mono-stability, there are a material having the phase change of cholesteric phase (Ch)-chiral smectic C phase (SmC*) without the transition to the smectic A (SmA) phase in the temperature lowering process and a material having the phase change of Ch-SmA-SmC* so as to show the SmC* phase via the SmA phase in the temperature lowering process (FIG. 8).

Ferroelectric liquid crystal has a higher order of molecules therein than nematic liquid crystal; therefore, the former liquid crystal is not easily aligned so that defects called zigzag defects or hairpin defects are easily generated. Such defects cause a fall in contrast based on light leakage.

Moreover, the ferroelectric liquid crystal undergoing phase transition via no SmA phase in the phase sequence generates two domains different in the layer normal-line direction thereof (hereinafter referred to as "double domains") (FIG. 8). The double domains give such display that black and white are reversed when driven so as to cause a serious problem (FIG. 9). As the method for removing the double domains, known is an electric field induced technique (, which uses DC voltage during cooling process) of heating a liquid crystal cell to a temperature not lower than the Ch phase thereof, and then cooling the liquid crystal cell slowly while applying a DC voltage thereto (PATEL, J., and GOODBY, J. W., 1986, J. Appl. Phys., 59, 2355). This method has problems that the alignment of the liquid crystal is disturbed when the temperature thereof is again raised to a temperature not lower than the phase transition temperature thereof and the alignment is disturbed in regions where no electric field acts between pixel electrodes, and other problems.

On the other hand, since the ferroelectric liquid crystal having the SmA phase in the phase sequence in general has two stable states for one layer normal so as to show the bi-stability, it is difficult to obtain a mono-stability state.

In general, as the technique for subjecting liquid crystal to aligning treatment, there is known a method of using an alignment layer. The method is classified into the rubbing method and the photo aligning method. The rubbing method is a method of subjecting a substrate coated with a polyimide film to rubbing treatment to align chains of the polyimide polymer in the direction of the rubbing, thereby aligning liquid crystal molecules on the layer. The rubbing method is excellent in controllability of the alignment of nematic liquid crystal, and is generally an industrially applicable technique. On the other hand, the photo aligning method is a method of radiating light the polarization of which is controlled onto a polymer or a monomolecular to generate photo-excited reaction (decomposition, isomerization or dimerization) so as to give anisotropy to the polymer film, thereby aligning the liquid crystal molecules on the film. However, it is difficult to obtain the mono-stable ferroelectric liquid crystal alignment with either method.

Moreover, although it does not provide the mono-stability, as a method for reducing the alignment defect of the ferroelectric liquid crystal, the official gazette of the Japanese Patent Application National Publication (Laid-Open) No. 2002-532755 discloses a method for aligning the ferroelectric liquid crystal by forming a nematic liquid crystal layer by coating, aligning and fixing a nematic liquid crystal on each alignment layer after applying the photo alignment treatment to upper and lower alignment layers, and functioning the nematic liquid crystal layers as an alignment layer. However, the method is not for restraining generation of the alignment defect of the ferroelectric liquid crystal having the mono-stability.

On the other hand, in recent years, color liquid crystal displays have been actively developed. The method for realizing color display is generally classified into a color filter system and a field sequential color system. The color filter system is a system of using a white light source as a back light and attaching a micro color filter in R, G or B color to each pixel, thereby realizing color display. On the other hand, the field sequential color system is a system of switching a back light into R, G, B, R, G, B . . . with time, and opening and shutting a black and white shutter of a ferroelectric liquid crystal in synchronization therewith to mix the colors with time by afterimage effect on the retina, thereby realizing color display. This field sequential color system makes it possible to attain color display in each pixel, and does not require any color filter low in transmission. As a result, this system is useful since the system is capable of attaining bright and highly precise color display and realizing low power consumption and low costs. However, the field sequential color system is a system in which each pixel is subjected to time sharing; it is therefore necessary for the liquid crystal as the black and white shutter to have high speed response property in order to give a good moving image display property. If ferroelectric liquid crystal is used, this problem can be solved. Nonetheless, the ferroelectric liquid crystal has a problem that alignment defects are easily generated, as described above, and thus the color system using this liquid crystal has not been made practicable.

SUMMARY OF THE INVENTION

A main object of the present invention is to provide a liquid crystal display using a ferroelectric liquid crystal, with the ferroelectric liquid crystal in the mono-stability state and the excellent alignment stability. Moreover, another main object of the present invention is to provide a liquid crystal display using a ferroelectric liquid crystal, capable of obtaining the mono-domain alignment of the ferroelectric liquid crystal without formation of the alignment defects such as the double domains, and capable of maintaining the alignment even in the case the temperature is raised to the phase transition point or higher with the excellent alignment stability.

To achieve the above-mentioned object, the present invention provides a liquid crystal display comprising: a reactive liquid crystal side substrate having a first substrate, an electrode layer formed on the first substrate, a first alignment layer formed on the electrode layer, and a reactive liquid crystal layer with a reactive liquid crystal fixed, and formed on the first alignment layer; and a counter substrate having a second substrate, an electrode layer formed on the second substrate, and a second alignment layer formed on the electrode layer, wherein the reactive liquid crystal layer of the reactive liquid crystal side substrate and the second alignment layer of the counter substrate are disposed to face each other such that a liquid crystal layer including a ferroelectric liquid crystal and a polymerized product of a polymerizable monomer is sandwiched between the reactive liquid crystal side substrate and the counter substrate.

According to the present invention, since the reactive liquid crystal layer is formed by fixing a reactive liquid crystal aligned by the first alignment layer, it can function as an alignment layer for aligning the ferroelectric liquid crystal. Moreover, since the reactive liquid crystal has a structure relatively similar to that of the ferroelectric liquid crystal, the interaction with the ferroelectric liquid crystal can be reinforced so that the alignment of the ferroelectric liquid crystal can be controlled more effectively compared with the case of using only the alignment layer. Furthermore, according to the present invention, since the polymerized product of a polymerizable monomer is included in the liquid crystal layer, the sequence of the ferroelectric liquid crystal can be polymerized and stabilized so that a liquid crystal display having the excellent sequence stability of the ferroelectric liquid crystal can be obtained.

According to the present invention, a second reactive liquid crystal layer formed by fixing a reactive liquid crystal may be formed on the above-mentioned second alignment layer. In this case, it is preferable that the reactive liquid crystal for providing the above-mentioned reactive liquid crystal layer and a reactive liquid crystal for providing the above-mentioned second reactive liquid crystal layer have different compositions. As mentioned above, the reactive liquid crystal can control the alignment of the ferroelectric liquid crystal more effectively compared with the case of using only the alignment layer. Moreover, since the reactive liquid crystal for providing the above-mentioned reactive liquid crystal layer and the reactive liquid crystal for providing the above-mentioned second reactive liquid crystal have different compositions, generation of the alignment defects such as the zigzag defect, the hairpin defect and the double domains can be restrained so that the mono-stability operation mode can be realized using the ferroelectric liquid crystal.

Moreover, according to the present invention, it is preferable that the above-mentioned polymerizable monomer is an ultraviolet curing liquid crystal monomer. Since the ultraviolet curable liquid crystal monomer shows the liquid crystalline property, it can be aligned by the function of the above-mentioned reactive liquid crystal layer and the above-mentioned alignment layer. Therefore, by polymerizing the ultraviolet curable liquid crystal monomer in an aligned state, the sequence stability of the ferroelectric liquid crystal can be improved, and thus it is advantageous. Moreover, since the ultraviolet curable liquid crystal monomer generates the polymerization reaction by the ultraviolet ray irradiation, the method for manufacturing a liquid crystal display of the present invention can be simplified.

In the above-mentioned invention, it is preferable that the above-mentioned reactive liquid crystal shows a nematic phase. The nematic phase allows the alignment control relatively easily among the liquid crystal phases.

Moreover, in the present invention, it is preferable that the reactive liquid crystal has a polymerizable liquid crystal monomer. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

Furthermore, according to the present invention, it is preferable that the above-mentioned polymerizable liquid crystal monomer is a monoacrylate monomer or a diacrylate monomer. The monoacrylate monomer or the diacrylate monomer can easily be polymerized while preferably maintaining the aligned state.

Still further, according to the invention, it is preferable that the above-mentioned diacrylate monomer is a compound represented by the below-mentioned formula (1):

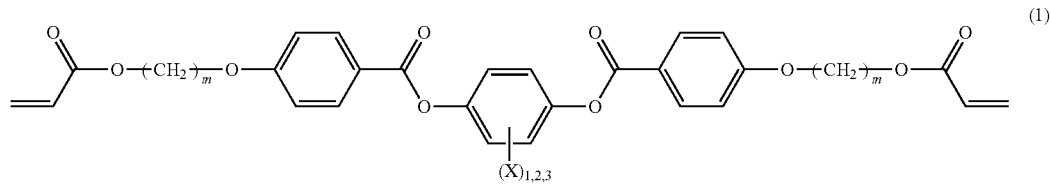

Here, X in the formula is a hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro; and m is an integer in a range of 2 to 20.

Furthermore, according to the above-mentioned invention, it is preferable that the diacrylate monomer is a compound represented by the below-mentioned formula (2):

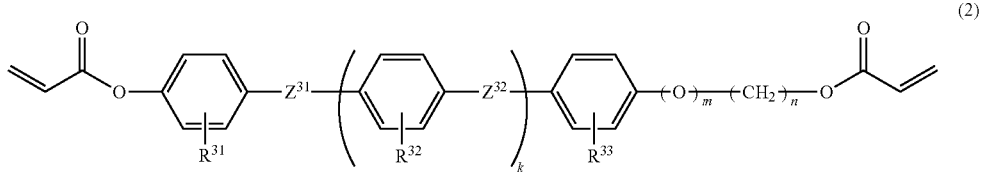

Here, $Z^{31}$ and $Z^{32}$ in the formula are each independently directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; $R^{32}$ and $R^{33}$ are each independently a hydrogen or an alkyl having 1 to 5 carbon atoms; K and m is each 0 or 1; and n is an integer in a range of 2 to 8.

Moreover, according to the present invention, it is preferable that the above-mentioned first alignment layer or the above-mentioned second alignment layer is a photo alignment layer. Since the photo alignment process at the time of forming a photo alignment layer is a non contact alignment process, it is advantageous in that the quantitative alignment process control can be enabled without generation of the static electricity or the dust, and thus it is advantageous.

Furthermore, according to the above-mentioned invention, it is preferable that a constituent material for the above-mentioned photo alignment layer is a photoreactive type material to exhibit an anisotropy to the above-mentioned photo alignment layer by generating a photoreaction, or a photo-isomerization type material including a photo-isomerization-reactive compound to exhibit the anisotropy to the above-mentioned photo alignment layer by generating a photo-isomerization reaction. By using such a material, the anisotropy can be exhibited easily to the photo alignment layer.

It is preferable that the above-mentioned ferroelectric liquid crystal shows the mono-stability. Since the one showing the mono-stability is used as the ferroelectric liquid crystal, the effect of the configuration of the present invention can be provided more remarkably.

The liquid crystal display in the present invention is preferably driven by an active matrix system using a thin film transistor. This is because the adoption of the active matrix system using TFT elements makes it possible to switch on or off target pixels surely to give high-quality display. Furthermore, it is possible to combine a TFT substrate, in which TFT elements are arranged in a matrix form on one of the substrates, with a common electrode substrate, in which a common electrode is formed in the whole of the display section of the other substrate, to form a micro color filter in which TFT elements are arranged in a matrix form between the common electrode of the common electrode substrate and the substrate thereof, and use the resultant as a color liquid crystal display.

Moreover, the liquid crystal display in the present invention is preferably displayed by a field sequential color system for the following reason: the liquid crystal display has a fast response speed and makes it possible to align the ferroelectric liquid crystal therein without forming any alignment defect; therefore, when the display is displayed by the field sequential color system, a highly precise display of full-color moving images which has a wide view angle can be realized.

The present invention further provides a method for manufacturing a liquid crystal display comprising: a reactive liquid crystal side substrate having a first substrate, an electrode layer formed on the first substrate, a first alignment layer formed on the electrode layer, and a reactive liquid crystal layer with a reactive liquid crystal fixed, and formed on the first alignment layer; and a counter substrate having a second substrate, an electrode layer formed on the second substrate, and a second alignment layer formed on the electrode layer, wherein the reactive liquid crystal layer of the reactive liquid crystal side substrate and the second alignment layer of the counter substrate are disposed to face each other such that a liquid crystal layer including a ferroelectric liquid crystal and a polymerized product of a polymerizable monomer is sandwiched between the reactive liquid crystal side substrate and the counter substrate, and the method comprising: a liquid crystal filling process of filling a liquid crystal layer forming composition including the ferroelectric liquid crystal and the polymerizable monomer between the reactive liquid crystal side substrate and the counter substrate; a liquid crystal aligning process of having the ferroelectric liquid crystal in the chiral smectic C phase state; and a polymerization process of polymerizing the polymerizable monomer with the ferroelectric liquid crystal in the chiral smectic C phase state.

According to the present invention, since the above-mentioned liquid crystal layer is formed by filling a liquid crystal layer forming composition including the ferroelectric liquid crystal and the polymerizable monomer between the reactive liquid crystal side substrate and the counter substrate and polymerizing the polymerizable monomer with the ferroelectric liquid crystal in the chiral smectic C phase state, a liquid crystal display capable of restraining the generation of the alignment defects such as the zigzag defect, the hairpin defect and the double domains so as to realize the mono-stability operation mode using the ferroelectric liquid crystal can be produced.

The present invention provides a liquid crystal display comprising: a first photo alignment treatment substrate having a first substrate, an electrode layer formed on the first substrate, and a first photo alignment layer formed on the electrode layer; and a second photo alignment treatment substrate having a second substrate, an electrode layer formed on the second substrate, and a second photo alignment layer formed on the electrode layer, wherein the first photo alignment layer and the second photo alignment layer are disposed to face each other such that a liquid crystal layer including a ferroelectric liquid crystal and a polymerized product of a polymerizable monomer is sandwiched between the first photo alignment layer and the second photo alignment layer, and the constituent materials for the first photo alignment layer and the second photo alignment layer are different compositions.

Since the liquid crystal display of the present invention uses the first photo alignment layer and the second photo alignment layer having different compositions with respect to the liquid crystal layer sandwiched therebetween, the effect of realizing the mono-stability operation mode using the ferroelectric liquid crystal can be provided. Moreover, according to the liquid crystal display of the present invention, since the polymerized product of the polymerizable monomer is included in the above-mentioned liquid crystal layer, the sequence of the ferroelectric liquid crystal can be polymerized and stabilized so that the sequence stability of the ferroelectric liquid crystal can be provided further excellently.

In the present invention, it is preferable that the above-mentioned polymerizable monomer is an ultraviolet curable liquid crystal monomer. Since the ultraviolet curable liquid crystal monomer shows the liquid crystalline property, it can be sequenced by the function of the above-mentioned photo alignment layer. Therefore, by polymerizing the ultraviolet curable liquid crystal monomer in an aligned state, the sequence stability of the ferroelectric liquid crystal can be improved, and thus it is advantageous. Moreover, since the ultraviolet curable liquid crystal monomer generates the polymerization reaction by the ultraviolet ray irradiation, the method for manufacturing a liquid crystal display of the present invention can be simplified, and thus it is advantageous.

It is preferable that the constituent materials for the first photo alignment layer and the second photo alignment layer are a photoreactive type material to exhibit the anisotropy to the first photo alignment layer and the second photo alignment layer by generating the photoreaction. By the use of a combination of such materials, the alignment controlling ability of the ferroelectric liquid crystal can further be improved.

It is preferable that the constituent material for the above-mentioned first photo alignment layer is a photoreactive type material to exhibit the anisotropy to the first photo alignment layer by generating the photoreaction; and the constituent material for the above-mentioned second photo alignment layer is a photo-isomerization type material including a photo-isomerization-reactive compound to exhibit the anisotropy to the second photo alignment layer by generating the photo-isomerization reaction. By the use of a combination of such materials, the alignment controlling ability of the ferroelectric liquid crystal can further be improved.

The photo-isomerization-reactive compound is preferably a compound which shows dichroism that different absorptivities are exhibited depending on a polarization direction thereof and further generates the photo-isomerization reaction by the light irradiation. This is because anisotropy can easily be given to the photo alignment layer by causing the isomerization of its reactive sites aligned in the polarization direction of the photo-isomerization-reactive compound having such properties.

For the photo-isomerization-reactive compound, the photo-isomerization reaction is preferably a cis-trans isomerization reaction. This is because any one of a cis-isomer and a trans-isomer increases by the light irradiation, whereby anisotropy can be given to the photo alignment layer.

The photo-isomerization-reactive compound is preferably a compound having, in a molecule thereof, an azobenzene skeleton for the following reason: any azobenzene skeleton is subjected to the cis-trans isomerization reaction by the light irradiation; therefore, when the compound having, in the molecule thereof, an azobenzene skeleton is contained as the constituent material of the photo alignment layer, anisotropy can easily be given to the photo alignment layer. This is also for the following reason: when the compound has the azobenzene skeleton, the anisotropy given to the photo alignment layer is particularly suitable for controlling the alignment of the ferroelectric liquid crystal.

It is preferable that the above-mentioned photo-isomerization-reactive compound is at least one of the monomer compounds having an azobenzene skeleton represented by a below-mentioned formula as a side chain.

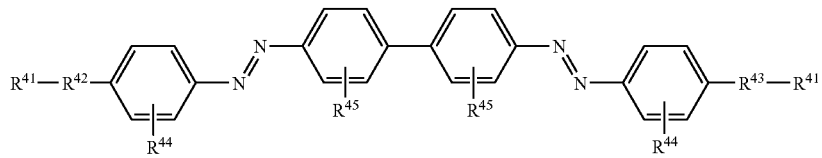

In the above formula, each $R^{41}$ independently represents a hydroxy group; $R^{42}$ represents a linking group represented by $-(A^{41}-B^{41}-A^{41})_m-(D^{41})_n-$ and $R^{43}$ represents a linking group represented by $(D^{41})_n-(A^{41}-B^{41}-A^{41})_m-$, wherein $A^{41}$ represents a bivalent hydrocarbon group, $B^{41}$ represents —O—, —COO—, —OCO—, —CONH—, —NHCO—, —NHCOO— or —OCONH—, m represents an integer of 0 to 3, $D^{41}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{44}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{45}$ independently represents a carboxy group, a sulfo group, a nitro group, an amino group or a hydroxy group provided that the carboxy group or the sulfo group may be combined with an alkali metal to form a salt.

The photo-isomerization-reactive compound is a polymerizable monomer having, as its side chain, an azobenzene skeleton. This is because anisotropy can easily be given to the photo alignment layer and the anisotropy can be made stable when the polymerizable monomer having, as its side chain, an azobenzene skeleton contained as the constituent material of the photo alignment layer.

It is preferable that the photo-isomerization-reactive compound is at least one of the polymerizable monomers having an azobenzene skeleton represented by a below-mentioned formula as a side chain.

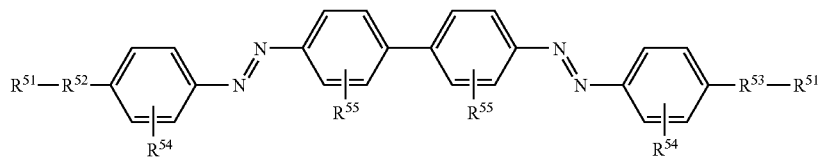

In the above formula, each $R^{51}$ independently represents a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{52}$ represents a linking group represented by $-(A^{51}\text{-}B^{51}\text{-}A^{51})_m\text{-}(D^{51})_n\text{-}$ and $R^{53}$ represents a linking group represented by $(D^{51})_n\text{-}(A^{51}\text{-}B^{51}\text{-}A^{51})_m\text{-}$ wherein $A^5$ represents a bivalent hydrocarbon group, $B^{51}$ represents —O—, —COO—, —OCO—, —CONH—, —NHCO—, —NHCOO— or —OCONH—, m represents an integer of 0 to 3, $D^{51}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{54}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{55}$ independently represents a carboxy group, a sulfo group, a nitro group, an amino group or a hydroxy group provided that the carboxy group or the sulfo group may be combined with an alkali metal to form a salt.

For the photoreactive type material, the photoreaction is preferably a photo-dimerization reaction or a photo-decomposition reaction. This is because the use of the photoreaction causes anisotropy to be easily given to the photo alignment layer.

It is preferable that the above-mentioned photoreactive type material to exhibit the anisotropy to the photo alignment layer by generating the photo-dimerization reaction includes a photo-dimerization reactive compound having a radically polymerizable functional group with the dichroism having different absorptions depending on the polarization direction. This is because anisotropy can easily be given to the photo alignment layer by radical-polymerizing its reactive sites aligned in the polarization direction.

The photo-dimerization-reactive compound is preferably a dimerization-reactive polymer containing, as its side chain, any one of cinnamic acid ester, coumalin, and quinoline. This is because anisotropy can easily be given to the photo alignment layer by the radical polymerization in the state that the double bonds in the α,β-unsaturated ketone aligned in parallel to the polarization direction function as reactive sites.

The photo-dimerization-reactive compound is preferably at least one selected from dimerization-reactive polymers represented by the following formulae:

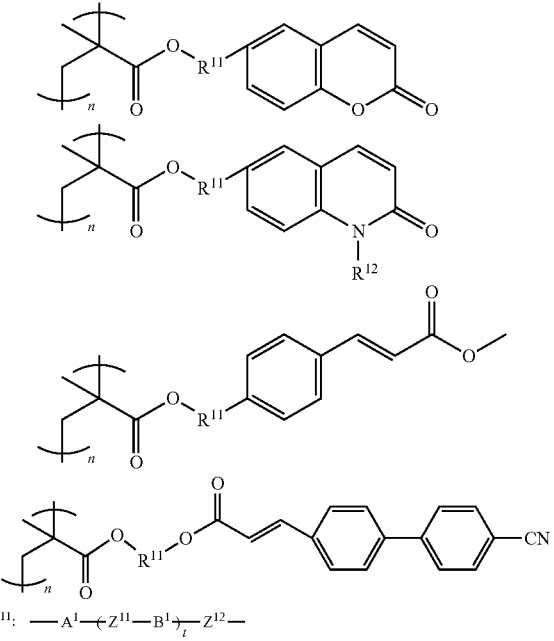

$R^{11}$: $-A^1\!-\!(\!Z^{11}\!-\!B^1\!)_t\!-\!Z^{12}\!-$ wherein $A^1$ and $B^1$: a 1,4-phenylene, a covalent single bond, a pyridine-2,5-diyl, a pyrimidine-2,5-diyl, a 1,4-cyclohexylene or a 1,3-dioxane-2,5-diyl;

$Z^{11}$ and $Z^{12}$: —$CH_2$—$CH_2$—, —COO—, —OOC—, or a covalent single bond;

t: an integer of 0 to 4;

$R^{12}$: a lower alkyl; and n: an integer of 4 to 30,000.

This is because the dimerization-reactive polymer is small in energy necessary for the reaction thereof and functional groups suitable for the moieties $R^{11}$ and $R^{12}$ can be selected.

It is preferable that the above-mentioned ferroelectric liquid crystal shows the mono-stability. Since the one showing the mono-stability is used as the ferroelectric liquid crystal, the effect of the configuration of the present invention can be provided more remarkably.

The liquid crystal display is preferably driven by an active matrix system using the thin film transistor. This is because the adoption of the active matrix system using TFT element makes it possible to switch on or off target pixels surely to give high-quality display. Furthermore, it is possible to combine a TFT substrate, in which TFT elements are arranged in a matrix form on one of the substrates, with a common electrode substrate, in which a common electrode is formed in the whole of the display section of the other substrate, to form a micro color filter in which TFT elements are arranged in a matrix form between the common electrode of the common electrode substrate and the substrate thereof, and use the resultant as color liquid crystal display.

Moreover, it is preferable that the above-mentioned liquid crystal display is displayed by the field sequential color system. Since the above-mentioned liquid crystal display aligns the ferroelectric liquid crystal without generating the alignment defect with a fast response speed and furthermore, it shows the mono-stability operation mode, the gray scale display can be enabled. Therefore, by displaying the same by the field sequential color system, a bright and highly precise color moving image display with a wide view angle can be realized at a low power consumption and a low cost.

The present invention further provides a method for manufacturing a liquid crystal display comprising: a first photo alignment treatment substrate having a first substrate, an electrode layer formed on the first substrate, and a first photo alignment layer formed on the electrode layer; and a second photo alignment treatment substrate having a second substrate, an electrode layer formed on the second substrate, and a second photo alignment layer formed on the electrode layer, wherein the first photo alignment layer and the second photo alignment layer are disposed to face each other such that a liquid crystal layer including a ferroelectric liquid crystal and a polymerized product of a polymerizable monomer is sandwiched between the first photo alignment layer and the second photo alignment layer, and the method comprising: a liquid crystal filling process of filling a liquid crystal layer forming composition including the ferroelectric liquid crystal and the polymerizable monomer between the first photo alignment treatment substrate and the second photo alignment treatment substrate; a liquid crystal aligning process of having the ferroelectric liquid crystal in the chiral smectic C phase state; and a polymerization process of polymerizing the polymerizable monomer with the ferroelectric liquid crystal in the chiral smectic C phase state.

According to the present invention, since the above-mentioned liquid crystal layer is formed by filling a liquid crystal layer forming composition including the ferroelectric liquid crystal and the polymerizable monomer between the first alignment treatment substrate and the second alignment treatment substrate and polymerizing the polymerizable monomer with the ferroelectric liquid crystal in the chiral smectic C phase state, a liquid crystal display capable of restraining the generation of the alignment defects such as the zigzag defect, the hairpin defect and the double domains so as to realize the mono-stability operation mode using the ferroelectric liquid crystal can be produced.

The present invention provides a liquid crystal display comprising a liquid crystal layer including a ferroelectric liquid crystal and a polymerized product of a polymerizable monomer sandwiched between two substrates, with an electrode and a photo alignment layer formed successively each on the counter surfaces of the substrates, wherein the respective constituent material for each the photo alignment layer is a photo-isomerization type material including a photo-isomerization-reactive compound to exhibit an anisotropy to the photo alignment layer by generating the photo-isomerization reaction, and the constituent materials for the photo alignment layers are different compositions with respect to the liquid crystal layer sandwiched therebetween.

According to the present invention, since the photo alignment layer is provided each on the counter surfaces of the two substrates sandwiching the liquid crystal layer and the respective constituent material for each of the photo alignment layers is a photo-isomerization type material including a photo-isomerization-reactive compound to exhibit the anisotropy to the above-mentioned photo alignment layers, and the constituent materials for the photo alignment layers have different compositions with respect to the above-mentioned liquid crystal layer, the effect of aligning the ferroelectric liquid crystal without generating the alignment defects such as double domains can be achieved. Moreover, since the alignment process is carried out using a photo alignment layer without depending on the electric field induced technique, the alignment can be maintained even in the case the temperature is raised to the phase transition point or higher so as to restrain the generation of the alignment defect, such as the double domains, and thus it is advantageous. Furthermore, since the liquid crystal display of the present invention includes a polymerized product of the polymerizable monomer in the above-mentioned liquid crystal layer, the sequence of the ferroelectric liquid crystal can be polymerized and stabilized so that the sequence stability of the ferroelectric liquid crystal can be provided further excellently.

In the present invention, the photo-isomerization-reactive compound is preferably a compound which shows dichroism that different absorptivities are exhibited depending on a polarization direction thereof and further generates the photo-isomerization reaction by the light irradiation. This is because anisotropy can easily be given to the photo alignment layer by causing the isomerization of its reactive sites aligned in the polarization direction of the photo-isomerization-reactive compound having such properties.

In the present invention, the photo-isomerization reaction is preferably a cis-trans isomerization reaction. This is because any one of a cis-isomer and a trans-isomer increases by the light irradiation, whereby anisotropy can be given to the photo alignment layer.

In the present invention, the photo-isomerization-reactive compound is preferably a compound having, in a molecule thereof, an azobenzene skeleton for the following reason: any azobenzene skeleton is subjected to the cis-trans isomerization reaction by the light irradiation; therefore, when the compound having, in the molecule thereof, an azobenzene skeleton is contained as the constituent material of the photo alignment layer, anisotropy can easily be given to the photo alignment layer. This is also for the following reason: when the compound has the azobenzene skeleton, the anisotropy given to the photo alignment layer is particularly suitable for controlling the alignment of the ferroelectric liquid crystal.

In the present invention, the photo-isomerization-reactive compound is preferably a polymerizable monomer having, as its side chain, an azobenzene skeleton. This is because anisotropy can easily be given to the photo alignment layer and the anisotropy can be made stable when the polymerizable monomer having, as its side chain, an azobenzene skeleton contained as the constituent material of the photo alignment layer.

In the present invention, it is preferable that the polymerizable monomer comprising the polymer product of the polymerizable monomer is an ultraviolet curable liquid crystal monomer. Since the ultraviolet curable liquid crystal monomer shows the liquid crystalline property, it can be sequenced by the function of the above-mentioned photo alignment layer. Therefore, by polymerizing the ultraviolet curable liquid crystal monomer in an aligned state, the sequence stability of the ferroelectric liquid crystal can be improved, and thus it is advantageous. Moreover, since the ultraviolet curable liquid crystal monomer generates the polymerization reaction by the ultraviolet ray irradiation, the method for manufacturing a liquid crystal display of the present invention can be simplified, and thus it is advantageous.

In the present invention, it is preferable that the above-mentioned ferroelectric liquid crystal shows the mono-stability. Since the one showing the mono-stability is used as the ferroelectric liquid crystal, the effect of the configuration of the present invention can be provided more remarkably.

In the present invention, it is preferable that the above-mentioned ferroelectric liquid crystal does not have a smectic A phase in the phase sequence. As mentioned above, although a ferroelectric liquid crystal not having a smectic A phase in the phase sequence can easily generate an alignment defect such as the double domains, since the compositions of the upper and lower photo alignment layers are different from each other with respect to the liquid crystal layer sandwiched therebetween, generation of the alignment defect such as the double domains can be restrained so that the effect of the configuration of the present invention can be provided more remarkably.

The liquid crystal display of the invention is preferably driven by an active matrix system using a thin film transistor (TFT). This is because the adoption of the active matrix system using TFT element makes it possible to switch on or off target pixels surely to give high-quality display. Furthermore, it is possible to combine a TFT substrate, in which TFT elements are arranged in a matrix form on one of the substrates, with a common electrode substrate, in which a common electrode is formed in the whole of the display section of the other substrate, to form a micro color filter in which TFT elements are arranged in a matrix form between the common electrode of the common electrode substrate and the substrate thereof, and use the resultant as color liquid crystal display.

It is preferable that the liquid crystal display of the invention is displayed by the field sequential color system. Since the above-mentioned liquid crystal display aligns the ferroelectric liquid crystal without generating the alignment defect with a fast response speed, a bright and highly precise color moving image display with a wide view angle can be realized at a low power consumption and a low cost.

The present invention provides a method for manufacturing a liquid crystal display comprising a liquid crystal layer including a ferroelectric liquid crystal and a polymerized product of a polymerizable monomer sandwiched between two substrates, with an electrode and a photo alignment layer formed successively each on the counter surfaces of the substrates, wherein the respective constituent material for each the photo alignment layer is a photo-isomerization type material including a photo-isomerization-reactive compound to exhibit an anisotropy to the photo alignment layer by generating the photo-isomerization reaction, and the constituent materials for the photo alignment layers are different compositions with respect to the liquid crystal layer sandwiched therebetween, and the method comprising: a liquid crystal filling process of filling a liquid crystal layer forming composition including the ferroelectric liquid crystal and the polymerizable monomer between the substrates; a liquid crystal aligning process of having the ferroelectric liquid crystal in the chiral smectic C phase state; and a polymerization process of polymerizing the polymerizable monomer with the ferroelectric liquid crystal in the chiral smectic C phase state.

According to the present invention, since the above-mentioned liquid crystal layer is formed by filling a liquid crystal layer forming composition including the ferroelectric liquid crystal and the polymerizable monomer between the substrates and polymerizing the polymerizable monomer with the ferroelectric liquid crystal in the chiral smectic C phase state, a liquid crystal display capable of restraining the generation of the alignment defects such as the zigzag defect, the hairpin defect and the double domains so as to realize the mono-stability operation mode using the ferroelectric liquid crystal can be produced.

The liquid crystal display of the present invention achieves the effect of realizing the mono-stability operation mode using a ferroelectric liquid crystal.

Moreover, the liquid crystal display of the present invention achieves the effect of obtaining a liquid crystal display having the excellent alignment stability capable of aligning a ferroelectric liquid crystal without formation of the alignment defect such as the zigzag defect, the hairpin defect and the double domains without alignment disturbance even in the case of raising the temperature to the phase transition point or higher.

DESCRIPTION OF THE PREFERRED EMBODIMENT

The present invention relates to a liquid crystal display and a method for manufacturing the liquid crystal display. The liquid crystal display and the method for manufacturing the liquid crystal display of the present invention can be classified into three embodiments of the first to third embodiments according to the configuration.

Hereinafter, each embodiment of the liquid crystal display and the method for manufacturing the liquid crystal display of the present invention will be explained in detail.

A-1. Liquid Crystal Display of the First Embodiment

First, the liquid crystal display of the first embodiment of the present invention will be explained. The liquid crystal display comprising: a reactive liquid crystal side substrate having a first substrate, an electrode layer formed on the first substrate, a first alignment layer formed on the electrode layer, and a reactive liquid crystal layer with a reactive liquid crystal fixed and formed on the first alignment layer; and a counter substrate having a second substrate, an electrode layer formed on the second substrate, and a second alignment layer formed on the electrode layer, wherein the reactive liquid crystal layer of the reactive liquid crystal side substrate and the second alignment layer of the counter substrate are disposed to face each other such that a liquid crystal layer including a ferroelectric liquid crystal and a polymerized product of a polymerizable monomer is sandwiched between the reactive liquid crystal side substrate and the counter substrate.

Figure 1:
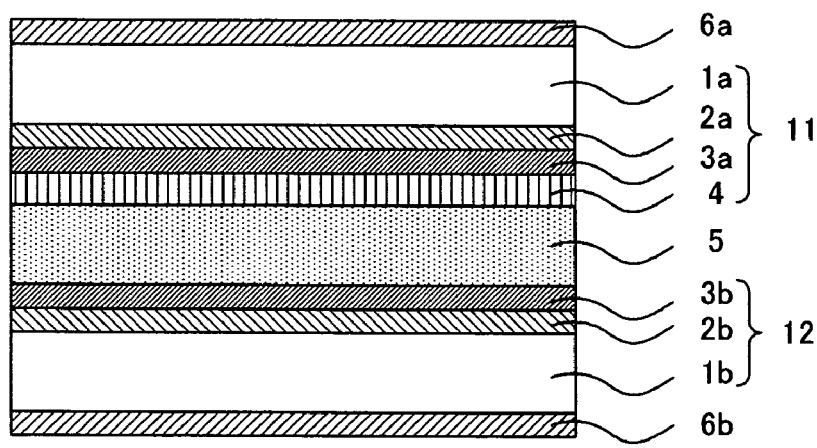
FIG. 1 is a schematic cross sectional view illustrating one example of a liquid crystal display of a first embodiment of the present invention.

The liquid crystal display of this embodiment will be explained with reference to the drawings. FIG. 1 is a schematic cross sectional view illustrating one example of the liquid crystal display of this embodiment. As shown in FIG. 1, the liquid crystal display of this embodiment comprises a reactive liquid crystal side substrate 11 having a first substrate 1a, an electrode layer 2a formed on the first substrate 1a, a first alignment layer 3a formed on the electrode layer 2a, and a reactive liquid crystal layer 4 formed on the first alignment layer 3a, and a counter substrate 12 having a second substrate 1b, an electrode layer 2b formed on the second substrate 1b, and a second alignment layer 3b formed on the electrode layer 2b. Furthermore, a liquid crystal layer 5 including a ferroelectric liquid crystal and a polymerized product of a polymerizable monomer is sandwiched between the reactive liquid crystal layer 4 of the reactive liquid crystal side substrate 11 and the second alignment layer 3b of the counter substrate 12.

Moreover, since the reactive liquid crystal layer 4 is formed on the first alignment layer 3a, the reactive liquid crystal providing the reactive liquid crystal layer 4 is aligned by the above-mentioned first alignment layer 3a so that the reactive liquid crystal layer 4 is formed by for example polymerizing the reactive liquid crystal by an ultraviolet ray for fixing the alignment state of the reactive liquid crystal. Accordingly, since the reactive liquid crystal layer 4 has the alignment state of the reactive liquid crystal fixed, it has the function as an alignment layer for aligning the ferroelectric liquid crystal included in the liquid crystal layer 5. Furthermore, since the reactive liquid crystal providing the reactive liquid crystal layer has a structure relatively similar to that of the ferroelectric liquid crystal, the interaction with respect to the ferroelectric liquid crystal is reinforced, and thus the alignment can be controlled more effectively compared to the case of using only an alignment layer.

Moreover, in the liquid crystal display of this embodiment, for example as shown in FIG. 1, polarizing plates 6a and 6b may be provided outside the first substrate 1a and the second substrate 1b, and thereby the incident light beam becomes a linear polarized light so that only a light beam polarized in the liquid crystal molecule alignment direction can be transmitted. The polarizing plates 6a and 6b are disposed with the polarizing directions twisted by 90°. Thereby, the bright state and the dark state can be produced by controlling the optical axis direction of the liquid crystal molecules in the voltage non applied state and the applied state, and the size of the birefringence, and using the ferroelectric liquid crystal molecules as a black and white shutter. For example, in the voltage non applied state, by disposing the polarizing plate 6a aligned with the liquid crystal molecule alignment, a light beam transmitted the polarizing plate 6a cannot have the polarizing direction rotated by 90° so as to be blocked by the polarizing plate 6b for providing the dark state. On the other hand, in the voltage applied state, by disposing the alignment of the liquid crystal molecules with an angle θ (preferably θ=45°) with respect to the polarizing plates 6a and 6b, a linear polarized light becomes a circular polarized light for transmitting the polarizing plate 6b for providing the bright state. Accordingly, since the liquid crystal display of this embodiment utilizes the ferroelectric liquid crystal as a black and white shutter, the response speed can be made faster, and thus it is advantageous.

Figure 2:
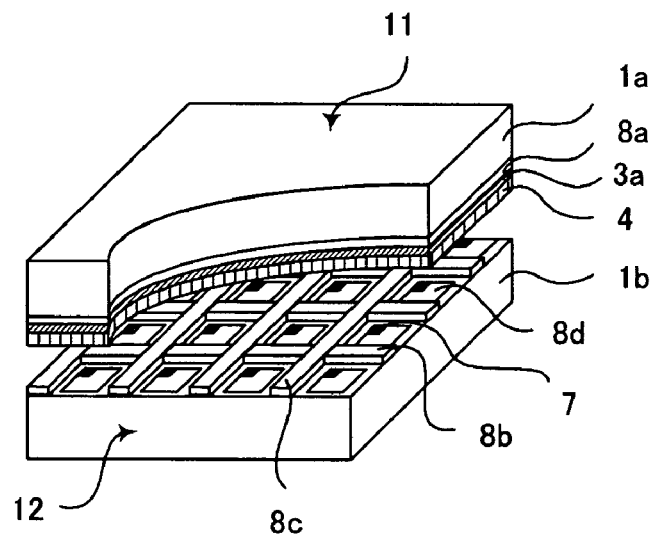
FIG. 2 is a schematic perspective view illustrating one example of a liquid crystal display of a first embodiment of the present invention.

Furthermore, in the liquid crystal display of the present invention, for example as shown in FIG. 2, it is preferable that the counter substrate 12 is provided as a TFT substrate with thin film transistors (TFT elements) 7 disposed as a matrix, and the reactive liquid crystal side substrate 11 is provided as a common electrode substrate with a common electrode 8a formed in the entire region so that the two substrates are provided as a combination. Such liquid crystal display of an active matrix system using TFT will be described hereinafter.

In FIG. 2, in the reactive liquid crystal side substrate 11, its electrode layer is the common electrode 8a, and thus the substrate is a common electrode substrate. On the other hand, in the counter substrate 12, its electrode layer is composed of the x electrodes 8b, the y electrodes 8c and the pixel electrodes 8d, and thus the substrate is a TFT substrate. In this liquid crystal display, the x electrodes 8b and the y electrodes 8c are arranged lengthwise and crosswise, respectively. When signals are added to these electrodes, the TFT elements 7 are worked so as to drive the ferroelectric liquid crystal. Regions where the x electrodes 8b and the y electrodes 8c cross are insulated with an insulator layer, which is not illustrated. Signals to the x electrodes 8b and signals to the y electrodes 8c can be independently operated. Any region surrounded by the x electrodes 8b and the y electrodes 8c is a pixel, which is a minimum unit for driving the liquid crystal display of the invention. At least one out of the TFT elements 7 and at least one out of the pixel electrodes 8d are fitted to each of the pixels. In the liquid crystal display of the invention, the TFT elements 7 of the respective pixels can be worked by applying signal voltages successively to the x electrodes 8b and the y electrodes 8c. In FIG. 2, the liquid crystal layer and the second alignment layer are omitted.

Furthermore, the liquid crystal display of this embodiment may have a micro color filter with the TFT elements disposed in a matrix between the above-mentioned common electrode 8a and the first substrate 1a so as to be used as a color display.

Although the side with the common electrode 8a formed is the reactive liquid crystal side substrate 11 and the side with the TFT elements 7 and the pixel electrodes 8d, or the like formed is the counter substrate 12 in FIG. 2, the liquid crystal display of the present invention is not limited to such a configuration. The side with the common electrode formed may be the counter substrate and the side with the TFT elements, the pixel electrodes, or the like formed may be the reactive liquid crystal side substrate.

The constituent members of such a liquid crystal display of the present embodiment will each be explained in detail hereinafter.

1. Reactive Liquid Crystal Side Substrate

First, the reactive liquid crystal side substrate will be explained. The reactive liquid crystal side substrate in the present embodiment comprises a first substrate, an electrode layer formed on the first substrate, a first alignment layer formed on the electrode layer, and a reactive liquid crystal layer formed on the first alignment layer. Hereinafter, each configuration of such a reactive liquid crystal side substrate will be explained.

(i) Reactive Liquid Crystal Layer

The reactive liquid crystal layer used in the present embodiment is formed on the first alignment layer, with the reactive liquid crystal fixed. The reactive liquid crystal is aligned by the first alignment layer, and for example, the reactive liquid crystal layer can be formed by polymerizing the reactive liquid crystal by the ultraviolet ray irradiation, and fixing the aligned state. Accordingly, since the reactive liquid crystal layer is provided by fixing the aligned state of the reactive liquid crystal in the present embodiment, it can function as the alignment layer for aligning the ferroelectric liquid crystal. Moreover, since the reactive liquid crystal layer is fixed, it has an advantage that it is not affected by temperature or the like. Furthermore, since the reactive liquid crystal has a structure relatively similar to that of the ferroelectric liquid crystal, the interaction with the ferroelectric liquid crystal is reinforced so that the ferroelectric liquid crystal alignment can be controlled more effectively than the case of using only the alignment layer.

As such reactive liquid crystal, it is preferable that the reactive liquid crystal shows a nematic phase. The nematic phase can allows the alignment control relatively easily among the liquid crystal phases.

Moreover, it is preferable that the reactive liquid crystal has a polymerizable liquid crystal material. Accordingly, the aligned state of the reactive liquid crystal can be fixed. As the polymerizable liquid crystal material, any of a polymerizable liquid crystal monomer, a polymerizable liquid crystal oligomer and a polymerizable liquid crystal polymer can be used, however, in the present embodiment, the polymerizable liquid crystal monomer can be used preferably. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

The above-mentioned polymerizable liquid crystal monomer is not particularly limited as long as it is a liquid crystal monomer having a polymerizable functional group. For example, a monoacrylate monomer, a diacrylate monomer, or the like can be presented. Moreover, these polymerizable liquid crystal monomers may be used alone or as a mixture of two or more kinds.

As the monoacrylate monomer, for example, the compounds represented by the below-mentioned formula can be presented:

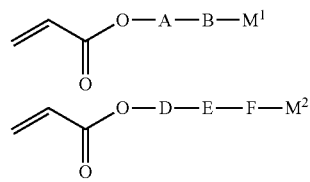

In the above-mentioned formula, A, B, D, E and F are a benzene, a cyclohexane or a pyrimidine, which may have a substituent group such as a halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a spacer such as an alkylene group having 3 to 6 carbon atoms.

Moreover, as the diacrylate monomer, for example, the compounds represented by the below-mentioned formula can be presented:

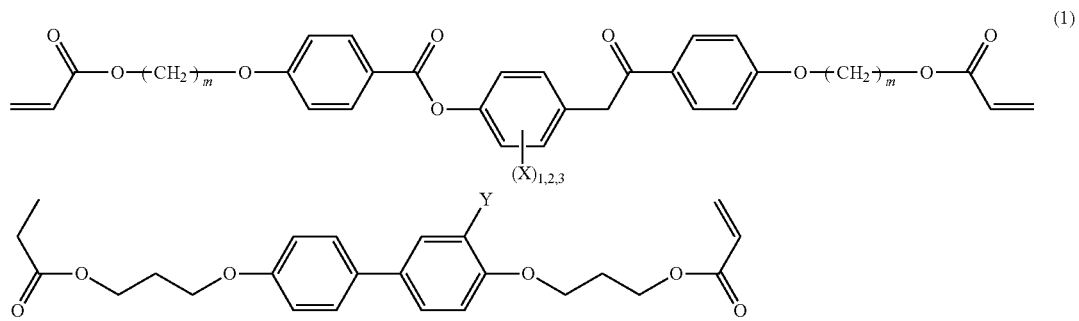

(1)

(2)

In the above-mentioned formula, X and Y each is a hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro; and m is an integer in a range of 2 to 20.

Furthermore, as the diacrylate monomer, for example, the compounds represented by the below-mentioned formula can also be presented:

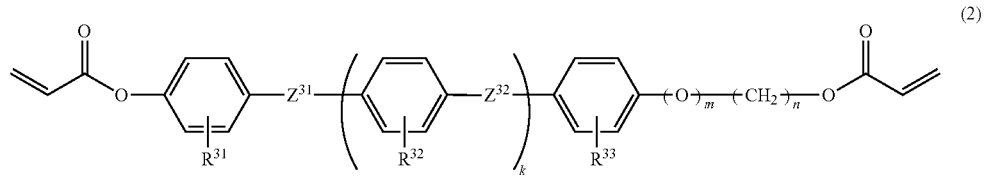

Here, $Z^{31}$ and $Z^{32}$ in the above formula are each independently directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; R$^{31}$, R$^{32}$ and R$^{33}$ are each independently a hydrogen or an alkyl having 1 to 5 carbon atoms; k and m is each 0 or 1; and n is an integer in a range of 2 to 8.

In the present embodiment, in particular, the compounds represented by the above-mentioned formulae (1), (2) or the below-mentioned (3) can be used preferably. Moreover, in the case of the compounds represented by the formula (1), X is preferably an alkyloxy carbonyl having 1 to 20 carbon atoms, a methyl or a chlorine. In particular, it is preferably an alkyloxy carbonyl having 1 to 20 carbon atoms, and particularly preferably CH$_3$(CH$_2$)$_4$OCO. Further, in the below-mentioned formula (3), Z$^{21}$ and Z$^{22}$ are each independently directly bonded —COO—, —OCO—, —O—, —CH$_2$CH$_2$—, —CH═CH—, —C≡C—, —OCH$_2$—, —CH$_2$O—, —CH$_2$CH$_2$COO— or —OCOCH$_2$CH$_2$—; m is 0 or 1; and n is an integer in a range of 2 to 8.

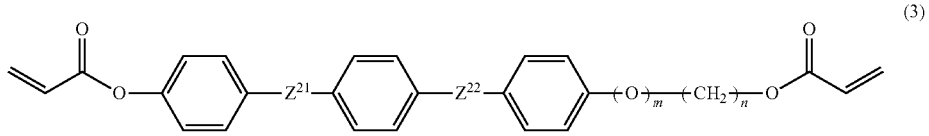

(3)

Moreover, as the specific examples of the compounds represented by the above-mentioned formula (2), ADEKA CHIRACOL PLC-7209 (manufactured by ASAHI DENKA CO., LTD.), ADEKA CHIRACOL PCL-7183 (manufactured by ASAHI DENKA Co., Ltd.), or the like can be presented.

The polymerizable liquid crystal monomer used in the present embodiment is preferably a diacrylate monomer among the above-mentioned examples. According to the diacrylate monomer, polymerization can be carried out easily while preferably maintaining the aligned state.

The above-mentioned polymerizable liquid crystal monomer may not show the nematic phase by itself. In the present embodiment, these polymerizable liquid crystal monomers may be used as a mixture of two or more kinds as mentioned above so that a composition mixture thereof, that is, a reactive liquid crystal may show the nematic phase.

Furthermore, according to the present embodiment, as needed, a photo polymerization initiating agent or a polymerization inhibiting agent may be added to the above-mentioned reactive liquid crystal. For example, at the time of polymerizing a polymerizable liquid crystal material by the electron beam irradiation, the photo polymerization initiating agent may not be needed, however, in the case of the polymerization used commonly by for example, the ultraviolet ray irradiation, in general a photo polymerization initiating agent is used for the promoting the polymerization.

As the photo polymerization initiating agent to be used in the present embodiment, a benzyl (it is also referred to as a bibenzoyl), a benzoin isobutyl ether, a benzoin isopropyl ether, a benzophenone, a benzoyl benzoic acid, a methyl benzoyl benzoate, a 4-benzoyl-4'-methyl diphenyl sulfide, a benzyl methyl ketal, a dimethyl amino methyl benzoate, a 2-n-butoxy ethyl-4-dimethyl amino benzoate, a p-dimethyl amino isoamyl benzoate, a 3,3'-dimethyl-4-methoxy benzophenone, a methylobenzoyl formate, a 2-methyl-1-(4-(methyl thio)phenyl)-2-morpholino propane-1-on, a 2-benzyl-2-dimethyl amino-1-(4-morpholino phenyl)-butane-1-on, a 1-(4-dodecyl phenyl)-2-hydroxy-2-methyl propane-1-on, a 1-hydroxy cyclohexyl phenyl ketone, a 2-hydroxy-2-methyl-1-phenyl propane-1-on, a 1-(4-isopropyl phenyl)-2-hydroxy-2-methyl propane-1-on, a 2-chloro thioxantone, a 2,4-diethyl thioxantone, a 2,4-diisopropyl thioxantone, a 2,4-dimethyl thioxantone, an isopropyl thioxantone, a 1-chloro-4-propoxy thioxantone, or the like can be presented. In addition to the photo polymerization initiating agent, a sensitizing agent may be added within a range of not deteriorating the object of the present invention.

The addition amount of such a photo polymerization initiating agent is in general 0.01 to 20% by weight, it is preferably 0.1 to 10% by weight, and more preferably in a range of 0.5 to 5% by weight so as to be added to the above-mentioned reactive liquid crystal.

Furthermore, in the case of using the above-mentioned photo polymerization initiating agent, a photo polymerization initiating auxiliary agent may be used in combination. As such a photo polymerization initiating auxiliary agent, tertiary amines such as a triethanol amine and a methyl diethanol amine, and benzoic acid derivatives such as a 2-dimethyl amino ethyl benzoic acid, a 4-dimethyl amide ethyl benzoate can be presented, but it is not limited thereto.

The thickness of the reactive liquid crystal layer used in the present embodiment is preferably in a range of 1 to 1,000 nm, and it is more preferably in a range of 3 to 100 nm. In the case the reactive liquid crystal layer is thicker than the above-mentioned range, the anisotropy is generated excessively, and in the case it is thinner than the above-mentioned range, the predetermined anisotropy may not be obtained. Therefore, the thickness of the reactive liquid crystal layer may be determined based on the needed anisotropy.

Next, the method for forming the reactive liquid crystal layer will be explained. The reactive liquid crystal layer can be formed by coating a reactive liquid crystal layer coating solution including the above-mentioned reactive liquid crystal onto the first alignment layer and applying the alignment treatment so as to fix the aligned state of the above-mentioned reactive liquid crystal.

Moreover, a method of preliminarily forming a dry film, or the like and laminating the same onto the first alignment layer can also be used instead of coating the reactive liquid crystal layer coating solution, however, in the present embodiment, it is preferable to use the method of preparing a reactive liquid crystal coating solution by dissolving a reactive liquid crystal in a solvent, coating the same on the first alignment layer and removing the solvent because this is a method relatively simple in terms of the process.

The solvent used for the above-mentioned reactive liquid crystal layer coating solution is not particularly limited as long as it can dissolve the above-mentioned reactive liquid crystal, or the like without inhibiting the alignment ability of the first alignment layer. For example, one kind or tow or more kinds of hydrocarbons such as a benzene, a toluene, a xylene, an n-butyl benzene, a diethyl benzene and a tetralin; ethers such as a methoxy benzene, a 1,2-dimethoxy benzene and a diethylene glycol dimethyl ether; ketones such as an acetone, a methyl ethyl ketone, a methyl isobutyl ketone, a cyclohexanone and a 2,4-pentane dion; esters such as an ethyl acetate, a propylene glycol monomethyl ether acetate, a propylene glycol monoethyl ether acetate and a γ-butyrolactone; amide based solvents such as a 2-pyrolidone, an N-methyl-2-pyrolidone, a dimethyl formamide and a dimethyl acetamide; alcohols such as a t-butyl alcohol, a diacetone alcohol, a glycerol, a monoacetin, an ethylene glycol, a triethylene glycol and a hexylene glycol; phenols such as a phenol and a parachloro phenol; cellosolves such as a methyl cellosolve, an ethyl cellosolve, a butyl cellosolve and an ethylene glycol monomethyl ether acetate can be used.

Moreover, by using only one kind of a solvent, the solubility of the above-mentioned reactive liquid crystal, or the like may be insufficient or the first alignment layer may be corroded as mentioned above. However, by using two or more kinds of the solvents as a mixture, the trouble can be avoided. Among the above-mentioned solvents, those preferable as a single solvent are the hydrocarbons and the glycol monoether acetate based solvents, and those preferable as a solvent mixture are a mixture of the ethers or the ketones and the glycol based solvents. Since the concentration of the reactive liquid crystal layer coating solution depends on the solubility of the reactive liquid crystal and the thickness of the reactive liquid crystal layer to be formed, it cannot be defined on the whole, however, it is prepared in general in a range of 0.1 to 40% by weight, and preferably in a range of 1 to 20% by weight. In the case the concentration of the reactive liquid crystal layer coating solution is lower than the above-mentioned range, the reactive liquid crystals may hardly be aligned. On the other hand, in the case the concentration of the reactive liquid crystal layer coating solution is higher than the above-mentioned range, the viscosity of the reactive liquid crystal layer coating solution becomes higher so that an even coating film may hardly be formed.

Furthermore, to the above-mentioned reactive liquid crystal layer coating solution, the compounds as mentioned below can be added within a range of not deteriorating the purpose of the present invention. As the compounds to be added, for example, polyester (meth)acrylates obtained by reacting a polyester prepolymer obtained by the condensation of a polyhydric alcohol and a monobasic acid or a polybasic acid with a (meth)acrylic acid; polyurethane (meth)acrylates obtained by reacting a polyol group and a compound having two isocyanate groups with each other, and reacting the reaction product with a (meth)acrylic acid; photo polymerizable compounds such as an epoxy (meth)acrylate, obtained by reacting epoxy resins such as a bisphenol A type epoxy resin, a bisphenol F type epoxy resin, a novolak type epoxy resin, a polycarboxylic acid polyglycidyl ester, a polyol polyglycidyl ether, an aliphatic or alicyclic epoxy resin, an amine epoxy resin, a triphenol methane type epoxy resin and a dihydroxy benzene type epoxy resin with a (meth)acrylic acid; photo polymerizable liquid crystal compounds having an acrylic group or a methacrylic group, or the like can be presented. The addition amount of these compounds to the above-mentioned reactive liquid crystal can be selected within a range of not deteriorating the purpose of the present invention. By adding these compounds, the hardening property of the reactive liquid crystal can be improved so that the mechanical strength of the reactive liquid crystal layer to be obtained can be increased and furthermore, the stability thereof can be improved.

As a method for coating such a reactive liquid crystal layer coating solution, a spin coating method, a roll coating method, a printing method, a dip coating method, a curtain coating method (die coating method), a casting method, a bar coating method, a blade coating method, a spray coating method, a gravure coating method, a reverse coating method, a extruding coating method, or the like can be presented.

Moreover, after coating the above-mentioned reactive liquid crystal layer coating solution, the solvent is removed, and the solvent removal can be carried out by the reduced pressure removal or the heating removal, of furthermore, a method as a combination thereof, or the like.

According to the present embodiment, as mentioned above, the coated reactive liquid crystal is aligned by the first alignment layer so as to be in a state having the liquid crystal regularity. That is, the reactive liquid crystal comes to have the nematic phase. This is carried out in general by a method of the heat treatment to the N-I transition point or lower, or the like. Here, the "N-I transition point" denotes the temperature of the transition from the liquid crystal phase to the isotropic phase.

As mentioned above, the reactive liquid crystal has a polymerizable liquid crystal material. In order to fix the aligned state of such a polymerizable liquid crystal material, a method of directing an activating radiation for activating the polymerization is used. The "activating radiation" here is the radiation having the ability of inducing the polymerization to the polymerizable liquid crystal material. As needed, a photo polymerization initiating agent may be included in the polymerizable liquid crystal material.

The activating radiation is not particularly limited as long as it is a radiation capable of polymerizing the polymerizable liquid crystal material. In general, from the viewpoint of the device easiness, or the like, an ultraviolet ray or a visible light beam is used. An irradiation beam having a wavelength of 150 to 500 nm, preferably 250 to 450 nm, further preferably 300 to 400 nm is used.

According to the present embodiment, a method of directing an ultraviolet ray as the activating radiation to a polymerizable liquid crystal material to have the radical polymerization by generating a radical by the photo polymerization initiating agent with an ultraviolet ray is a preferable method. Since the method of using an ultraviolet ray as the activating radiation is a technique already established, it can be applied easily to the present embodiment including the photo polymerization initiating agent to be used.

As the light source of the irradiating light beam, a low pressure mercury lamp (a germicidal lamp, a fluorescent chemical lamp, a black light), a high pressure discharge lamp (a high pressure mercury lamp, a metal halide lamp), a short arc discharge lamp (an ultra high pressure mercury lamp, a xenon lamp, a mercury xenon lamp), or the like can be presented as the examples. In particular, use of a metal halide lamp, a xenon lamp, a high pressure mercury lamp, or the like can be recommended. Moreover, the irradiation strength is adjusted optionally according to the composition of the reactive liquid crystal and the amount of the photo polymerization initiating agent.

The irradiation of such an activating radiation can be carried out by the temperature condition to have the above-mentioned polymerizable liquid crystal in a liquid crystal phase, or at a temperature lower than the temperature to have the liquid crystal phase. The polymerizable liquid crystal material once had the liquid crystal phase would not have the sudden disturbance of the aligned state even in the case the temperature is lowered thereafter.

As a method for fixing the aligned state of the polymerizable liquid crystal material, in addition to the above-mentioned method of directing the activating radiation, a method of polymerizing the polymerizable liquid crystal material by heating can be used as well. As the reactive liquid crystal used in this case, those having the polymerizable liquid crystal monomers contained in the reactive liquid crystal are thermally polymerized at the N-I transition point or lower of the reactive liquid crystal are preferable.

(2) First Alignment Layer

Next, the first alignment layer used in the present embodiment will be explained. The first alignment layer used in the present invention is not particularly limited as long as it can align the above-mentioned reactive liquid crystal without posing the adverse effect at the time of fixing the aligned state of the above-mentioned reactive liquid crystal. For example, those having the rubbing process, the optical alignment treatment, or the like applied can be used. In the present embodiment, it is preferable to use a photo alignment layer with the photo alignment treatment applied. Since the photo alignment treatment is a non contact alignment treatment, it is effective in that the quantitative alignment process can be controlled without generation of the static electricity or the dusts.

Since the constituent materials of the photo alignment layer, the photo alignment treatment method, or the like are to be mentioned for the second alignment layer of the counter substrate to be described later, explanation is omitted here.

(3) First Substrate

Next, the first substrate used in the present embodiment will be explained. The first substrate used in the embodiment is not limited to any especial kind if the substrate can be generally used as the substrate of liquid crystal displays. Preferred examples thereof include glass plates and plastic plates. The surface roughness (RSM value) of the first substrate is preferably 10 nm or less, more preferably 3 nm or less, even more preferably 1 nm or less. The surface roughness in the invention can be measured with an atomic force microscope (AFM).

(4) Electrode Layer

Next, the electrode layer used in the present embodiment will be explained. The electrode layer used in the embodiment is not limited to any especial kind if the electrode layer is an electrode layer which is generally used as the electrode layer of liquid crystal displays. At least one of the electrode layers of the reactive liquid crystal side substrate and the counter substrate is preferably an electrode layer made of a transparent conductor. Preferred examples of the material of the transparent conductor include such as an indium oxide, a tin oxide, and an indium tin oxide (ITO). In particular, in the case of rendering the liquid crystal display of the embodiment a liquid crystal display of an active matrix system using TFT, one of the electrode layers of the reactive liquid crystal side substrate and the counter substrate is rendered a full-face common electrode made of the transparent conductor and the other is rendered an electrode in which x electrodes and y electrodes are arranged in a matrix form and a TFT element and a pixel electrode are arranged in a region surrounded by each of the x electrodes and each of the y electrodes. In this case, the difference between concave and convex portions of an electrode layer made of the pixel electrodes, the TFT elements, the x electrodes and the y electrodes is preferably 0.2 μm or less. If the difference between the concave and convex portions of the electrode layer is over 0.2 μm, alignment disturbance is easily generated.

About the above-mentioned electrode layer, a transparent electroconductive film can be formed on the above-mentioned first substrate by a vapor deposition method such as CVD, sputtering, or ion plating, and then this is patterned into a matrix form, whereby the x electrodes and the y electrodes can be obtained.

2. Counter Substrate

Next, the counter substrate used in the present embodiment will be explained. The counter substrate in the present embodiment comprises a second substrate, an electrode layer formed on the second substrate, and a second alignment layer formed on the electrode layer. Hereinafter, the respective configurations of the counter substrate will be explained. Since the second substrate is same as that mentioned in the column of the first substrate of the above-mentioned reactive liquid crystal side substrate, and the electrode layer is same as that mentioned in the column of the electrode layer of the above-mentioned reactive liquid crystal side substrate, explanation is omitted here.

(1) Second Alignment Layer

The second alignment layer used in the present embodiment is not particularly limited as long as it can align the ferroelectric liquid crystal. As such a second alignment layer, for example, those having the rubbing process, the photo alignment treatment, or the like applied can be used. In the present embodiment, it is preferable to use a photo alignment layer with the photo alignment treatment applied. Since the photo alignment treatment is a non contact alignment treatment, it is effective in that the quantitative alignment process can be controlled without generation of the static electricity or the dusts. Hereinafter, such a photo alignment layer will be explained.

The photo alignment layer has the liquid crystal molecule on the layer aligned by providing the anisotropy to a layer obtained by directing a light beam with the polarization controlled to a substrate coated with the constituent materials of the photo alignment layer to be described later so as to generate the photo-excitation reaction (decomposition, isomerization, dimerization).

The constituent material for the photo alignment layer used in the present embodiment is not particularly limited as long as it has the effect of aligning the ferroelectric liquid crystal by generating the photo-excitation reaction by directing a light beam (photo aligning). Such materials can be roughly classified into the photoreactive type materials to exhibit the anisotropy to the photo alignment layer by generating the photoreaction and the photo-isomerizable type materials to exhibit the anisotropy to the photo alignment layer by generating the photo-isomerization reaction. The wavelength range of light which causes photo-excitation reaction in the constituent materials of the photo alignment layers is preferably within the wavelength range of ultraviolet rays, that is, the range of 10 to 400 nm, more preferably within the range of 250 to 380 nm. Hereinafter, each of the photoreactive type and the photo-isomerization type will be explained.

(Photoreaction Type)

First, the photoreaction type constituent materials will be explained. As mentioned above, the photoreaction type constituent material is a material to exhibit the anisotropy to the photo alignment layer by generating the photoreaction. The photoreactive type constituent materials used in the present embodiment are not particularly limited as long as they have such a property. Among them, a material to exhibit the anisotropy to the above-mentioned photo alignment layer by generating the photo-dimerization reaction or the photo-decomposition reaction is preferable.

The photo-dimerization reaction is a reaction that two molecules are polymerized by radical polymerization of their reactive sites aligned in the direction of polarization through the light irradiation. This reaction makes it possible to stabilize the alignment in the polarization direction to give anisotropy to the photo alignment layer. On the other hand, the photo-decomposition reaction is a reaction which decomposes a molecule chain of polyimide or the like which is aligned in the direction of polarization by the light irradiation. This reaction makes it possible to give anisotropy to the photo alignment layer in the state that the molecule chain aligned in the direction perpendicular to the polarization direction remains. It is more preferable in the embodiment to use, out of these photoreactive materials, materials which give anisotropy to the photo alignment layer by the photo-dimerization reaction since the materials are high in exposure sensitivity and the scope of material-selection is wide.

The photoreactive material using the photo-dimerization reaction is not limited to any especial kind if the material can give anisotropy to the photo alignment layer by photo-dimerization reaction. The material preferably comprises a photo-dimerization-reactive compound having a radically-polymerizable functional group and showing dichroism having different absorptions depending on the polarization direction thereof. This is because the alignment of the photo-dimerization-reactive compound is stabilized and anisotropy can easily be given to the photo alignment layer by radically-polymerizing its reactive sites aligned in the polarization direction.

Examples of the photo-dimerization-reactive compound having such properties include dimerization-reactive polymers each having, as its side chain, at least one reactive site selected from a cinnamic acid ester, a coumalin, a quinoline, a chalcone group and a cinnamoyl group.

Of these, the following is preferred as the photo-dimerization-reactive compound having such properties: a dimerization-reactive polymer having, as its side chain, any one of a cinnamic acid ester, a coumalin and a quinoline. This is because the compound is radically-polymerized in the state that the double bonds in the α,β-unsaturated ketone aligned in the polarization direction function as reactive sites, whereby anisotropy can easily be given to the photo alignment layer.

The main chain of the dimerization-reactive polymer is not limited to any especial kind if the main chain is a chain that is generally known as a polymer main chain, and is preferably a chain which does not have a substituent containing many π electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000. The weight-average molecular weight can be measured by gel permeation chromatography (GPC). If the weight-average molecular weight of the dimerization-reactive polymer is too small, an appropriate anisotropy may not be given to the photo alignment layer. Conversely, if it is too large, the viscosity of the coating solution at the time of the formation of the photo alignment layer is so high that a homogeneous coat film may not easily be formed.

As the dimerization-reactive polymer, a compound represented by the following formula can be illustrated:

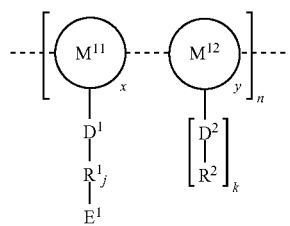

In the formula, $M^{11}$ and $M^{12}$ each independently represent a monomer unit of a homopolymer or a copolymer. Examples thereof include an ethylene, an acrylate, a methacrylate, a 2-chloroacrylate, an acrylamide, methacrylamide, a 2-chloroacrylamide, a styrene derivatives, a maleic acid derivatives, and a siloxane. $M^{12}$ may be an acrylonitrile, a methacrylonitrile, a methacrylate, a methyl methacrylate, a hydroxyalkyl an acrylate or a hydroxyalkyl methacrylate. x and y each represents the mole ratio of each of the monomer units when the units are polymerized into a copolymer, and are each a number satisfying: $0<x\leq1$, $0\leq y<1$, and $x+y=1$. n represents an integer of 4 to 30,000. $D^1$ and $D^2$ each represents a spacer unit.

$R^1$ is a group represented by $-A^1-(Z^1-B^1)_z-Z^2$, and $R^2$ is a group represented by $-A^1-(Z^1-B^1)_z-Z^3-$, wherein $A^1$ and $B^1$ each independently represent a covalent single bond, a pyridine-2,5-diyl, a pyrimidine-2,5-diyl, a 1,4-cyclohexylene, a 1,3-dioxane-2,5-diyl, or a 1,4-phenylene which may have a substituent; $Z^1$ and $Z^2$ each independently represent a covalent single bond, $-CH_2-CH_2-$, $-CH_2O-$, $-OCH_2-$, $-CONR-$, $-RNCO-$, $-COO-$ or $-OOC-$, wherein R is a hydrogen atom or a lower alkyl group; $Z^3$ is a hydrogen atom, an alkyl or alkoxy which has 1 to 12 carbon atoms and may have a substituent, a cyano, a nitro or a halogen; z is an integer of 0 to 4; $E^1$ represents a photo dimerization-reactive site, examples of which include a cinnamic acid ester, a coumalin, a quinoline, a chalcone group and a cinnamoyl group; and j and k are each independently 0 or 1.

More preferable examples of this dimerization-reactive polymer include compounds represented by the following formulae:

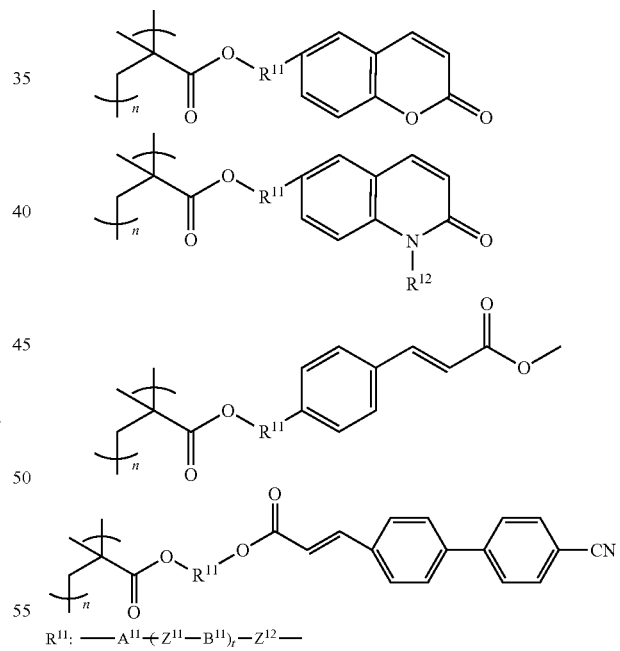

wherein $A^{11}$ and $B^{11}$: a 1,4-phenylene, a covalent single bond, a pyridine-2,5-diyl, a pyrimidine-2,5-diyl, a 1,4-cyclohexylene or a 1,3-dioxane-2,5-diyl;

$Z^{11}$ and $Z^{12}$: $-CH_2-CH_2-$, $-COO-$, $-OOC-$, or a covalent single bond;

t: an integer of 0 to 4;

$R^{12}$: a lower alkyl; and n: an integer of 4 to 30,000.

Of the above-mentioned dimerization-reactive polymers, particularly preferable is at least one of compounds 1 to 4 represented by the following formulae:

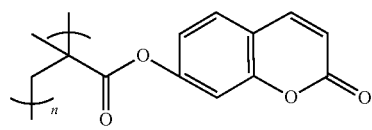

1

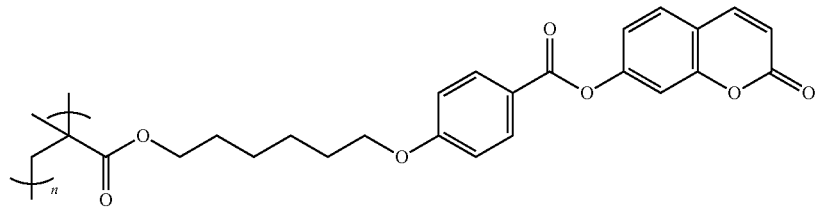

2

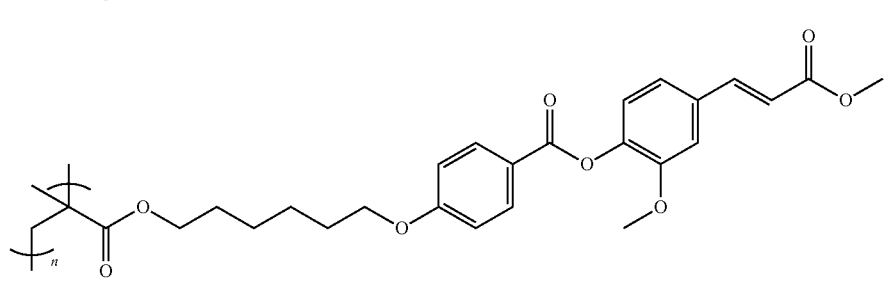

3

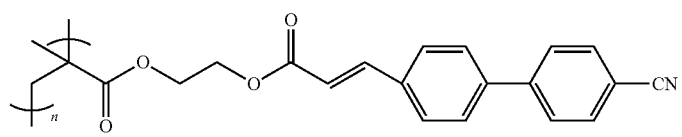

4

In the present embodiment, a photo dimerization-reactive site or substituent can be variously selected as the photo-dimerization-reactive compound from the above-mentioned compounds in accordance with required properties. One kind of the photo-dimerization-reactive compound may be used alone or a combination of two or more kinds thereof can be used.

The photoreactive material using photo-dimerization reaction may contain additives besides the above-mentioned photo-dimerization-reactive compound as long as the photo aligning of the photo alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo-dimerization-reactive compound and then use the selected one. The added amount of the polymerization initiator or the polymerization inhibitor is preferably from 0.001 to 20% by weight, more preferably from 0.1 to 5% by weight of the photo-dimerization-reactive compound. If the added amount of the polymerization initiator or the polymerization inhibitor is too small, the polymerization may not be initiated (or inhibited). Conversely, if the amount is too large, the reaction may be hindered.

Next, the photo alignment treatment method in the case of using the above-mentioned photoreactive type material will be explained. In the present embodiment, the photo alignment treatment method is not particularly limited as long as it can exhibit the anisotropy to the photo alignment layer. For example, it can be carried out by coating a coating solution prepared by diluting the constituent materials of the above-mentioned photo alignment layer with an organic solvent onto the surface facing the liquid crystal layer of the substrate provided with the electrode layer, and drying. In this case, the content of the photo-dimerization-reactive compound in the coating solution is preferably in a range of 0.05 to 10% by weight, and it is more preferably in a range of 0.2 to 2% by weight. In the case the content of the photo-dimerization-reactive compound is too small, it is difficult to exhibit the appropriate anisotropy to the alignment layer. On the contrary, in the case it is too large, a homogeneous coating layer can hardly be formed due to the high viscosity of the coating solution.

The coating method which can be used is spin coating, roll coating, rod bar coating, spray coating, air knife coating, slot die coating, wire bar coating or the like.

The thickness of the polymer film obtained by the coating with the constituent material is preferably from 1 to 200 nm, more preferably from 3 to 100 nm. If the thickness of the polymer film is too small, a sufficient photo aligning may not be obtained. Conversely, if the thickness is too large, the alignment of the liquid crystal molecules may be disturbed and further costs thus occurred are not preferred.

The resultant polymer film causes photo-excitation reaction by the light irradiation the polarization of which is controlled, whereby anisotropy can be given. The wavelength range of the radiated light should be appropriately selected in accordance with the constituent material of the used photo alignment layer, and is preferably the range of ultraviolet ray wavelengths, that is, the range of 100 to 400 nm, more preferably the range of 250 to 380 nm.

The photoreactive type material utilizing the photo-decomposing reaction is not particularly limited as long as it is a material generating the reaction for decomposing the molecular chain of a polyimide or the like aligned in the polarizing direction by the light irradiation. As such a photoreactive type material, for example, polyimide "RN1199" manufactured by NISSAN CHEMICAL INDUSTRIES, LTD., or the like can be presented.

(Photo-Isomerization Type)

Next, the photo-isomerization type material will be explained. The photo-isomerization type material here is a material to exhibit the anisotropy to the photo alignment layer by generating the photo-isomerization reaction as mentioned above. It is not particularly limited as long as it is a material having such a property. Those including the photo-isomerization-reactive compound to exhibit the anisotropy to the above-mentioned photo alignment layer by generating the photo-isomerization reaction are preferable. Since such a photo-isomerization-reactive compound is included, stable isomers are increased out of a plurality of isomers by the light irradiation, and thereby the anisotropy can be exhibited easily to the photo alignment layer.

The photo-isomerization-reactive compound is not limited to any especial kind if the compound is a material having such properties mentioned above, and is preferably a compound which shows a dichroism having different absorptions depending on the polarization direction thereof and generates photo-isomerization reaction by the light irradiation. By generating the isomerization of the reactive site aligned in the polarization direction of the photo-isomerization-reactive compound having such properties, anisotropy can easily be given to the photo alignment layer.

For the photo-isomerization reaction generated by the photo-isomerization-reactive compound is preferably the cis-trans isomerization reaction. This is because any one of the cis-isomer and the trans-isomer increases by the light irradiation, whereby anisotropy can be given to the photo alignment layer.

Examples of the photo-isomerization-reactive compound used in the invention may be monomolecular compounds or polymerizable monomers polymerizable with light or heat. These should be appropriately selected in accordance with the kind of the used ferroelectric liquid crystal. It is preferable to use any one of the polymerizable monomers since the monomer gives anisotropy to the photo alignment layer by the light irradiation and subsequently the monomer is polymerized, whereby the anisotropy can be made stable. Of such polymerizable monomers, preferable is an acrylate monomer or methacrylate monomer since the monomer gives anisotropy to the photo alignment layer and subsequently the monomer can easily be polymerized in the state that the anisotropy is kept good.

The polymerizable monomer may be a monofunctional monomer or a polyfunctional monomer. A bifunctional monomer is preferable since the anisotropy of the photo alignment layer, based on the polymerization, becomes more stable.

Specific examples of such a photo-isomerization-reactive compound include compounds having a cis-trans isomerization-reactive skeleton, such as an azobenzene skeleton or a stilbene skeleton.

In this case, the number of the cis-trans isomerization-reactive skeleton(s) may be one or more, and is preferably two since the alignment of the ferroelectric liquid crystal is easily controlled.

The cis-trans isomerization-reactive skeleton(s) may have a substituent in order to make interaction thereof with the liquid crystal molecules higher. The substituent is not limited to any especial kind if the substituent can make the interaction with the liquid crystal molecules high and further does not hinder the alignment of the cis-trans isomerization-reactive skeleton(s). Examples thereof include a carboxyl group, a sodium sulfonate group, and a hydroxyl group. These skeleton structures can be appropriately selected in accordance with the kind of the used ferroelectric liquid crystal.

The photo-isomerization-reactive compound may have a group containing many $\pi$ electrons in the molecule, such as an aromatic hydrocarbon group, besides the cis-trans isomerization-reactive skeleton in order to make the interaction with the liquid crystal molecules higher. The cis-trans isomerization-reactive skeleton and the aromatic hydrocarbon group may be bonded to each other through a bonding group. The bonding group is not limited to any especial kind if the group can make the interaction with the liquid crystal molecules high. Examples thereof include —COO—, —OCO—, —O—, —C≡C—, —CH$_2$—CH$_2$—, —CH$_2$O—, and —OCH$_2$—.

In the case of using a polymerizable monomer as the photo-isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of the anisotropy given to the photo alignment layer becomes larger and this compound becomes particularly suitable for the control of the alignment of the ferroelectric liquid crystal. In this case, it is preferable that the above-mentioned aromatic hydrocarbon group and the bonding group contained in the molecule are contained, together with the cis-trans isomerization-reactive skeleton, in the side chain so as to make the interaction with the liquid crystal molecules high.

The side chain of the polymerizable monomer may have, as a spacer, an aliphatic hydrocarbon group such as an alkylene group so that the cis-trans isomerization-reactive skeleton can easily be aligned.

Of the above-mentioned photo-isomerization-reactive compounds of monomolecular compounds and polymerizable monomers as described above, any compound having in the molecule thereof an azobenzene skeleton is preferable as the photo-isomerization-reactive compound used in the present embodiment. This is because the azobenzene skeleton interacts highly with the liquid crystal molecules and is particularly suitable for the control of the alignment of the ferroelectric liquid crystal since the skeleton contains many $\pi$ electrons.

Hereinafter, the reason why the anisotropy can be exhibited to the photo alignment layer by generating the photo-isomerization reaction with the azobenzene skeleton will be explained. First, when the azobenzene skeleton is irradiated with linearly polarized ultraviolet rays, the azobenzene skeleton of a trans isomer, as shown in the below formula, in which its molecule long axis is aligned in the polarization direction, is changed to the cis isomer thereof.

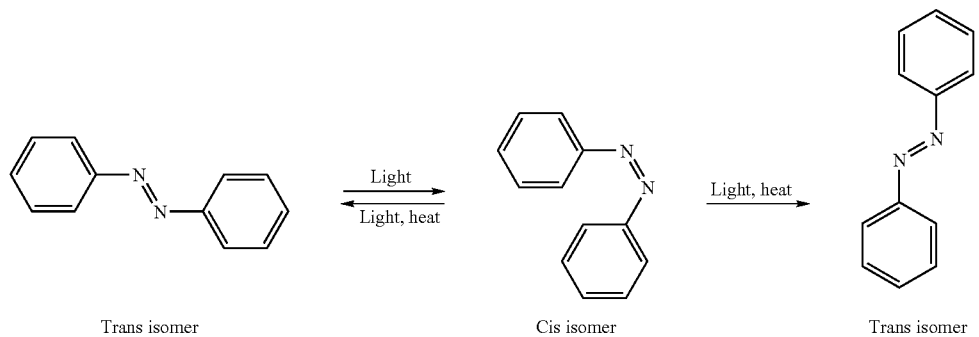

Since the cis isomer of the azobenzene skeleton is more chemically unstable than trans isomers thereof, the cis isomer returns thermally to any one of the trans isomers or absorbs visible rays to returns thereto. At this time, it happens with the same possibility whether the cis isomer turns to the trans isomer at the left side or the trans isomer at the right side in above formula. Accordingly, when the azobenzene skeleton continues to absorb ultraviolet rays, the ratio of the trans isomer at the right side increases so that the average alignment direction of the azobenzene skeleton becomes perpendicular to the polarized ultraviolet ray direction. In the present invention, this phenomenon is used to make polarization directions of azobenzene skeletons consistent with each other, thereby giving anisotropy to the photo alignment layer to control the alignment of liquid crystal molecules on the layer.

An example of a monomolecular compound out of the compounds each having in the molecule thereof an azobenzene skeleton may be a compound represented by the following formula:

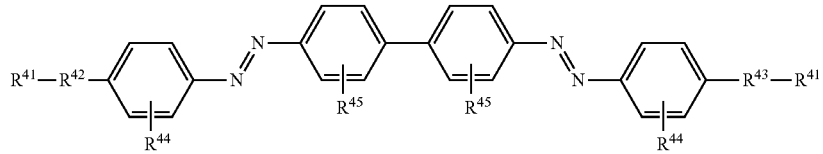

In the above formula, each $R^{41}$ independently represents a hydroxy group; $R^{42}$ represents a linking group represented by $-(A^{41}-B^{41}-A^{41})_m-(D^{41})_n-$ and $R^{43}$ represents a linking group represented by $(D^{41})_n-(A^{41}-B^{41}-A^{41})_m-$, wherein $A^{41}$ represents a bivalent hydrocarbon group, $B^{41}$ represents —O—, —COO—, —OCO—, —CONH—, —NHCO—, —NHCOO— or —OCONH—, m represents an integer of 0 to 3, $D^{41}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{44}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{45}$ independently represents a carboxy group, a sulfo group, a nitro group, an amino group or a hydroxy group provided that the carboxy group or the sulfo group may be combined with an alkali metal to form a salt.

Specific examples of the compound represented by the above-mentioned formula include the following compounds:

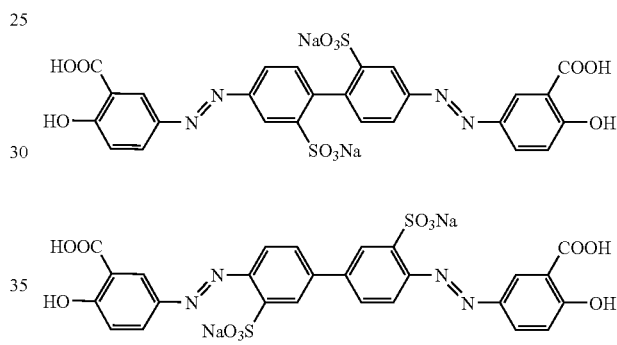

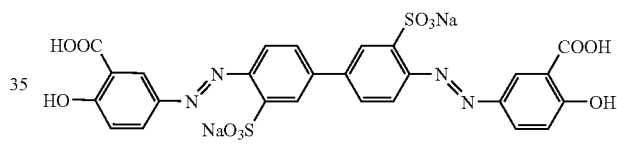

-continued

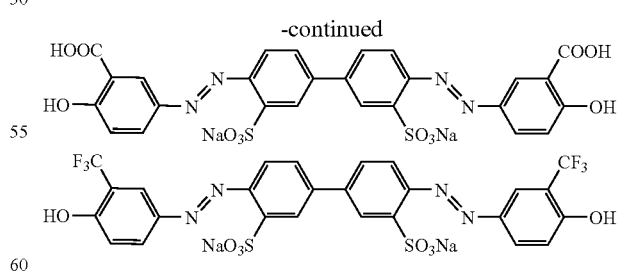

Conventionally, although the monomolecular compound having the azobenzene skeleton shown by the above-mentioned formula having a high alignment limiting force with respect to a liquid crystal molecule is useful as a constituent material for a photo alignment layer, it can hardly be used as a material for a photo alignment layer due to the problem of insufficiency of the stability. In the present invention, since the reactive liquid crystal providing the above-mentioned reactive liquid crystal layer can stabilize the monomolecular compound having an azobenzene skeleton, by laminating the above-mentioned reactive liquid crystal layer on the photo alignment layer, the monomolecular compound having an azobenzene skeleton can be used stably as a constituent material for a photo alignment layer.

An example of the polymerizable monomer having as its side chain the azobenzene skeleton may be a compound represented by the following formula:

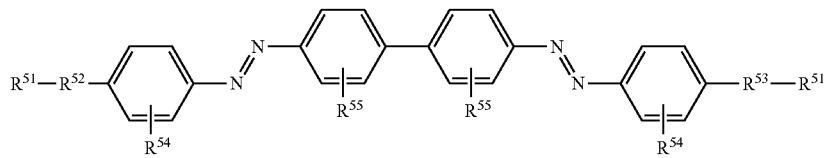

In the above formula, each $R^{51}$ independently represents a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{52}$ represents a linking group represented by $-(A^{51}-B^{51}-A^{51})_m-(D^{51})_n-$ and $R^{53}$ represents a linking group represented by $(D^{51})-(A^{51}-B^{51}-A^{51})_m-$ wherein $A^{51}$ represents a bivalent hydrocarbon group, $B^{51}$ represents —O—, —COO—, —OCO—, —CONH—, —NHCO—, —NHCOO— or —OCONH—, m represents an integer of 0 to 3, $D^{51}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{54}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{55}$ independently represents a carboxy group, a sulfo group, a nitro group, an amino group or a hydroxy group provided that the carboxy group or the sulfo group may be combined with an alkali metal to form a salt.

A specific example of the compound represented by the above-mentioned formula is the following compound:

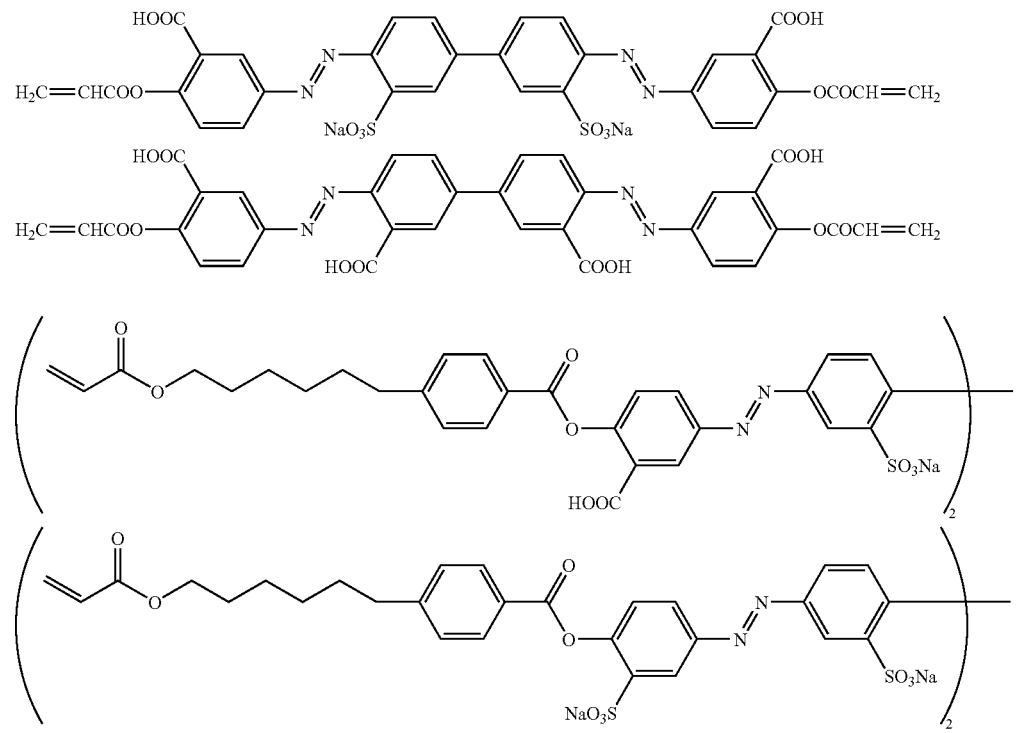

In the present embodiment, the cis-trans isomerization-reactive skeleton or substituent can be variously selected from the above-mentioned photo-isomerization-reactive compounds in accordance with required properties. One kind of the photo-isomerization-reactive compound may be used alone or a combination of two or more kinds thereof can be used.

Additives, besides the above-mentioned photo-isomerization-reactive compound, may be contained as constituent materials of the photo alignment layer used in the present embodiment as long as the photo aligning of the photo alignment layer is not hindered. In the case of using a polymerizable monomer as the photo-isomerization-reactive compound, examples of the additives include a polymerization initiator and a polymerization inhibitor.

It is advisable to select the polymerization initiator or the polymerization inhibitor appropriately from generally-known compounds in accordance with the kind of the photo-isomerization-reactive compound and then use the selected one. The added amount of the polymerization initiator or the polymerization inhibitor is preferably from 0.001 to 20%, more preferably from 0.1 to 5% by weight of the photo-isomerization-reactive compound. If the added amount of the polymerization initiator or the polymerization inhibitor is too small, the polymerization may not be initiated (or inhibited). Conversely, if the amount is too large, the reaction may be hindered.

The optical alignment process in the case of using such a photo-isomerization type material can be carried out by the same method as in the case of using the above-mentioned photoreactive material. In this case, the content of the photo-isomerization-reactive compound in the coating solution is preferably in a range of 0.05 to 10% by weight, and it is more preferably in a range of 0.2 to 5% by weight. Moreover, in the case of the photo-isomerization type, the photo alignment treatment can be carried out also by directing a non polarized ultraviolet ray irradiation.

(2) Second Reactive Liquid Crystal Layer

According to the present embodiment, a second reactive liquid crystal layer provided by fixing a reactive liquid crystal may be formed on the above-mentioned second alignment layer. In this case, it is preferable that the reactive liquid crystal comprising the reactive liquid crystal layer of the above-mentioned reactive liquid crystal side substrate has a composition different from that of the reactive liquid crystal comprising the second reactive liquid crystal layer of the counter substrate. As mentioned above, the reactive liquid crystal can control the alignment of the ferroelectric liquid crystal more effectively than the case of using only the alignment layer. Moreover, since the reactive liquid crystal providing the above-mentioned reactive liquid crystal layer and the reactive liquid crystal providing the above-mentioned second reactive liquid crystal layer have different compositions, generation of the alignment defects such as the zigzag defect, the hairpin defect, and the double domains can be restrained so that a mono-stability operation mode can be realized using the ferroelectric liquid crystal.

The reactive liquid crystal used in the second reactive liquid crystal layer, the method for forming the second reactive liquid crystal layer, or the like are same as those mentioned in the above-mentioned column of the "1. Reactive liquid crystal side substrate (1) Reactive liquid crystal layer". Thus, the description is omitted here.

According to the present embodiment, by variously selecting the polymerizable functional group and the substituent group of the above-mentioned polymerizable monomer, the compositions of the reactive liquid crystal comprising the above-mentioned reactive liquid crystal layer and the reactive liquid crystal comprising the above-mentioned second reactive liquid crystal layer can be made different. In the embodiment, the polymerizable functional groups of the polymerizable monomers used for the above-mentioned two reactive liquid crystals may either be same or different. Moreover, according to the present embodiment, two or more kinds of the polymerizable monomers may be used in a combination, and by changing the combination, the composition can be varied. Furthermore, even in the case of using the same combination, by changing the content of the polymerizable monomer or additives, respectively, composition can be made different.

3. Liquid Crystal Layer

Next, the liquid crystal layer used in this embodiment will be explained. The liquid crystal layer in this embodiment includes a ferroelectric liquid crystal and a polymerized product of a polymerizable monomer, and it is provided by being held between the above-mentioned reactive liquid crystal layer and the above-mentioned second alignment layer.

(1) Ferroelectric Liquid Crystal

Figure 10:
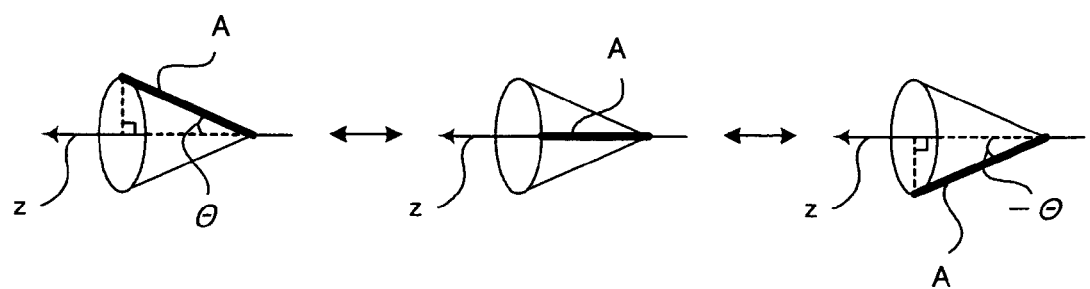
FIG. 10 is a schematic diagram for explaining the mono-stability of the ferroelectric liquid crystal.

The ferroelectric liquid crystal used for the above-mentioned liquid crystal layer is not particularly limited as long as it can realize the chiral smectic C phase (SmC*), however, it preferably shows the mono-stability. By using a ferroelectric liquid crystal showing the mono-stability, the effect of the configuration of this embodiment can be provided more remarkably. Here, "show the mono-stability" denotes the state of the ferroelectric liquid crystal at the time of the voltage non application stabilized as one state. Specifically, as shown in FIG. 10, the ferroelectric liquid crystal A can be operated on the cone between the two states inclined by a tilt angle $\pm\theta$ with respect to the layer normal line z, and the ferroelectric liquid crystal A is stabilized in one state on the above-mentioned cone.

The ferroelectric liquid crystal used in this embodiment can be classified on the whole into a material with the phase change from the nematic phase (N)-cholesteric phase (Ch)-chiral smectic C phase (SmC*), or the nematic phase (N)-chiral smectic C phase (SmC*) without the smectic A phase (SmA) in the phase sequence (first embodiment), and a material having the SmA in the phase sequence (second embodiment). Hereinafter, the ferroelectric liquid crystal of each embodiment will be explained.

(Ferroelectric Liquid Crystal of the First Embodiment)

The ferroelectric liquid crystal of this embodiment is a material with the phase change of the phase sequence of N-Ch-SmC* or N-SmC* without having the SmA (first embodiment).

The ferroelectric liquid crystal of this embodiment enables the drive by the active matrix system using a thin film transistor (TFT) and the gray scale control by the voltage modulation, and thus it is advantageous. Therefore, by using the ferroelectric liquid crystal of this embodiment, a liquid crystal display capable of realizing the highly precise high quality display can be obtained. Moreover, the ferroelectric liquid crystal of this embodiment can be used preferably in the case of displaying the liquid crystal display of this embodiment by the field sequential color system.

It is preferable to use a liquid crystal material having the mono-stability for the ferroelectric liquid crystal of this embodiment. Here, the mono-stability denotes the nature of having one stable state only at the time of the voltage non application as mentioned above. In particular, those of the half V-shape drive with the liquid crystal molecules operated only at the time of applying a positive or negative voltage allow a long opening time of the black and white shutter so as to realize a bright color display, and thus it is preferable.

As the ferroelectric liquid crystal used in this embodiment, specifically, "R2301" commercially available from AZ Electronic Materials can be presented.

(Ferroelectric Liquid Crystal of the Second Embodiment)

The ferroelectric liquid crystal used in the present invention is a material showing the SmC* phase via the SmA phase in the temperature lowering process, and showing the mono-stability in the SmC* phase.

Like the ferroelectric liquid crystal of the first embodiment described above, the ferroelectric liquid crystal of this embodiment enables the drive by the active matrix system using a thin film transistor (TFT) and the gray scale control by the voltage modulation so as to realize the highly precise high quality display, by using the liquid crystal material having the mono-stability. Furthermore, the ferroelectric liquid crystal of this embodiment is advantageous in that the material selection range is wide.

Conventionally, as a ferroelectric liquid crystal having such a phase sequence, the layer interval of the smectic layer is shortened in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface, and thus it is problematic. However, according to this embodiment, since the ferroelectric liquid crystal can be aligned without generating such an alignment defect by forming the above-mentioned photo alignment layer, it is advantageous in that the contrast deterioration by the light leakage can be prevented.

The phase sequence of the ferroelectric liquid crystal of this embodiment is not particularly limited as long as it shows the SmC* phase via the SmA phase in the temperature lowering process, and it may show another liquid crystal phase on the high temperature side or the low temperature side of the liquid crystal phases. Among these, for the wide material selection range, it is preferable to use a material showing the SmC* phase from the Ch phase via the SmA phase. Such a ferroelectric liquid crystal can be selected variously from the commonly known materials according to the demanded property.

Moreover, as such a ferroelectric liquid crystal, although a single material showing the SmC* phase can be used, a material showing the above-mentioned phase sequence by adding a small amount of a optically active substance not showing the SmC phase itself but capable of inducing the spontaneous polarization and an appropriate spiral pitch to a low viscosity non-chiral liquid crystal easily showing the SmC phase (hereinafter, it may be referred to as the host liquid crystal) is preferable for its low viscosity and capability of realizing a faster response.

As the host liquid crystal mentioned above, a material showing the SmC phase in a wide temperature range is preferable. Those commonly known as a host liquid crystal for a ferroelectric liquid crystal can be used without limitation particularly. For example, a compound represented by the below-mentioned general formula:

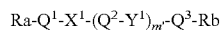

(in the formula, Ra and Rb are each a straight chain or branched alkyl group, an alkoxy group, an alkoxy carbonyl group, an alkanoyloxy group or an alkoxy carbonyloxy group; $Q^1$, $Q^2$ and $Q^3$ are each a 1,4-phenylene group, a 1,4-cyclohexylene group, a pyridine-2,5-diyl group, a pyradine-2,5-diyl group, a pyridazine-3,6-diyl group or a 1,3-dioxane-2,5-diyl group, wherein these groups may have a substituent group such as a halogen atom, a hydroxyl group and a cyano group; $X^1$ and $Y^1$ are each —COO—, —OCO—, —CH$_2$O—, —OCH$_2$—, —CH$_2$CH$_2$—, —C≡C— or a single bond; and m' is 0 or 1) can be used. As the host liquid crystal, the above-mentioned compounds can be used either alone by one kind or as a combination of two or more kinds.

The optically active substance to be added to the above-mentioned host liquid crystal is not particularly limited as long as it is a material having the large spontaneous polarization and the ability capable of inducing an appropriate spiral pitch, and thus those commonly known as a material to be added to a liquid crystal composition showing the SmC phase can be used. In particular, a material capable of inducing the large spontaneous polarization by a small addition amount is preferable. As such an optically active substance, for example, a compound represented by the below-mentioned general formula:

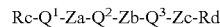

(in the formula, each Rd, $Q^1$, $Q^2$, $Q^3$ denote the same things as in the above-mentioned general formula; Za and Zb are each —COO—, —OCO—, —CH$_2$O—, —OCH$_2$—, —CH$_2$CH$_2$—, —C≡C—, —CH=N—, —N=N—, —N(→O)=N—, —C(=O)S— or a single bond; Rc is a straight chain or branched alkyl group, which may have an asymmetric carbon atom, an alkoxy group, an alkoxy carbonyl group, an alkanoyloxy group or an alkoxy carbonyloxy group; Rd is a straight chain or branched alkyl group having an asymmetric carbon atom, an alkoxy group, an alkoxy carbonyl group, an alkanoyloxy group or an alkoxy carbonyloxy group, and Rc and Rd each may be substituted with a halogen atom, a cyano group or a hydroxyl group) can be used. As the optically active substance, the above-mentioned compounds can be used either alone by one kind or as a combination of two or more kinds.

As the ferroelectric liquid crystal used in this embodiment, specifically, "FELIXM4851-100" commercially available from AZ Electronic Materials, or the like can be presented.

(2) Polymerized Product of a Polymerizable Monomer

The polymerized product of a polymerizable monomer contained in the above-mentioned liquid crystal layer has the function of stabilizing the sequence of the above-mentioned ferroelectric liquid crystal in the liquid crystal layer.

(Polymerizable Monomer)

The polymerizable monomer used in the polymerized product of the above-mentioned polymerizable monomer is not particularly limited as long as it is a compound generating a polymerized product by the polymerization reaction. As such a polymerizable monomer, a thermosetting resin monomer to generate the polymerization reaction by a heat treatment, and an active radiation curable resin monomer to generate the polymerization reaction by the irradiation of an active radiation can be presented. In particular, in this embodiment, it is preferable to use an active radiation curable resin monomer. Since the thermosetting resin monomer requires the temperature applying process for generating the polymerization reaction, the regular sequence of the above-mentioned ferroelectric liquid crystal may be deteriorated or the phase transition may be induced by such a temperature applying process. On the other hand, according to the active radiation curable resin monomer, such risk can be eliminated so that the ferroelectric liquid crystal sequence can hardly be deteriorated by the generation of the polymerization reaction.

As the above-mentioned active radiation curable resin monomer, an electron beam curable resin monomer to generate the polymerization reaction by the irradiation of an electron beam, and a photo setting resin monomer to generate the polymerization reaction by the light irradiation can be presented. In particular, in this embodiment, it is preferable to use a photo setting resin monomer because the method for manufacturing a liquid crystal display of this embodiment can be simplified by using the photo setting resin monomer.

The above-mentioned photo setting resin monomer is not particularly limited as long as it generates the polymerization reaction by the irradiation of a light beam having a wavelength in a range of 150 nm to 500 nm. In particular, in this embodiment, it is preferable to use an ultraviolet curable resin monomer to generate the polymerization reaction by the irradiation of a light beam having a wavelength in a range of 250 nm to 450 nm, in particular, in a range of 300 nm to 400 nm because it is advantageous in terms of the convenience of the irradiating device, or the like.

The polymerizable functional group of the above-mentioned ultraviolet curable resin monomer is not particularly limited as long as it generates the polymerization reaction by the irradiation of an ultraviolet ray of the above-mentioned wavelength range. In this embodiment, it is preferable to use an ultraviolet curable resin monomer having an acrylate group.

The ultraviolet curable resin monomer may be a monofunctional monomer having one polymerizable functional group in one molecule, or a polyfunctional monomer having two or more polymerizable functional groups in one molecule. In particular, in this embodiment, it is preferable to use a polyfunctional monomer. By using a polyfunctional monomer, since a stronger polymer network can be formed in the above-mentioned liquid crystal layer, the intermolecular force and the polymer network at the photo alignment layer interface can be reinforced. Therefore, by using a polyfunctional monomer, disturbance of the sequence of the above-mentioned ferroelectric liquid crystal by the temperature change of the liquid crystal layer can be restrained.

In this embodiment, among the above-mentioned polyfunctional monomer, it is preferable to use a bifunctional monomer having a polymerizable functional group on the both ends of the molecule. Since the above-mentioned functional group is provided on the both ends of the molecule, a polymer network can be formed with a wide interval between the polymers so that decline of the driving voltage of the ferroelectric liquid crystal by the inclusion of a polymerized product of a polymerizable monomer in the liquid crystal can be prevented.

In this embodiment, as the above-mentioned ultraviolet curable resin monomer, it is preferable to use an ultraviolet curable liquid crystal monomer to realize the liquid crystal property. The reason why such an ultraviolet curable liquid crystal monomer is preferable is as follows. That is, since the ultraviolet curable liquid crystal monomer shows the liquid crystal property, it can be arranged regularly by the alignment limiting force of the above-mentioned photo alignment layer. Therefore, by generating the polymerization reaction after regularly arranging the ultraviolet curable liquid crystal monomer, it can be fixed while maintaining the regular sequence state in the above-mentioned liquid crystal layer. Since a polymerized product having such a regular sequence state is present in the liquid crystal layer, the sequence stability of the above-mentioned ferroelectric liquid crystal can be improved so that the liquid crystal display of this embodiment can be provided with the excellent heat resistance and impact resistance.

The liquid crystal phase of the above-mentioned ultraviolet curable liquid crystal monomer is not particularly limited, and for example, the nematic phase, the SmA phase, and the SmC phase can be presented.

As the above-mentioned ultraviolet curable liquid crystal monomer used in this embodiment, for example, the compounds represented by a below-mentioned formula can be presented.

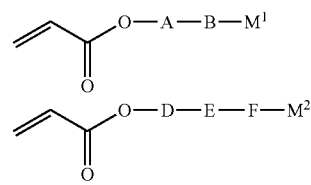

In the above-mentioned formula, each A, B, D, E and F is a benzene, a cyclohexane or a pyrimidine, which may have a substituent group such as a halogen. Moreover, A and B, or D and E may be bonded via a bonding group such as an acetylene group, a methylene group and an ester group. $M^1$ and $M^2$ each may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a spacer such as an alkylene group having 3 to 6 carbon atoms.

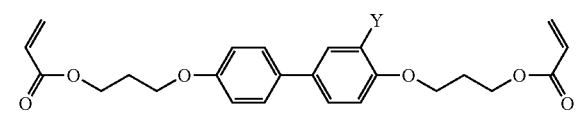

In the above-mentioned formula, X and Y is each a hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro.

Out of the compounds represented by the above-mentioned formula, the compounds of below-mentioned formulae can be presented as the specific compounds to be used preferably in this embodiment.

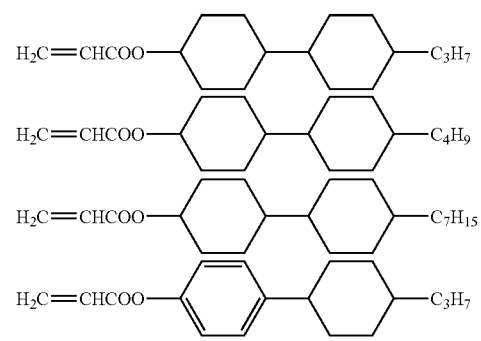

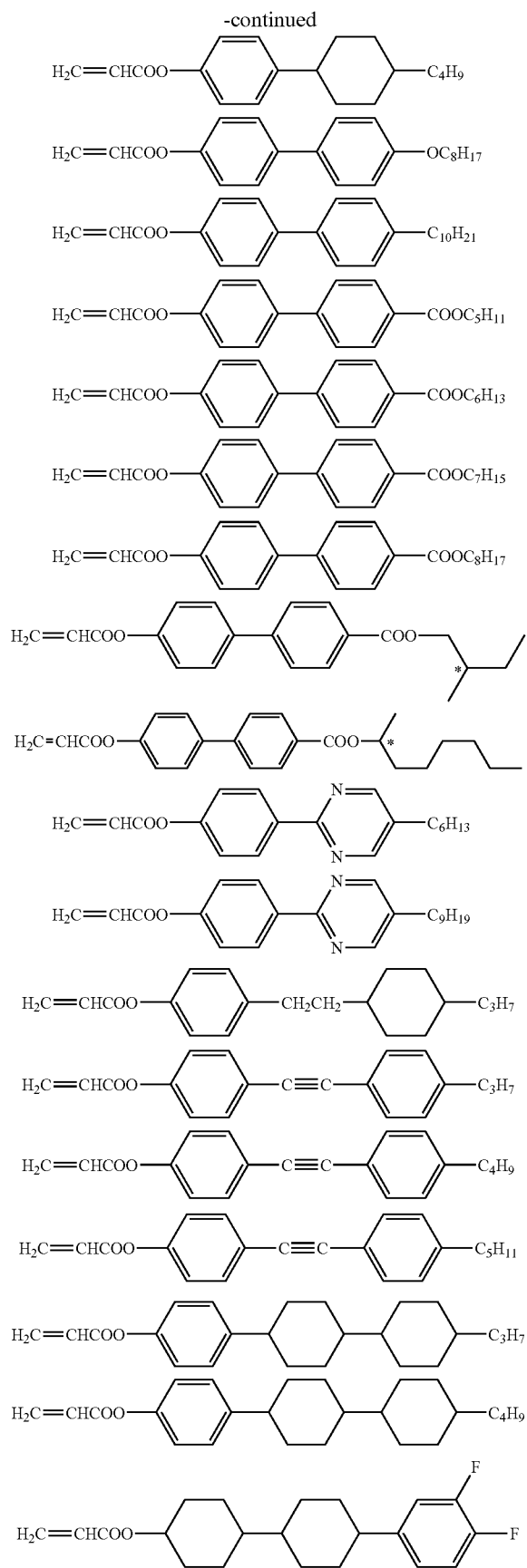

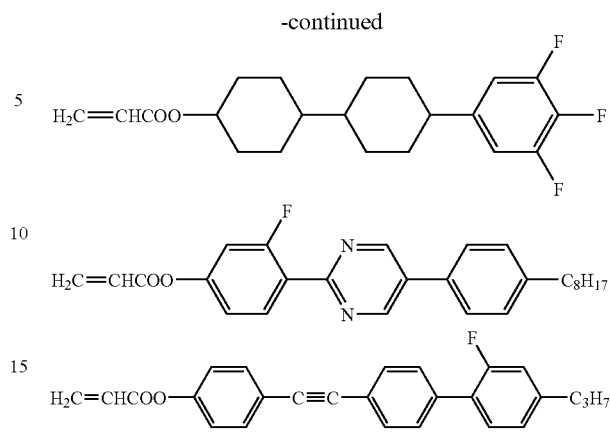

(Polymerized Product of a Polymerizable Monomer)

The polymerized product of the polymerizable monomer used in this embodiment may be a polymerized product of a single polymerizable monomer, or a polymerized product of two or more different polymerizable monomers. In the case of a polymerized product of two or more different polymerizable monomers, for example, a polymerized product of the above-mentioned ultraviolet curable liquid crystal monomer and another ultraviolet curable resin monomer can be presented.

In the case the above-mentioned ultraviolet curable liquid crystal monomer is used as the polymerizable monomer, the polymerized product of the polymerizable monomer used in this embodiment may be a main chain liquid crystalline polymerized product with the main chain showing the liquid crystalline property for an atomic group showing the liquid crystalline property provided in the main chain, or a side chain liquid crystalline polymerized product with the side chain showing the liquid crystalline property for an atomic group showing the liquid crystalline property provided in the side chain. In particular, in this embodiment, a side chain liquid crystalline polymerized product is preferable. Since an atomic group showing the liquid crystalline property is present in the side chain, the freedom of the atomic group becomes high so that the atomic group showing the liquid crystalline property in the liquid crystal layer can be aligned easily. Moreover, as a result, the alignment stability of the ferroelectric liquid crystal in the liquid crystal layer can be improved.

The presence amount of the polymerized product of the polymerizable monomer in the above-mentioned liquid crystal layer is not particularly limited as long as it is in a range capable of providing the sequence stability of the above-mentioned ferroelectric liquid crystal to a desirable degree. In general, it is preferably in a range of 0.5% by mass to 30% by mass in the liquid crystal layer, more preferably in a range of 1% by mass to 20% by mass, and particularly preferably in a range of 1% by mass to 10% by mass. In the case it is more than the above-mentioned range, increase of the driving voltage of the above-mentioned ferroelectric liquid crystal and the decline of the response speed may be generated. Moreover, in the case it is less than the above-mentioned range, due to the insufficiency of the sequence stability of the above-mentioned ferroelectric liquid crystal, the heat resistance and the impact resistance of the liquid crystal display of this embodiment may be deteriorated.

Here, the presence amount of the polymerized product of the polymerizable monomer in the liquid crystal layer can be calculated from the residual amount provided by measuring the weight of the residual polymerized product of the polymerizable monomer with an electron scale after washing the monomolecular liquid crystal in the liquid crystal layer with a solvent, and the total mass of the above-mentioned liquid crystal layer.

(3) Other Compounds

The liquid crystal layer used in this embodiment may contain other compounds in a range not to deteriorate the purpose of the present invention. As such a compound, an unreacted polymerizable monomer, a reaction initiating agent, a reaction inhibiting agent, or the like can be presented.

(4) Liquid Crystal Layer

The thickness of the above-mentioned liquid crystal layer is preferably in a range of 1.2 μm to 3.0 μm, more preferably 1.3 μm to 2.5 μm, and further preferably in a range of 1.4 μm to 2.0 μm. In the case the thickness of the liquid crystal layer is too thin, the contrast may be lowered. On the other hand, in the case the thickness of the liquid crystal layer is too thick, the ferroelectric liquid crystal may hardly be aligned.

(5) Method for Forming a Liquid Crystal Layer

As the method for forming a liquid crystal layer, a method commonly used as a method for manufacturing a liquid crystal cell can be used. For example, it can be formed by the method mentioned in the item of "A-2. Method for manufacturing a liquid crystal display of the first embodiment" to be described later.

4. Polarizing Plate

Next, the polarizing plate used in this embodiment will be explained. The polarizing plate in this embodiment is not particularly limited as long as it allows transmission only in a specific direction out of the wave motions of a light beam, and thus one commonly used as a polarizing plate for a liquid crystal display can be used.

5. Application of the Liquid Crystal Display

Next, the application of the liquid crystal display of this embodiment will be explained. It is preferable that the liquid crystal display of this embodiment is driven by the active matrix method using a thin film transistor (TFT). By further using the color filter system or the field sequential color system, a color liquid crystal display can be provided. In this embodiment, color display can be enabled by disposing a micro color filter on the TFT substrate side or the common electrode substrate side, however, by utilizing the high speed response property of the ferroelectric liquid crystal, color display by the field sequential color system can be enabled in combination with a LED light source without using a micro color filter. Moreover, since the liquid crystal display of this embodiment can align the ferroelectric liquid crystal without generating the alignment defect, a highly precise color display with a wide view angle and a high speed response property can be realized.

In particular, it is preferable that the liquid crystal display of this embodiment is displayed by the field sequential color system. As mentioned above, in the field sequential color system, one pixel is processed by time sharing so that a high speed response property is particularly needed for obtaining a preferable moving image display property.

In this case, as the ferroelectric liquid crystal, it is preferable to use a material having the mono-stability property of showing the chiral smectic C phase from the cholesteric phase without having the smectic A phase. Such a material has the inclination of the longer axis direction of the liquid crystal molecule at the time of applying a positive voltage and applying a negative voltage in the same direction so as to have the electro-optical property with the light transmittance with respect to the applied voltage provided unsymmetrically. The property is referred to in this specification as the half-V shaped switching (HV-shaped switching). Since a material showing the HV-shaped switching is used, the opening time as a black and white shutter can be provided for a sufficiently long time. Thereby, each color to be switched by time can be displayed further brightly so that a bright full color liquid crystal display can be realized.

In the case the above-mentioned ferroelectric liquid crystal shows the mono-stability, the liquid crystal display of this embodiment is driven basically by the active matrix system using a TFT, however, it can also be driven by the segment system.

6. Method for Manufacturing a Liquid Crystal Display

The method for manufacturing a liquid crystal display of this embodiment is not particularly limited, and for example it can be manufactured by a method mentioned in the item of "B. Method for manufacturing a liquid crystal display" to be described later.

A-2. Method for Manufacturing a Liquid Crystal Display of the First Embodiment

Next, a method for manufacturing a liquid crystal display of the first embodiment will be explained. The method for manufacturing a liquid crystal display of this embodiment comprising: a reactive liquid crystal side substrate having a first substrate, an electrode layer formed on the first substrate, a first alignment layer formed on the electrode layer, and a reactive liquid crystal layer with a reactive liquid crystal fixed and formed on the first alignment layer; and a counter substrate having a second substrate, an electrode layer formed on the second substrate, and a second alignment layer formed on the electrode layer, wherein the reactive liquid crystal layer of the reactive liquid crystal side substrate and the second alignment layer of the counter substrate are disposed to face each other such that a liquid crystal layer including a ferroelectric liquid crystal and a polymerized product of a polymerizable monomer is sandwiched between the reactive liquid crystal side substrate and the counter substrate, and the method comprising: a liquid crystal filling process of filling a liquid crystal layer forming composition including the ferroelectric liquid crystal and the polymerizable monomer between the reactive liquid crystal side substrate and the counter substrate; a liquid crystal aligning process of having the ferroelectric liquid crystal in the chiral smectic C phase state; and a polymerization process of polymerizing the polymerizable monomer with the ferroelectric liquid crystal in the chiral smectic C phase state.

According to this embodiment, since a liquid crystal layer is formed by filling a liquid crystal layer forming composition including the above-mentioned ferroelectric liquid crystal and the above-mentioned polymerizable monomer between the above-mentioned reactive liquid crystal side substrate and the above-mentioned counter substrate, and polymerizing the above-mentioned polymerizable monomer with the above-mentioned ferroelectric liquid crystal in the chiral smectic C phase state, a liquid crystal display capable of restraining generation of the alignment defects such as the zigzag defect, the hairpin defect and the double domains, and realizing the mono-stability operation mode using a ferroelectric liquid crystal can be manufactured.

Hereinafter, the method for manufacturing a liquid crystal display of this embodiment will be explained in detail.

1. Liquid Crystal filling Process

First, the liquid crystal filling process in this embodiment will be explained. The liquid crystal filling process in this embodiment is a process of filling a liquid crystal layer forming composition including the above-mentioned ferroelectric liquid crystal and the above-mentioned polymerizable monomer between a reactive liquid crystal side substrate and a counter substrate.

The above-mentioned reactive liquid crystal side substrate is formed in general by forming an electrode layer on a first substrate, then forming a first alignment layer on the electrode layer, and then forming a reactive liquid crystal layer on the first alignment layer. Moreover, the above-mentioned counter substrate is formed in general by forming an electrode layer on a second substrate, and then forming a second alignment layer on the electrode layer. Moreover, in the counter substrate used in this embodiment, a second reactive liquid crystal layer may be formed on the above-mentioned second alignment layer. Since the methods for forming such a reactive liquid crystal side substrate and a counter substrate are same as those explained in the above-mentioned items of "1. Reactive liquid crystal side substrate" and "2. Counter substrate" of "A-1. Liquid crystal display of the first embodiment", explanation is omitted here.

In this process, the method for filling a liquid crystal layer forming composition including the above-mentioned ferroelectric liquid crystal and the above-mentioned polymerizable monomer between the above-mentioned reactive liquid crystal side substrate and the above-mentioned counter substrate is not particularly limited. For example, it can be filled by having the ferroelectric liquid crystal in the above-mentioned liquid crystal layer forming composition as an isotropic liquid by heating the above-mentioned liquid crystal layer forming composition, and injecting the same into a liquid crystal cell produced preliminarily using are active liquid crystal side substrate and a counter substrate from the injection opening utilizing the capillary effect. In this case, the injection opening is sealed with an adhesive.

The liquid crystal layer forming composition used in this process includes a ferroelectric liquid crystal and a polymerizable monomer. Since the ferroelectric liquid crystal and the polymerizable monomer used for the above-mentioned liquid crystal layer forming composition are same as those mentioned in the above-mentioned item of "A-1. Liquid crystal display of the first embodiment 3. Liquid crystal layer", explanation is omitted here.

The amount of the polymerizable monomer included in the above-mentioned liquid crystal layer forming composition can be determined optionally according to the amount necessary for stabilizing the sequence of the above-mentioned ferroelectric liquid crystal after forming the liquid crystal layer. In particular, in this embodiment, it is preferably in a range of 0.5% by mass to 30% by mass in the liquid crystal layer forming composition, more preferably in a range of 1% by mass to 20% by mass, and particularly preferably in a range of 1% by mass to 10% by mass. In the case the content of the polymerizable monomer is more than the above-mentioned range, due to increase of the driving voltage of the ferroelectric liquid crystal after formation of the liquid crystal layer, the performance of the liquid crystal display to be manufactured by this embodiment may be deteriorated. Moreover, in the case it is less than the above-mentioned range, due to the insufficiency of the sequence stability of the ferroelectric liquid crystal, the heat resistance, and the impact resistance and the like of the liquid crystal display of this embodiment may be lowered.

The above-mentioned liquid crystal layer forming composition may contain a photo polymerization initiating agent. Particularly in the case of using an ultraviolet curable resin monomer as the above-mentioned polymerizable monomer, it is preferable to contain a photo polymerization initiating agent. Since the photo polymerization initiating agent to be used for the liquid crystal layer forming composition is same as those mentioned in the above-mentioned item of "A-1. Liquid crystal display of the first embodiment 1. Reactive liquid crystal side substrate", explanation is omitted here.

2. Liquid Crystal Aligning Process

Next, the liquid crystal aligning process in this embodiment will be explained. The liquid crystal aligning process in this embodiment is a process for having the ferroelectric liquid crystal in the liquid crystal layer forming composition filled between the above-mentioned reactive liquid crystal side substrate and the above-mentioned counter substrate in the chiral smectic C phase. In this process, the method for having the above-mentioned ferroelectric liquid crystal in the chiral smectic C phase is not particularly limited. However, there is generally used a method of having the chiral smectic C phase by heating the ferroelectric liquid crystal to the transition temperature from the chiral smectic C phase to the nematic phase or higher before or after the above-mentioned liquid crystal filling process, and cooling down the filled ferroelectric liquid crystal.

According to the method, first, the ferroelectric liquid crystal is heated to the transition temperature from the chiral smectic C phase to the nematic phase or higher. The temperature may be the transition temperature from the chiral smectic C phase to the nematic phase or higher, and in general the ferroelectric liquid crystal is heated so as to have the isotropic phase or the nematic phase. The specific temperature differs depending on the kind of the ferroelectric liquid crystal, and thus it can be selected optionally. The ferroelectric liquid crystal heating operation may be carried out before or after the above-mentioned liquid crystal filling process.

As to the operation of cooling down the heated ferroelectric liquid crystal, it is in general cooled down gradually to the room temperature (about 25° C.).

3. Polymerization Process

Next, the polymerization process in this embodiment will be explained. The polymerization process in this embodiment is a process of polymerizing the above-mentioned polymerizable monomer with the above-mentioned ferroelectric liquid crystal in the chiral smectic C phase state. In this process, the method for polymerizing the above-mentioned polymerizable monomer may be determined optionally according to the kind of the polymerizable monomer. For example, in the case an ultraviolet curable resin monomer is used as the polymerizable monomer, it can be polymerized by the ultraviolet ray irradiation.

The polymerization of the polymerizable monomer may be carried out in a state with a voltage applied to the liquid crystal layer or in a state without the voltage application. In this embodiment, it is preferable to carry it out without applying a voltage to the liquid crystal layer.

B-1. Liquid Crystal Display of the Second Embodiment

Next, a liquid crystal display of the second embodiment of the present invention will be explained. The liquid crystal display of this embodiment comprises: a first photo alignment treatment substrate having a first substrate, an electrode layer provided on the first substrate and a first photo alignment layer formed on the electrode layer; and a second photo alignment treatment substrate having a second substrate, an electrode layer provided on the second substrate, and a second photo alignment layer formed on the electrode layer, with the first photo alignment layer and the second photo alignment layer disposed facing each other so as to sandwich a liquid crystal layer including a ferroelectric liquid crystal and a polymerized product of a polymerizable monomer between the first photo alignment layer and the second photo alignment layer, wherein the constituent materials of the first photo alignment layer and the second photo alignment layer have different compositions.

Figure 3:
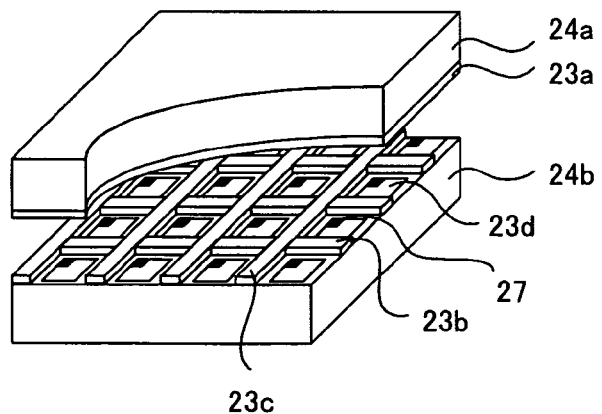
FIG. 3 is a schematic perspective view illustrating one example of a liquid crystal display of a second embodiment of the present invention.
Figure 4:
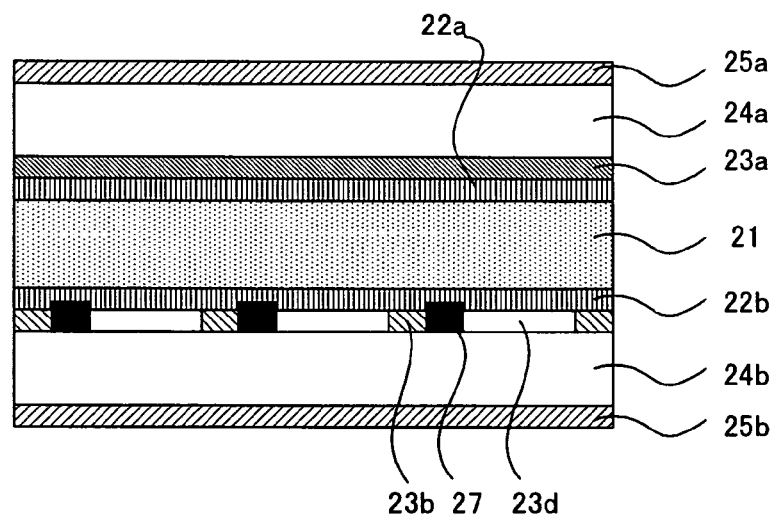
FIG. 4 is a schematic cross sectional view illustrating one example of a liquid crystal display of a second embodiment of the present invention.

The liquid crystal display of this embodiment will be explained with reference to the drawings. FIG. 3 is a schematic perspective view illustrating one example of a liquid crystal display of this embodiment, and FIG. 4 is a schematic cross-sectional view. As shown in FIGS. 3 and 4, a common electrode 23a is provided on a substrate 24a, and x electrodes 23b, y electrodes 23c and pixel electrodes 23d are provided on a counter substrate 24b, with photo alignment layers 22a and 22b formed inside a respective electrode layer comprising these electrodes. A liquid crystal layer including a ferroelectric liquid crystal and a polymerized product of a polymerizable monomer is sandwiched between the photo alignment layers 22a and 22b. In FIG. 3, the photo alignment layers 22a and 22b are omitted.

Polarizing plates 25a and 25b may be provided respective outside of the substrates 24a and 24b. Thereby, an incident light beam becomes a linear polarized light so that only a light beam polarized in the alignment direction of the liquid crystal molecules can be transmitted. The polarizing plates 25a and 25b are disposed with the polarizing directions twisted by 90°. Thereby, the bright state and the dark state can be produced by controlling the optical axis direction of the liquid crystal molecules in the voltage non applied state and the applied state, and the size of the birefringence, and using the ferroelectric liquid crystal molecules as a black and white shutter. For example, in the voltage non applied state, by disposing the polarizing plate 25a aligned with the liquid crystal molecule alignment, a light beam transmitted the polarizing plate 25a cannot have the polarizing direction rotated by 90° so as to be blocked by the polarizing plate 25b for providing the dark state. On the other hand, in the voltage applied state, the liquid crystal molecule direction is changed by the voltage so that the light polarizing direction becomes a circular polarized light by rotating from the initial state by an angle θ so as to transmit the polarizing plate 25b for providing the bright state. Then, by controlling the transmitted light amount by the applied voltage, the gray scale display can be enabled.

Since the liquid crystal display of this embodiment comprises a photo alignment layer each on the counter surface of the upper and lower substrates with the above-mentioned photo alignment layers provided using materials of different compositions with respect to the liquid crystal layer sandwiched therebetween, generation of the alignment defect such as the zigzag defect, the hairpin defect and the double domains can be restrained so that a mono-stability operation mode can be realized using a ferroelectric liquid crystal. The reason why a preferable alignment state can be obtained by using different compositions as the constituent materials of the photo alignment layers are not known, however, it is considered to be the difference of the interactions of each the upper and lower photo alignment layers with the ferroelectric liquid crystal. Accordingly, since the liquid crystal display of this embodiment utilizes the ferroelectric liquid crystal as a black and white shutter, the response speed can be made faster, and thus it is advantageous.

Moreover, for example as shown in FIG. 3, it is preferable that the liquid crystal display of this embodiment comprises one of the substrates as a TFT substrate with thin film transistors (TFT elements) disposed as a matrix and the other substrate as a common electrode substrate with a common electrode formed in the entire region in combination. The liquid crystal display of the active matrix system using such a TFT element will be explained hereafter.

In FIG. 3, one of the substrates has an electrode as the common electrode 23a so as to provide a common electrode substrate. On the other hand, the counter substrate comprises an electrode as the x electrodes 23b, the y electrodes 23c and the pixel electrodes 23d so as to provide a TFT substrate. In the liquid crystal display, the x electrodes 23b and y electrodes 23c are arranged vertically and laterally for operating the TFT elements 27 by applying a signal to the electrodes for driving the ferroelectric liquid crystal. Although it is not shown in the figure, the portions with the x electrodes 23b and the y electrodes 23c crossing with each other are insulated with an insulating layer so that the signal of the x electrodes 23b and the signal of the y electrodes 23c can be operated independently. The portions surrounded by the x electrodes 23b and the y electrodes 23c are each a pixel as the minimum unit for driving the liquid crystal display of this embodiment, with at least one TFT element 27 and at least one pixel electrode 23d are formed in each pixel. In the liquid crystal display of this embodiment, by successively applying a signal voltage to the x electrodes 23b and the y electrodes 23c, the TFT element 27 of each pixel can be operated.

Furthermore, the liquid crystal display of this embodiment can be used also as a color liquid crystal display by forming a micro color filter with the TFT elements 27 disposed as a matrix between the common electrode 23a and substrate 24a. Each constituent material of the liquid crystal display of this embodiment will be explained in detail hereafter.

1. Configuration of the Liquid Crystal Display (1) Photo Alignment Layer

The photo alignment layer has the liquid crystal molecule on the layer aligned by providing the anisotropy to a layer obtained by directing a light beam with the polarization controlled to a substrate coated with the constituent materials of the photo alignment layer to be described later so as to generate the photo-excitation reaction (decomposition, isomerization, dimerization).

Moreover, in the photo alignment layer used in this embodiment, the constituent materials of the above-mentioned first photo alignment layer and the above-mentioned second photo alignment layer have compositions different from each other.

The constituent material of the photo alignment layer used in the embodiment is not limited to any especial kind if the material has an effect of generating photo-excited reaction by the light irradiation to align the ferroelectric liquid crystal thereon (photo aligning). Such a material can be roughly classified into a photo-isomerizable type, in which only the shape of the molecule thereof changes so that the alignment thereof can reversibly change, and a photoreactive type, in which the molecule itself thereof changes. In the embodiment, the constituent materials of the first and second photo alignment layers are not limited to any especial material if the compositions of the materials are different from each other. Thus, it is permissible to combine a material of the photoreactive type with that of the photo-isomerizable type, or use either of a material of the photoreactive type or that of the photo-isomerizable type to make the compositions of the upper and lower photo alignment layers different.

In particular, it is preferable that a constituent material for the above-mentioned first photo alignment layer is a photoreactive type material to exhibit an anisotropy to the above-mentioned photo alignment layer by generating a photoreaction, and a constituent material for the above-mentioned second photo alignment layer is a photo-isomerization type material including a photo-isomerization-reactive compound to exhibit the anisotropy to the above-mentioned photo alignment layer by generating a photo-isomerization reaction (first embodiment).

Moreover, the constituent materials for the first photo alignment layer and the second photo alignment layer may be a photoreactive type material to exhibit an anisotropy to the above-mentioned first photo alignment layer and the above-mentioned second photo alignment layer by generating a photoreaction (second embodiment). The use of the combination of such materials makes it possible to make higher the power for controlling the alignment of the ferroelectric liquid crystal.

The wavelength range of light which causes photo-excited reaction in the constituent materials of the photo alignment layers is preferably within the wavelength range of ultraviolet rays, that is, the range of 10 to 400 nm, more preferably within the range of 250 to 380 nm.

Hereinafter, the first alignment layer and the second alignment layer in the first embodiment and the second embodiment will be explained, respectively.

a. First Embodiment

In the first embodiment, a constituent material for the above-mentioned first photo alignment layer is a photoreactive type material to exhibit an anisotropy to the above-mentioned photo alignment layer by generating a photoreaction, and a constituent material for the above-mentioned second photo alignment layer is a photo-isomerization type material including a photo-isomerization-reactive compound to exhibit the anisotropy to the above-mentioned photo alignment layer by generating a photo-isomerization reaction.

(First Photo Alignment Layer)

As described above, the first photo alignment layer used in the embodiment is preferably a photoreactive material which generates photoreaction to give anisotropy to the photo alignment layer.

The photoreaction is not limited to any especial kind if the reaction can change the molecule itself by the light irradiation to supply anisotropy to the photo aligning of the photo alignment layer. Photo-dimerization reaction or photo-decomposition reaction is more preferable since the supply of the anisotropy to the photo alignment layer becomes easier. This reaction makes it possible to give anisotropy to the photo alignment layer in the state that the molecule chain aligned in the direction perpendicular to the polarization direction remains. Examples of the photoreactive material using the photo-decomposition reaction include a polyimide "RN 1199" manufactured by NISSAN CHEMICAL INDUSTRIES, LTD. It is more preferable in the embodiment to use, out of these photoreactive materials, materials which give anisotropy to the photo alignment layer by the photo-dimerization reaction since the materials are high in exposure sensitivity and the scope of material-selection is wide.

Here, since the above-mentioned "photo-dimerization reaction" and the above-mentioned "photo-decomposition reaction" are same as those explained in the above-mentioned item of "A-1. Liquid crystal display of the first embodiment", explanation is omitted here.

The photoreactive material using photo-dimerization reaction is not limited to any especial kind if the material can give anisotropy to the photo alignment layer by photo-dimerization reaction.

Here, since the above-mentioned photoreactive type material used in this embodiment is same as that mentioned in the above-mentioned item of "A-1. Liquid crystal display of the first embodiment", explanation is omitted here.

Moreover, since the photo alignment treatment method is also same as that mentioned in the above-mentioned item of "A-1. Liquid crystal display of the first embodiment", explanation is omitted here.

(Second Photo Alignment Layer)

The following will describe the second photo alignment layer used in the first embodiment. As described above, the second photo alignment layer used in this embodiment is preferably a photo-isomerizable material comprising a photo-isomerization-reactive compound which generates photo-isomerization reaction to give anisotropy to the photo alignment layer.

Here, the "photo-isomerization reaction" means a phenomenon that a single compound is changed into some other isomer by the light irradiation. The use of such a photo-isomerization-reactive material makes it possible to increase a stable isomer from plural isomers by the light irradiation, whereby anisotropy can easily be given to the photo alignment layer.

The photo-isomerization-reactive compound is not limited to any especial kind if the compound is a material capable of giving anisotropy to the photo alignment layer by photo-isomerization reaction.

Since the photo-isomerization-reactive compound used in this embodiment is same as that mentioned in the above-mentioned item of "A-1. Liquid crystal display of the first embodiment", explanation is omitted here.

Moreover, since the photo alignment treatment method is also same as that mentioned in the above-mentioned item of "A-1. Liquid crystal display of the first embodiment", explanation is omitted here.

b. Second Embodiment

In the second embodiment, the constituent materials for the above-mentioned first photo alignment layer and the above-mentioned second photo alignment layer are a photoreactive type material to exhibit an anisotropy to the first photo alignment layer and the second photo alignment layer by generating a photoreaction.

Since the photoreactive type material preferably used as the constituent materials for the first photo alignment layer and the second photo alignment layer is same as that described in the "first photo alignment layer" of the first embodiment, explanation is omitted here. In this embodiment, it is preferable that either one of the first photo alignment layer and the second photo alignment layer is made of a photoreactive type material to exhibit an anisotropy by generating a photo-dimerization reaction. According to the photo alignment layer configuration, since the ferroelectric liquid crystal can be aligned without generating the alignment defects such as the zigzag defect and the hairpin defect, a liquid crystal display showing a mono-stability operation mode can be provided. As the configuration of such a photo alignment layer, for example, the configuration wherein the constituent material for the first photo alignment layer is a photoreactive type material to exhibit an anisotropy to the above-mentioned photo alignment layer by generating the photo-dimerization reaction, and the constituent material for the second photo alignment layer is a photoreactive type material to exhibit an anisotropy to the above-mentioned photo alignment layer by generating the photo-decomposition reaction, and the configuration wherein the constituent materials for the first photo alignment layer and the second photo alignment layer are a photoreactive type material to exhibit an anisotropy to the above-mentioned photo alignment layer by generating the photo-dimerization reaction, can be presented.

In this embodiment, in the case of the configuration wherein the constituent materials for the first photo alignment layer and the second photo alignment layer are a photoreactive type material to exhibit an anisotropy to the above-mentioned photo alignment layer by generating the photo-dimerization reaction, the photo-dimerization reactive portions of the photo-dimerization reactive compounds used for the first photo alignment layer and the second photo alignment layer may either be same or different. Moreover, as the photo-dimerization reactive compound, the above-mentioned compounds may be used as a combination of two or more kinds. In this case, the composition of the photo alignment layer can be changed also by changing the combination. Furthermore, in the case of using the same combination, the compositions of the upper and lower photo alignment layers can be different also by changing the addition amounts of each compound, changing the kind of the additive, or the like.

Since the method for forming the first photo alignment layer and the second photo alignment layer, and the photo alignment treatment method are same as the items described in the "photo alignment layer" of the above-mentioned first embodiment, explanation is omitted here.

(2) Liquid Crystal Layer

Next, the liquid crystal layer used in this embodiment will be explained. The liquid crystal layer in this embodiment includes a ferroelectric liquid crystal and a polymerized product of a polymerizable monomer, and it is supported between the above-mentioned first photo alignment layer and the above-mentioned second photo alignment layer.

a. Ferroelectric Liquid Crystal

The ferroelectric liquid crystal used for the above-mentioned liquid crystal layer is not particularly limited as long as it realizes the chiral smectic C phase (SmC*).

Here, since the ferroelectric liquid crystal used in this embodiment is same as that mentioned in the above-mentioned "A-1. Liquid crystal display of the first embodiment", explanation is omitted here.

b. Polymerized Product of a Polymerizable Monomer

The polymerized product of a polymerizable monomer included in the above-mentioned liquid crystal layer has the function of stabilizing the sequence of the above-mentioned ferroelectric liquid crystal in the liquid crystal layer.

Here, since the polymerizable monomer and the polymerized product of a polymerizable monomer are same as those mentioned in the above-mentioned item of "A-1. Liquid crystal display of the first embodiment", explanation is omitted here.

c. Other Compounds

The liquid crystal layer used in this embodiment may contain other compounds in a range not to deteriorate the purpose of the present invention. As such a compound, an unreacted polymerizable monomer, a reaction initiating agent, a reaction inhibiting agent, or the like can be presented.

d. Liquid Crystal Layer

The thickness of the above-mentioned liquid crystal layer is preferably in a range of 1.2 µm to 3.0 µm, more preferably 1.3 µm to 2.5 µm, and further preferably in a range of 1.4 µm to 2.0 µm. In the case the thickness of the liquid crystal layer is too thin, the contrast may be lowered. On the other hand, in the case the thickness of the liquid crystal layer is too thick, the ferroelectric liquid crystal may hardly be aligned.

e. Method for Forming a Liquid Crystal Layer

As the method for forming a liquid crystal layer, a method commonly used as a method for manufacturing a liquid crystal cell can be used. For example, it can be formed by the method mentioned in the item of "B-2. Method for manufacturing a liquid crystal display of the second embodiment" to be described later.

(3) Substrate

The substrate used in this embodiment is not particularly limited as long as it is generally used as a substrate for a liquid crystal display. For example, a glass plate and a plastic plate can be presented preferably. The surface roughness (RSM value) of the above-mentioned substrate is preferably 10 nm or less, more preferably 3 nm or less, even more preferably 1 nm or less. The surface roughness can be measured with an atomic force microscope (AFM) in this embodiment.

(4) Electrode Layer

The electrode layer used in this embodiment is not particularly limited as long as it is generally used as an electrode layer for a liquid crystal display.

Here, since the electrode layer used in this embodiment is same as that mentioned in the above-mentioned item of "A-1. Liquid crystal display of the first embodiment", explanation is omitted here.

(5) Polarizing Plate

The polarizing plate used in this embodiment will be explained. The polarizing plate in this embodiment is not particularly limited as long as it allows transmission only in a specific direction out of the wave motions of a light beam, and thus one commonly used as a polarizing plate for a liquid crystal display can be used.

2. Application of the Liquid Crystal Display

The liquid crystal display of this embodiment can be used as a color liquid crystal display by adopting the color filter system or the field sequential color system. According to a color liquid crystal display using the liquid crystal display of this embodiment, since the ferroelectric liquid crystal can be aligned without generating the alignment defects such as the zigzag defect and the hairpin defect, decline of the contrast ratio due to the light leakage can be prevented. Moreover, since the ferroelectric liquid crystal in the liquid crystal display of this embodiment shows the mono-stability, the gray scale display by the analog modulation can be enabled so as to realize a highly precise color display having a wide view angle and a high speed response property. In particular, it is preferable that the liquid crystal display of this embodiment is displayed by the field sequential color system. By using the field sequential color system, a bright color display can be obtained at a low power consumption and a low cost.

3. Method for Manufacturing the Liquid Crystal Display

The method for manufacturing the liquid crystal display of this embodiment is not particularly limited, and for example it can be manufactured by the method mentioned in the item of "B-2. Method for manufacturing the liquid crystal display of the second embodiment" to be described later.

B-2. Method for Manufacturing the Liquid Crystal Display of the Second Embodiment Next, a method for manufacturing the liquid crystal display of the second embodiment of the present invention will be explained. The method for manufacturing a liquid crystal display of this embodiment comprising: a first photo alignment treatment substrate having a first substrate, an electrode layer formed on the first substrate, and a first photo alignment layer formed on the electrode layer; and a second photo alignment treatment substrate having a second substrate, an electrode layer formed on the second substrate, and a second photo alignment layer formed on the electrode layer, wherein the first photo alignment layer and the second photo alignment layer are disposed to face each other such that a liquid crystal layer including a ferroelectric liquid crystal and a polymerized product of a polymerizable monomer is sandwiched between the first photo alignment layer and the second photo alignment layer, and the method comprising: a liquid crystal filling process of filling a liquid crystal layer forming composition including the ferroelectric liquid crystal and the polymerizable monomer between the first photo alignment treatment substrate and the second photo alignment treatment substrate; a liquid crystal aligning process of having the ferroelectric liquid crystal in the chiral smectic C phase state; and a polymerization process of polymerizing the polymerizable monomer with the ferroelectric liquid crystal in the chiral smectic C phase state.

According to this embodiment, since a liquid crystal layer is formed by filling a liquid crystal layer forming composition including the above-mentioned ferroelectric liquid crystal and the above-mentioned polymerizable monomer between the above-mentioned first and second photo alignment treatment substrates, and polymerizing the polymerizable monomer with the ferroelectric liquid crystal in the chiral smectic C phase state, a liquid crystal display capable of restraining generation of the alignment defects such as the zigzag defect, the hairpin defect and the double domains, and realizing the mono-stability operation mode using a ferroelectric liquid crystal can be manufactured.

Hereinafter, the method for manufacturing a liquid crystal display of this embodiment will be explained in detail.

1. Liquid Crystal Filling Process

First, the liquid crystal filling process in this embodiment will be explained. The liquid crystal filling process in this embodiment is a process of filling a liquid crystal layer forming composition including the above-mentioned ferroelectric liquid crystal and the above-mentioned polymerizable monomer between the first alignment layer of the first photo alignment treatment substrate and the second alignment layer of the second photo alignment treatment substrate.

The above-mentioned first photo alignment treatment substrate is formed in general by forming an electrode layer on a first substrate, and then forming a first alignment layer on the electrode layer. Moreover, the above-mentioned second photo alignment treatment substrate is formed in general by forming an electrode layer on a second substrate, and then forming a second alignment layer on the electrode layer. Since the methods for forming the first photo alignment treatment substrate and the second photo alignment treatment substrate are same as those mentioned in the above-mentioned item of "B-1. Liquid crystal display of the second embodiment 1. Configuration of the liquid crystal display", explanation is omitted here.

Moreover, in this process, since the method for filling a liquid crystal layer forming composition including the above-mentioned ferroelectric liquid crystal and the above-mentioned polymerizable monomer between the above-mentioned first photo alignment treatment substrate and the above-mentioned second photo alignment treatment substrate is also same as that mentioned in the above-mentioned item of "A-2. Method for manufacturing the liquid crystal display of the first embodiment", explanation is omitted here.

The liquid crystal layer forming composition used in this process includes a ferroelectric liquid crystal and a polymerizable monomer. Since the ferroelectric liquid crystal and the polymerizable monomer used for the above-mentioned liquid crystal layer forming composition is same as that mentioned in the above-mentioned item of "B-1. Liquid crystal display of the second embodiment 1. Configuration of the liquid crystal display", explanation is omitted here.

The amount of the above-mentioned polymerizable monomer included in the above-mentioned liquid crystal layer forming composition can be determined optionally according to the amount necessary for stabilizing the sequence of the above-mentioned ferroelectric liquid crystal after forming the liquid crystal layer. In particular, in this embodiment, it is preferably in a range of 0.5% by mass to 30% by mass in the liquid crystal layer forming composition, more preferably in a range of 1% by mass to 20% by mass, and particularly preferably in a range of 1% by mass to 10% by mass. In the case the content of the polymerizable monomer is more than the above-mentioned range, due to increase of the driving voltage of the ferroelectric liquid crystal after formation of the liquid crystal layer, the performance of the liquid crystal display to be manufactured by this embodiment may be deteriorated. Moreover, in the case it is less than the above-mentioned range, due to the insufficiency of the sequence stability of the ferroelectric liquid crystal, the heat resistance, the impact resistance and the like of the liquid crystal display of this embodiment may be lowered.

The liquid crystal layer forming composition may contain a photo polymerization initiating agent. Particularly in the case of using an ultraviolet curable resin monomer as the above-mentioned polymerizable monomer, it is preferable to contain a photo polymerization initiating agent. Moreover, in the case of using a photo polymerization initiating agent, it is preferable to use a photo polymerization initiating auxiliary agent in combination.

Here, since the photo polymerization initiating agent and the photo polymerization initiating auxiliary agent used in this embodiment are same as those mentioned in the above-mentioned item of "A-1. Liquid crystal display of the first embodiment", explanation is omitted here.

2. Liquid Crystal Aligning Process

Next, the liquid crystal aligning process in this embodiment will be explained. The liquid crystal aligning process in this embodiment is a process for having the ferroelectric liquid crystal in the liquid crystal layer forming composition filled between the above-mentioned first photo alignment treatment substrate and the above-mentioned second photo alignment treatment substrate in the chiral smectic C phase.

Here, since the method for having the above-mentioned ferroelectric liquid crystal in the chiral smectic C phase in this process is same as the method mentioned in the above-mentioned item of "A-2. Method for manufacturing the liquid crystal display of the first embodiment", explanation is omitted here.

3. Polymerization Process

Next, the polymerization process in this embodiment will be explained. The polymerization process in this embodiment is a process of polymerizing the above-mentioned polymerizable monomer with the above-mentioned ferroelectric liquid crystal in the chiral smectic C phase state.

Here, since the method for polymerizing the polymerizable monomer in this process is same as the method mentioned in the above-mentioned item of "A-2. Method for manufacturing the liquid crystal display of the first embodiment", explanation is omitted here.

C-1. Liquid Crystal Display of the Third Embodiment

Next, a liquid crystal display of the third embodiment will be explained. A liquid crystal display of this embodiment comprises a liquid crystal layer including a ferroelectric liquid crystal and a polymerized product of a polymerizable monomer sandwiched between two substrates, with an electrode and a photo alignment layer formed successively each on the counter surfaces of the substrates, wherein the respective constituent material for each the photo alignment layer is a photo-isomerization type material including a photo-isomerization-reactive compound to exhibit an anisotropy to the photo alignment layer by generating the photo-isomerization reaction, and the constituent materials for the photo alignment layers are different compositions with respect to the liquid crystal layer sandwiched therebetween.

Figure 5:
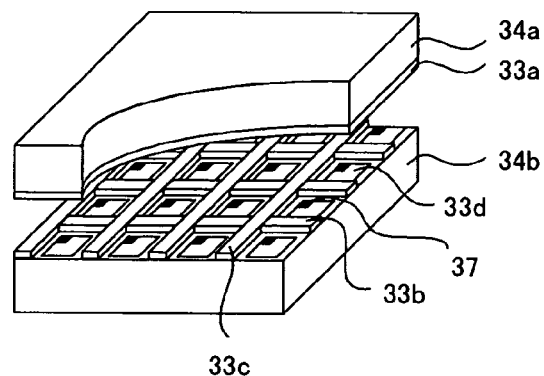
FIG. 5 is a schematic perspective view illustrating one example of a liquid crystal display of a third embodiment of the present invention.
Figure 6:
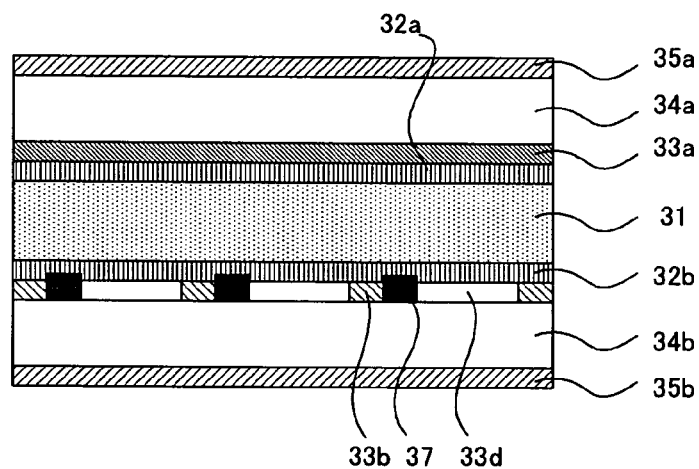
FIG. 6 is a schematic cross sectional view illustrating one example of a liquid crystal display of a third embodiment of the present invention.
Figure 7:
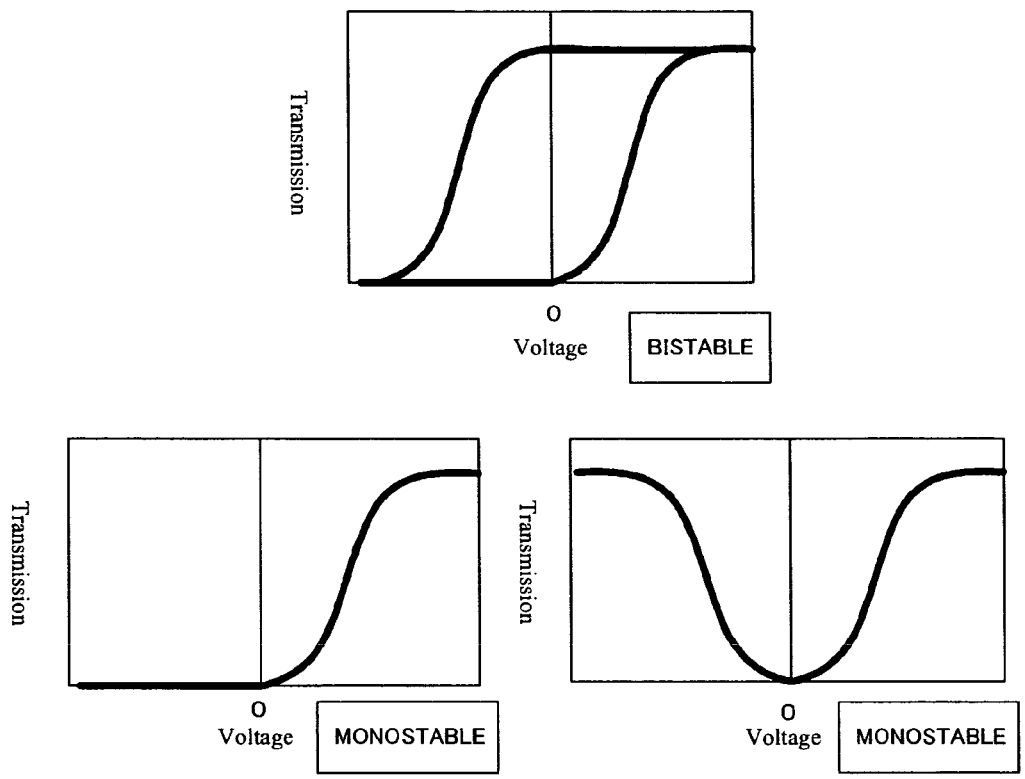
FIG. 7 is a graph showing changes in transmission as a function of voltage applied to ferroelectric liquid crystals.
Figure 8:
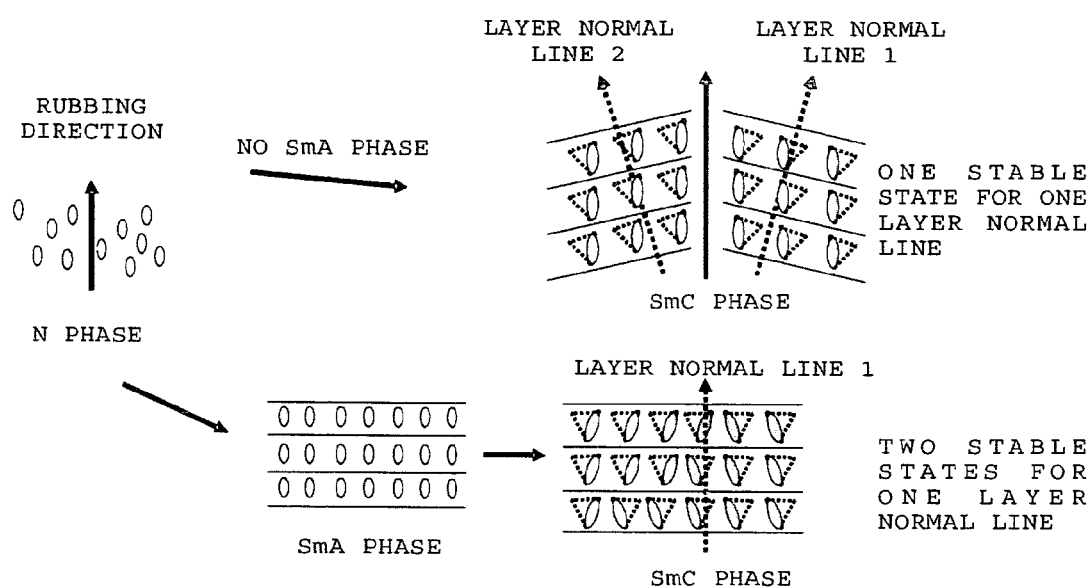
FIG. 8 is a view illustrating a difference of alignment defects based on a difference of the phase sequence that ferroelectric liquid crystal has.
Figure 9:
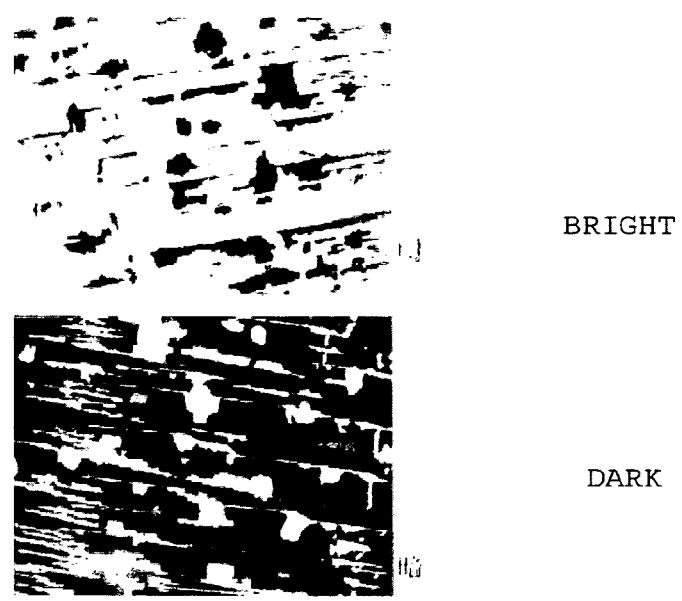
FIG. 9 is a photograph showing double domains which are alignment defects of ferroelectric liquid crystal.

The liquid crystal display of this embodiment will be explained with reference to the drawings. FIG. 5 is a schematic perspective view illustrating one example of a liquid crystal display of this embodiment, and FIG. 6 is a schematic cross-sectional view. As shown in the figures, a common electrode 33a is provided on a substrate 34a, and x electrodes 33b, y electrodes 33c and pixel electrodes 33d are provided on a counter substrate 34b, with photo alignment layers 32a and 32b formed inside of a respective electrode layer comprising these electrodes. A liquid crystal layer including a ferroelectric liquid crystal and a polymerized product of a polymerizable monomer is supported between the above-mentioned photo alignment layers 32a and 32b. In FIG. 5, the photo alignment layers 32a and 32b are omitted.

Polarizing plates 35a and 35b may be provided outside of the respective substrates 34a and 34b. Thereby, an incident light beam becomes a linear polarized light so that only a light beam polarized in the alignment direction of the liquid crystal molecules can be transmitted. The polarizing plates 35a and 35b are disposed with the polarizing directions twisted by 90°. Thereby, the bright state and the dark state can be produced by controlling the optical axis direction of the liquid crystal molecules in the voltage non applied state and the applied state, and the size of the birefringence, and using the ferroelectric liquid crystal molecules as a black and white shutter. For example, in the voltage non applied state, by disposing the polarizing plate 35a aligned with the liquid crystal molecule alignment, a light beam transmitted the polarizing plate 35a cannot have the polarizing direction rotated by 90° so as to be blocked by the polarizing plate 35b for providing the dark state. On the other hand, in the voltage applied state, the liquid crystal molecule direction is changed by the voltage so that the light polarizing direction becomes from a linear polarized light to a circular polarized light by rotating from the initial state by an angle θ so as to transmit the polarizing plate 35b for providing the bright state. Then, by controlling the transmitted light amount by the applied voltage, the gray scale display can be enabled.

Since the liquid crystal display of this embodiment comprises a photo alignment layer each on the counter surface of the upper and lower substrates, the constituent material for the above-mentioned photo alignment layer is a photo-isomerization type material including a photo-isomerization-reactive compound to exhibit an anisotropy to the above-mentioned photo alignment layer by generating the photo-isomerization reaction, and the above-mentioned photo alignment layers are provided using materials of different compositions with respect to the liquid crystal layer sandwiched therebetween in this embodiment, generation of the alignment defect such as the zigzag defect, the hairpin defect and the double domains can be restrained so that a mono domain alignment of the ferroelectric liquid crystal can be obtained. Moreover, since this embodiment is for aligning the ferroelectric liquid crystal without using the electric field induced technique in this embodiment, it is advantageous in that the alignment disturbance caused by the temperature rise to the phase transition point or higher, which is problematic in the electric field induced technique, can hardly be generated so as to provide the excellent alignment stability. The reason why a preferable alignment state can be obtained by using different compositions as the constituent materials of the photo alignment layers are not known, however, it is considered to be the difference of the interactions of each the upper and lower photo alignment layers with the ferroelectric liquid crystal. Accordingly, since the liquid crystal display of this embodiment utilizes the ferroelectric liquid crystal as a black and white shutter, the response speed can be made faster, and thus it is advantageous.

Moreover, for example as shown in FIG. 5, it is preferable that the liquid crystal display of this embodiment comprises one of the substrates as a TFT substrate with thin film transistors (TFT) 37 disposed as a matrix and the other substrate as a common electrode substrate with a common electrode 33a formed in the entire region in combination. The liquid crystal display of the active matrix system using such a TFT element will be explained hereafter.

In FIG. 5, one of the substrates has an electrode as the common electrode 33a so as to provide a common electrode substrate. On the other hand, the counter substrate comprises an electrode as the x electrodes 33b, the y electrodes 33c and the pixel electrodes 33d so as to provide a TFT substrate. In the liquid crystal display, the x electrodes 33b and y electrodes 33c are arranged vertically and laterally for operating the TFT elements 37 by applying a signal to the electrodes for driving the ferroelectric liquid crystal. Although it is not shown in the figure, the portions with the x electrodes 33b and the y electrodes 33c crossing with each other are insulated with an insulating layer so that the signal of the x electrodes 33b and the signal of the y electrodes 33c can be operated independently. The portions surrounded by the x electrodes 33b and the y electrodes 33c are each a pixel as the minimum unit for driving the liquid crystal display of this embodiment, with at least one TFT element 37 and at least one pixel electrode 33d are formed in each pixel. In the liquid crystal display of this embodiment, by successively applying a signal voltage to the x electrodes 33b and the y electrodes 33c, the TFT element 37 of each pixel can be operated.

Furthermore, the liquid crystal display of this embodiment can be used also as a color liquid crystal display by forming a micro color filter with the TFT elements 37 disposed as a matrix between the above-mentioned common electrode 33a and substrate 34a. Each constituent material of the liquid crystal display of this embodiment will be explained in detail hereafter.

1. Configuration of the Liquid Crystal Display (1) Photo Alignment Layer

The photo alignment layer has the liquid crystal molecule on the layer aligned by providing the anisotropy to a layer obtained by directing a light beam with the polarization controlled to a substrate coated with the constituent materials of the photo alignment layer to be described later so as to generate the photo-isomerization reaction.

Moreover, the photo alignment layers used in this embodiment have different compositions with respect to the liquid crystal layer sandwiched therebetween to be described later.

The photo alignment layers used in this embodiment have the effect of aligning the ferroelectric liquid crystal by generating the photo-isomerization reaction by directing a light beam (photo aligning). The constituent material of the photo alignment layer used in this embodiment is not particularly limited as long as it is a photo-isomerization type material including a photo-isomerization-reactive compound to exhibit an anisotropy to the above-mentioned photo alignment layer by generating the photo-isomerization reaction.

Here, since the photo-isomerization type material used in this embodiment is same as that mentioned in the above-mentioned item of "A-1. Liquid crystal display of the first embodiment", explanation is omitted here.

In this embodiment, the photo alignment layers have different compositions with respect to the liquid crystal layer sandwiched therebetween to be described later. In this embodiment, for example, by selecting different compounds as the photo-isomerization-reactive compound, the compositions of the upper and lower photo alignment layers can be different. Moreover, the compositions can also be changed by changing the addition amounts of the additives in the photo alignment layers.

Since the photo alignment treatment method for the photo alignment layers used in this embodiment is same as the method mentioned in the above-mentioned item of "A-1. Liquid crystal display", explanation is omitted here.

(2) Liquid Crystal Layer

The liquid crystal layer used in this embodiment includes a ferroelectric liquid crystal and a polymerized product of a polymerizable monomer, and it is supported by the above-mentioned photo alignment layers.

a. Ferroelectric Liquid Crystal

The ferroelectric liquid crystal used for the above-mentioned liquid crystal layer is not particularly limited as long as it realizes the chiral smectic C phase (SmC*), however, it is preferably a material with the phase sequence of the ferroelectric liquid crystal having the phase change of the cholesteric phase (Ch)-chiral smectic C phase (SmC*) without having the smectic A phase (SmA).

It is preferable that the liquid crystal display of this embodiment is driven by the active matrix method using a thin film transistor (TFT). By further using the color filter system or the field sequential color system, a color liquid crystal display can be provided. In this case, as the ferroelectric liquid crystal, a material having the phase change of the Ch phase-SmA phase-SmC* phase can be used, or a material having the phase change of the Ch phase-SmC* phase without having the SmA phase can be used. Particularly in the case the liquid crystal display of this embodiment is displayed by the field sequential color system, it is preferable to use a liquid crystal material showing the mono-stability without having the SmA phase. In particular, those of the half V-shape drive with the liquid crystal molecules operated only at the time of applying a positive or negative voltage are preferable in terms of having a long opening time of a black and white shutter so as to realize a bright color display.

Here, since "show the mono-stability" mentioned above is same as the content explained in the above-mentioned item of "A-1. Liquid crystal display of the first embodiment", explanation is omitted here.

As the ferroelectric liquid crystal used in this embodiment, specifically, "R2301" commercially available from AZ Electronic Materials can be presented.

b. Polymerized Product of a Polymerizable Monomer

The polymerized product of a polymerizable monomer included in the above-mentioned liquid crystal layer has the function of stabilizing the sequence of the above-mentioned ferroelectric liquid crystal in the liquid crystal layer.

Here, since the polymerizable monomer and the polymerized product of a polymerizable monomer are same as those mentioned in the above-mentioned item of "A-1. Liquid crystal display of the first embodiment", explanation is omitted here.

c. Other Compounds

The liquid crystal layer used in this embodiment may contain other compounds in a range not to deteriorate the purpose of the present invention. As such a compound, an unreacted polymerizable monomer, a reaction initiating agent, a reaction inhibiting agent, or the like can be presented.

d. Liquid Crystal Layer

The thickness of the above-mentioned liquid crystal layer is preferably in a range of 1.2 μm to 3.0 μm, more preferably 1.3 μm to 2.5 μm, and further preferably in a range of 1.4 μm to 2.0 μm. In the case the thickness of the liquid crystal layer is too thin, the contrast may be lowered. On the other hand, in the case the thickness of the liquid crystal layer is too thick, the ferroelectric liquid crystal may hardly be aligned.

e. Method for Forming a Liquid Crystal Layer

As the method for forming a liquid crystal layer, a method commonly used as a method for manufacturing a liquid crystal cell can be used. For example, it can be formed by the method mentioned in the item of "C-2. Method for manufacturing a liquid crystal display of the third embodiment" to be described later.

(3) Substrate

The substrate used in this embodiment is not particularly limited as long as it is generally used as a substrate for a liquid crystal display. Here, since the substrate used in this embodiment is same as that mentioned in the above-mentioned item of "B-1. Liquid crystal display of the second embodiment", explanation is omitted here.

(4) Electrode

The electrode used in this embodiment is not particularly limited as long as it is generally used as an electrode for a liquid crystal display.

Here, since the electrode layer used in this embodiment is same as that mentioned in the above-mentioned item of "B-1. Liquid crystal display of the second embodiment", explanation is omitted here.

(5) Polarizing Plate

The polarizing plate used in this embodiment will be explained. The polarizing plate in this embodiment is not particularly limited as long as it allows transmission only in a specific direction out of the wave motions of a light beam, and thus one commonly used as a polarizing plate for a liquid crystal display can be used.

2. Application of the Liquid Crystal Display

The liquid crystal display of this embodiment can be used as a color liquid crystal display by adopting the color filter system or the field sequential color system. Since the color liquid crystal display using the liquid crystal display of this embodiment can align the ferroelectric liquid crystal without generating the alignment defects, such as the double domains, a highly precise color display with a wide view angle and a high speed response property can be realized.

In particular, it is preferable that the liquid crystal display of this embodiment is displayed by the field sequential color system. As mentioned above, in the field sequential color system, one pixel is processed by time sharing so that a high speed response property is particularly needed for obtaining a preferable moving image display property.

In this case, as the ferroelectric liquid crystal, it is preferable to use a material having the mono-stability of showing the SmC* phase from the Ch phase without having the SmA phase. In particular, it is preferable to use a material of the half-V shaped drive with the liquid crystal molecules operated only at the time of applying a positive or negative voltage. Since a material of the half V-shaped drive is used, the light leakage at the time of the dark operation (at the time of opening a black and white shutter) can be reduced so that the opening time as a black and white shutter can be provided for a sufficiently long time. Thereby, each color to be switched by time can be displayed further brightly so that a bright color liquid crystal display can be realized.

3. Method for Manufacturing the Liquid Crystal Display

The liquid crystal display of this embodiment can be manufactured by a method commonly used as a method for manufacturing a liquid crystal display, and for example it can be manufactured by the method mentioned in the item of "C-2. Method for manufacturing the liquid crystal display of the third embodiment" to be described later.

C-2. Method for Manufacturing the Liquid Crystal Display of the Third Embodiment Next, a method for manufacturing the liquid crystal display of the third embodiment of the present invention will be explained. The method for manufacturing a liquid crystal display comprising a liquid crystal layer including a ferroelectric liquid crystal and a polymerized product of a polymerizable monomer sandwiched between two substrates, with an electrode and a photo alignment layer formed successively each on the counter surfaces of the substrates, wherein the respective constituent material for each the photo alignment layer is a photo-isomerization type material including a photo-isomerization-reactive compound to exhibit an anisotropy to the photo alignment layer by generating the photo-isomerization reaction, and the constituent materials for the photo alignment layers are different compositions with respect to the liquid crystal layer sandwiched therebetween, and the method comprising: a liquid crystal filling process of filling a liquid crystal layer forming composition including the ferroelectric liquid crystal and the polymerizable monomer between the substrates; a liquid crystal aligning process of having the ferroelectric liquid crystal in the chiral smectic C phase state; and a polymerization process of polymerizing the polymerizable monomer with the ferroelectric liquid crystal in the chiral smectic C phase state.

According to this embodiment, since a liquid crystal layer is formed by filling a liquid crystal layer forming composition including the above-mentioned ferroelectric liquid crystal and the above-mentioned polymerizable monomer between the above-mentioned substrates, and polymerizing the polymerizable monomer with the ferroelectric liquid crystal in the chiral smectic C phase state, a liquid crystal display capable of restraining generation of the alignment defects such as the zigzag defect, the hairpin defect and the double domains, and realizing the mono-stability operation mode using a ferroelectric liquid crystal can be manufactured.

Hereinafter, the method for manufacturing a liquid crystal display of this embodiment will be explained in detail.

1. Liquid Crystal Filling Process

First, the liquid crystal filling process in this embodiment will be explained. The liquid crystal filling process in this embodiment is a process of filling a liquid crystal layer forming composition including the above-mentioned ferroelectric liquid crystal and the above-mentioned polymerizable monomer between the two substrates each with an electrode and a photo alignment layer formed successively.

The above-mentioned two substrates used in this process are formed in general by forming an electrode layer on a substrate, and then forming a photo alignment layer on the electrode layer. Since the methods for forming the substrates are same as the method mentioned in the above-mentioned item of "C-1. Liquid crystal display of the third embodiment", explanation is omitted here.

Here, in this process, since the method for filling the liquid crystal layer forming composition is same as that mentioned in the above-mentioned item of "A-2. Method for manufacturing the liquid crystal display of the first embodiment", explanation is omitted here.

The liquid crystal layer forming composition used in this process includes a ferroelectric liquid crystal and a polymerizable monomer. Since the ferroelectric liquid crystal and the polymerizable monomer used for the above-mentioned liquid crystal layer forming composition are same as those mentioned in the above-mentioned item of "C-1. Liquid crystal display of the third embodiment 1. Configuration of the liquid crystal display", explanation is omitted here.

The amount of the above-mentioned polymerizable monomer included in the above-mentioned liquid crystal layer forming composition can be determined optionally according to the amount necessary for stabilizing the sequence of the above-mentioned ferroelectric liquid crystal after forming the liquid crystal layer. In particular, in this embodiment, it is preferably in a range of 0.5% by mass to 30% by mass in the above-mentioned liquid crystal layer forming composition, more preferably in a range of 1% by mass to 20% by mass, and particularly preferably in a range of 1% by mass to 10% by mass. In the case the content of the polymerizable monomer is more than the above-mentioned range, due to increase of the driving voltage of the ferroelectric liquid crystal after formation of the liquid crystal layer, the performance of the liquid crystal display to be manufactured by this embodiment may be deteriorated. Moreover, in the case it is less than the above-mentioned range, due to the insufficiency of the sequence stability of the ferroelectric liquid crystal, the heat resistance, the impact resistance and the like of the liquid crystal display of this embodiment may be lowered.

The above-mentioned liquid crystal layer forming composition may contain a photo polymerization initiating agent. Particularly in the case of using an ultraviolet curable resin monomer as the above-mentioned polymerizable monomer, it is preferable to contain a photo polymerization initiating agent. Moreover, in the case of using a photo polymerization initiating agent, it is preferable to use a photo polymerization initiating auxiliary agent in combination.

Here, since the photo polymerization initiating agent and the photo polymerization initiating auxiliary agent used in this embodiment are same as those mentioned in the above-mentioned item of "A-1. Liquid crystal display of the first embodiment", explanation is omitted here.

2. Liquid Crystal Aligning Process

Next, the liquid crystal aligning process in this embodiment will be explained. The liquid crystal aligning process in this embodiment is a process for having the ferroelectric liquid crystal in the liquid crystal layer forming composition filled between the above-mentioned substrates in the chiral smectic C phase.

Here, since the method for having the above-mentioned ferroelectric liquid crystal in the chiral smectic C phase in this process is same as the method mentioned in the above-mentioned item of "A-2. Method for manufacturing the liquid crystal display of the first embodiment", explanation is omitted here.

3. Polymerization Process

Next, the polymerization process in this embodiment will be explained. The polymerization process in this embodiment is a process of polymerizing the above-mentioned polymerizable monomer with the above-mentioned ferroelectric liquid crystal in the chiral smectic C phase state.

Here, since the method for polymerizing the above-mentioned polymerizable monomer in this process is same as the method mentioned in the above-mentioned item of "A-2. Method for manufacturing the liquid crystal display of the first embodiment", explanation is omitted here.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

The present invention will be explained specifically with reference to the examples.

1. Liquid Crystal Display and a Method for Manufacturing a Liquid Crystal Display of the First Embodiment In the examples and the comparative examples of this embodiment, a compound A represented by a below-mentioned formula I was used as the material for an alignment layer, and a compound B represented by a below-mentioned formula II or a compound C represented by a below-mentioned formula III was used as the liquid crystal material for the reactive liquid crystal layer unless other materials are mentioned.

Example 1-1

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an oven, it was exposed by 100 mJ/cm$^2$ with a polarized ultraviolet ray at 25° C. Furthermore, one of the substrates was spin coated with a 2% by weight solution of a compound B dissolved in a cyclopentanone for 30 seconds by a 4,000 rpm rotational frequency for lamination. After drying for 3 minutes at 55° C., it was exposed by 1,000 mJ/cm$^2$ with a non polarized ultraviolet ray at 55° C. Thereafter, with a 1.5 μm spacer dispersed on one of the glass substrates and a sealing material coated on the other substrate with a seal dispenser, the substrates were assembled in a direction parallel to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ/cm$^2$ with a non polarized ultraviolet ray so as to obtain a mono domain alignment.

Comparative Example 1-1

Two glass substrates with an ITO coating were spin coated with a 2% by weight solution of a compound A dissolved in a cyclopentanone for 30 seconds by a 4,000 rpm rotational frequency. Thereafter, a cell was assembled by the method shown above, a liquid crystal was injected and the non polarized ultraviolet ray irradiation was carried out thereto. The alignment defects such as the double domain, the zigzag

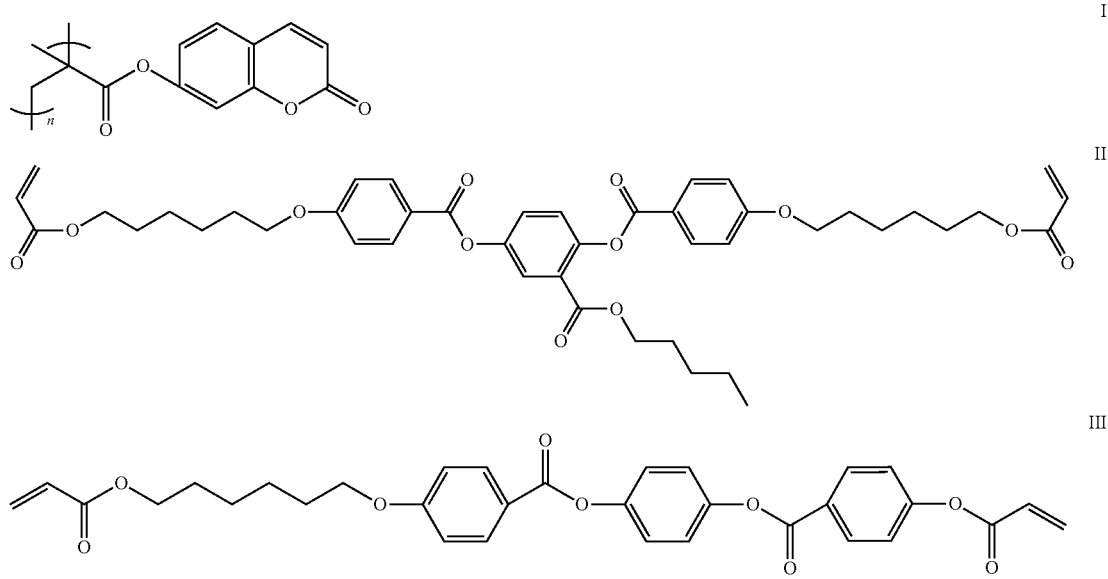

defect and the hairpin defect were generated without obtaining a mono-domain alignment.

Comparative Example 1-2

Two glass substrates with an ITO coating were spin coated with a 2% by weight solution of a compound A dissolved in a cyclopentanone for 30 seconds by a 4,000 rpm rotational frequency. Furthermore, both of the substrates were spin coated with a 2% by weight solution of a compound B dissolved in a cyclopentanone for 30 seconds by a 4,000 rpm rotational frequency for lamination. After drying for 3 minutes at 55° C., they were exposed by 1,000 mJ/cm$^2$ with a non polarized ultraviolet ray at 55° C. Thereafter, a cell was assembled by the method shown above, a liquid crystal was injected and the non polarized ultraviolet ray irradiation was carried out thereto. The alignment defects such as the double domain, the zigzag defect and the hairpin defect were generated without obtaining a mono-domain alignment.

Example 1-2

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an oven, it was exposed by 100 mJ/cm$^2$ with a polarized ultraviolet ray at 25° C. Furthermore, one of the substrates was spin coated with a 2% by weight solution of a compound C dissolved in a cyclopentanone for 30 seconds by a 4,000 rpm rotational frequency for lamination. After drying for 3 minutes at 55° C., it was exposed by 1,000 mJ/cm$^2$ with a non polarized ultraviolet ray at 55° C. Thereafter, with a 1.5 µm spacer dispersed on one of the glass substrates and a sealing material coated on the other substrate with a seal dispenser, the substrates were assembled in a direction parallel to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ/cm$^2$ with a non polarized ultraviolet ray so as to obtain a mono domain alignment.

Comparative Example 1-3

Two glass substrates with an ITO coating were spin coated with a 2% by weight solution of a compound A dissolved in a cyclopentanone for 30 seconds by a 4,000 rpm rotational frequency. Furthermore, both of the substrates were spin coated with a 2% by weight solution of a compound C dissolved in a cyclopentanone for 30 seconds by a 4,000 rpm rotational frequency for lamination. After drying for 3 minutes at 55° C., they were exposed by 1,000 mJ/cm$^2$ with a non polarized ultraviolet ray at 55° C. Thereafter, a cell was assembled by the method shown above, a liquid crystal was injected and the non polarized ultraviolet ray irradiation was carried out thereto. The alignment defects such as the double domains, the zigzag defect and the hairpin defect were generated without obtaining a mono-domain alignment.

Example 1-3

Two glass substrates with an ITO coating were spin coated with polyimide "RN1199" manufactured by NISSAN CHEMICAL INDUSTRIES, LTD. used as an alignment layer material for 30 seconds by a 4,000 rpm rotational frequency. After drying for 10 minutes at 180° C. in an oven, it was exposed by 100 J/cm$^2$ with a polarized ultraviolet ray at 25° C. Furthermore, one of the substrates was spin coated with a 2% by weight solution of a compound C dissolved in a cyclopentanone for 30 seconds by a 4,000 rpm rotational frequency for lamination. After drying for 3 minutes at 55° C., it was exposed by 1,000 mJ/cm$^2$ with a non polarized ultraviolet ray at 55° C. Thereafter, a cell was assembled by the method shown above, a liquid crystal was injected and the non polarized ultraviolet ray irradiation was carried out thereto so as to obtain a mono domain alignment without the alignment defects.

Comparative Example 1-4

Two glass substrates with an ITO coating were spin coated with polyimide "RN1199" manufactured by NISSAN CHEMICAL INDUSTRIES, LTD. used as an alignment layer material for 30 seconds by a 4,000 rpm rotational frequency. After drying for 10 minutes at 180° C. in an oven, it was exposed by 100 J/cm$^2$ with a polarized ultraviolet ray at 25° C. Thereafter, a cell was assembled by the method shown above, a liquid crystal was injected and the non polarized ultraviolet ray irradiation was carried out thereto. The alignment defects such as the double domains, the zigzag defect and the hairpin defect were generated without obtaining a mono-domain alignment.

Example 1-4

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an oven, it was exposed by 100 mJ/cm$^2$ with a polarized ultraviolet ray at 25° C. Furthermore, one of the substrates was spin coated with a 2% by weight solution of a compound B dissolved in a cyclopentanone for 30 seconds; and the other substrate was spin coated with 2% by weight solution of a compound C dissolved in a cyclopentanone by a 4,000 rpm rotational frequency for lamination. After drying for 3 minutes at 55° C., it was exposed by 1,000 mJ/cm$^2$ with a non polarized ultraviolet ray at 55° C. Thereafter, a cell was assembled by the method shown above, and a liquid crystal was injected thereto so as to obtain a mono domain alignment without the alignment defects.

Example 1-5

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an oven, it was exposed by 100 mJ/cm$^2$ with a polarized ultraviolet ray at 25° C. Furthermore, one of the substrates was spin coated with a 2% by mass solution of ADEKA CHIRACOL PLC-7209 (manufactured by ASAHI DENKA Co., Ltd.) dissolved in a cyclopentanone for 30 seconds by a 4,000 rpm rotational frequency for lamination. After drying for 3 minutes at 55° C., it was exposed by 1,000 mJ/cm$^2$ with a non polarized ultraviolet ray at 55° C. Thereafter, with a 1.5 µm spacer dispersed on one of the glass substrates and a sealing material coated on the other substrate with a seal dispenser, the substrates were assembled in a direction parallel to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ/cm² with a non polarized ultraviolet ray so as to obtain a mono domain alignment.

Example 1-6

In the same method as in the above-mentioned example 5 except that ADEKA CHIRACOL PLC-7209 (manufactured by ASAHI DENKA Co., Ltd.) was changed to ADEKA CHIRACOL PLC-7183 (manufactured by ASAHI DENKA Co., Ltd.), a liquid crystal display was produced. As a result, a mono domain alignment was obtained.

2. Liquid Crystal Display and a Method for Manufacturing a Liquid Crystal Display of the Second Embodiment In the examples and the comparative examples of this embodiment, compounds represented by below-mentioned formulae were used as the constituent material for an alignment layer.

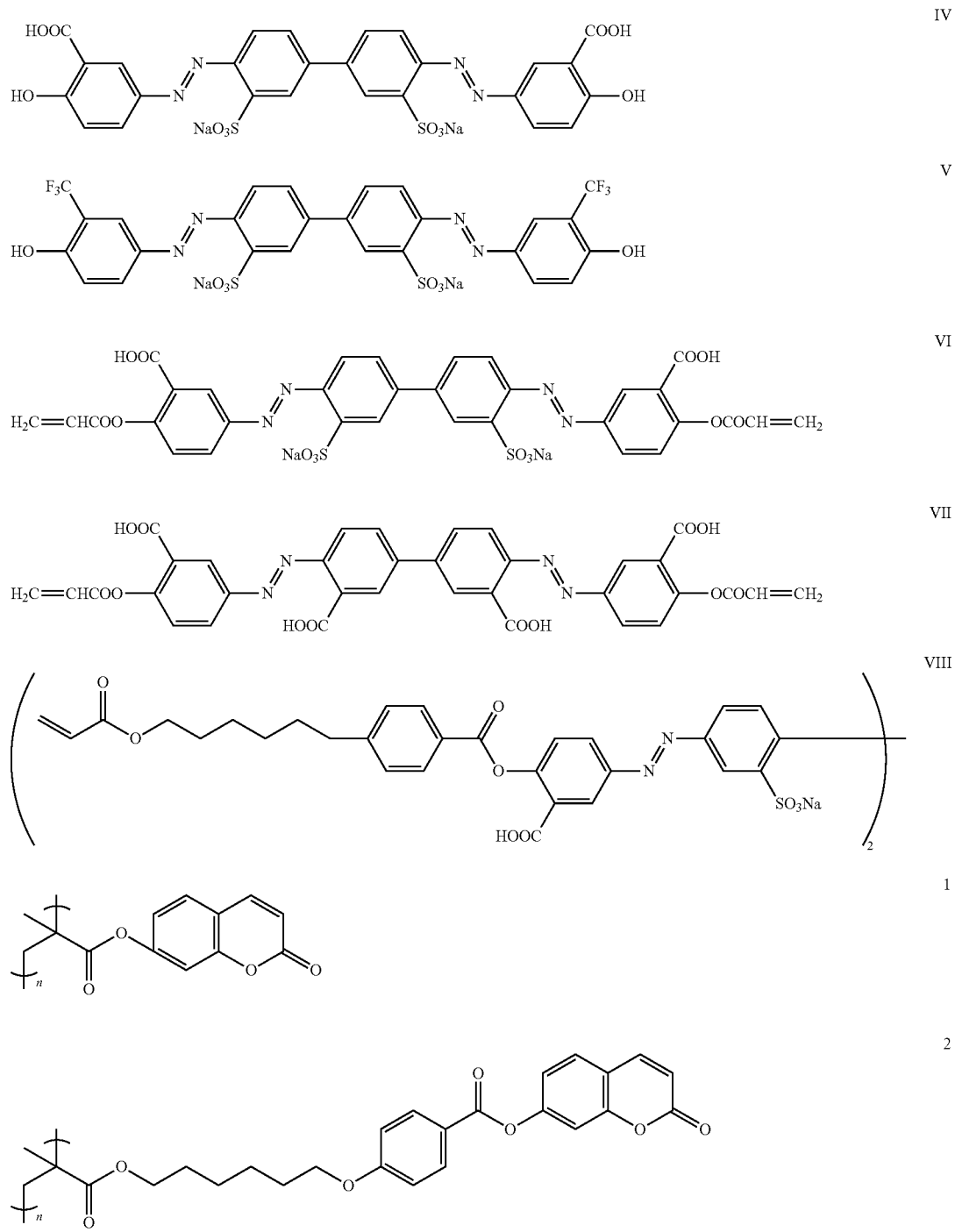

-continued

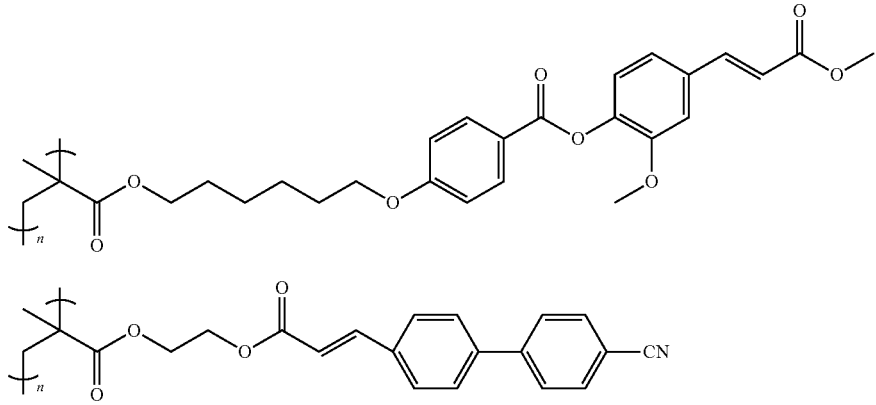

Example 2-1

Two glass substrates with an ITO coating were spin coated each with a 2% by mass solution of a compound 1 dissolved in a cyclopentanone and a 1% mass solution of a compound IV dissolved in a N-methyl-2-pyrrolidinone and a 2-n-butoxy ethanol (50:50 w %) by 4,000 rpm rotational frequency for 30 seconds.

Comparative Example 2-1

Two glass substrates with an ITO coating were spin coated with a 2% by mass solution of a compound 1 dissolved in a cyclopentanone by 4,000 rpm rotational frequency for 30 seconds. Furthermore, a cell was assembled by the method shown above except that the substrates were assembled in a state parallel to the polarized ultraviolet ray irradiation direction, and a liquid crystal was injected and exposed. The alignment defects such as the double domains, the zigzag defect and the hairpin defect were generated without obtaining a mono-domain alignment.

Comparative Example 2-2

Two glass substrates with an ITO coating were spin coated with a 2% by mass solution of a compound 2 dissolved in a N-methyl-2-pyrrolidinone and a 2-n-butoxy ethanol (50:50 w %) by 4,000 rpm rotational frequency for 30 seconds. Furthermore, a cell was assembled by the method shown above except that the substrates were assembled in a state parallel to the polarized ultraviolet ray irradiation direction, and a liquid crystal was injected and exposed. The alignment defects such as the double domains, the zigzag defect and the hairpin defect were generated without obtaining a mono-domain alignment.

Example 2-2

Two glass substrates with an ITO coating were spin coated each with a 2% by mass solution of a compound 2 dissolved in a cyclopentanone and a 1% by mass solution of a compound IV dissolved in a N-methyl-2-pyrrolidinone and a 2-n-butoxyethanol (50:50 w %) by 4,000 rpm rotational frequency for 30 seconds. The substrate spin coated with the solution of the compound 2 was dried at 180° C. for 10 minutes in an oven, and then it was exposed with a polarized ultraviolet ray at 25° C. by 100 mJ/cm². The substrate spin coated with the solution of the compound IV was dried at 100° C. for 1 minute, and it was exposed with a polarized ultraviolet ray at 25° C. by 1,000 mJ/cm². With a 1.5 μm spacer dispersed on one of the glass substrates and a sealing material coated on the other substrate with a seal dispenser, the substrates were assembled in a direction perpendicular to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Example 2-3

Two glass substrates with an ITO coating were spin coated each with a 2% by mass solution of a compound 3 dissolved in a cyclopentanone and a 1% by mass solution of a compound IV dissolved in a N-methyl-2-pyrrolidinone and a 2-n-butoxyethanol (50:50 w %) by 4,000 rpm rotational frequency for 30 seconds. The substrate spin coated with the solution of the compound 3 was dried at 180° C. for 10 minutes in an oven, and then it was exposed with a polarized ultraviolet ray at 25° C. by 100 mJ/cm². The substrate spin coated with the solution of the compound IV was dried at 100° C. for 1 minute, and it was exposed with a polarized ultraviolet ray at 25° C. by 1,000 mJ/cm². With a 1.5 μm spacer dispersed on one of the glass substrates and a sealing material coated on the other substrate with a seal dispenser, the substrates were assembled in a direction perpendicular to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Example 2-4

Two glass substrates with an ITO coating were spin coated each with a 2% by mass solution of a compound 4 dissolved in a cyclopentanone and a 1% by mass solution of a compound IV dissolved in a N-methyl-2-pyrrolidinone and a 2-n-butoxyethanol (50:50 w %) by 4,000 rpm rotational frequency for 30 seconds. The substrate spin coated with the solution of the compound 4 was dried at 180° C. for 10 minutes in an oven, and then it was exposed with a polarized ultraviolet ray at 25° C. by 100 mJ/cm$^2$. The substrate spin coated with the solution of the compound IV was dried at 100° C. for 1 minute, and it was exposed with a polarized ultraviolet ray at 25° C. by 1,000 mJ/cm$^2$. With a 1.5 μm spacer dispersed on one of the glass substrates and a sealing material coated on the other substrate with a seal dispenser, the substrates were assembled in a direction perpendicular to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Example 2-5

Two glass substrates with an ITO coating were spin coated each with a 2% by mass solution of a compound 1 dissolved in a cyclopentanone and a 1% by mass solution of a compound V dissolved in a N-methyl-2-pyrrolidinone and a 2-n-butoxyethanol (50:50 w %) by 4,000 rpm rotational frequency for 30 seconds. The substrate spin coated with the solution of the compound 1 was dried at 180° C. for 10 minutes in an oven, and then it was exposed with a polarized ultraviolet ray at 25° C. by 100 mJ/cm$^2$. The substrate spin coated with the solution of the compound V was dried at 100° C. for 1 minute, and it was exposed with a polarized ultraviolet ray at 25° C. by 1,000 mJ/cm$^2$. With a 1.5 μm spacer dispersed on one of the glass substrates and a sealing material coated on the other substrate with a seal dispenser, the substrates were assembled in a direction perpendicular to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Example 2-6

Two glass substrates with an ITO coating were spin coated each with a 2% by mass solution of a compound 1 dissolved in a cyclopentanone and a 1% by mass solution of a compound VI dissolved in a N-methyl-2-pyrrolidinone and a 2-n-butoxyethanol (50:50 w %) by 4,000 rpm rotational frequency for 30 seconds. The substrate spin coated with the solution of the compound 1 was dried at 180° C. for 10 minutes in an oven, and then it was exposed with a polarized ultraviolet ray at 25° C. by 100 mJ/cm$^2$. The substrate spin coated with the solution of the compound VI was dried at 100° C. for 1 minute, and it was exposed with a polarized ultraviolet ray at 25° C. by 1,000 mJ/cm$^2$. With a 1.5 μm spacer dispersed on one of the glass substrates and a sealing material coated on the other substrate with a seal dispenser, the substrates were assembled in a direction perpendicular to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Example 2-7

Two glass substrates with an ITO coating were spin coated each with a 2% by mass solution of a compound 1 dissolved in a cyclopentanone and a 1% by mass solution of a compound VII dissolved in a N-methyl-2-pyrrolidinone and a 2-n-butoxy ethanol (50:50 w %) by 4,000 rpm rotational frequency for 30 seconds. The substrate spin coated with the solution of the compound 1 was dried at 180° C. for 10 minutes in an oven, and then it was exposed with a polarized ultraviolet ray at 25° C. by 100 mJ/cm$^2$. The substrate spin coated with the solution of the compound VII was dried at 100° C. for 1 minute, and it was exposed with a polarized ultraviolet ray at 25° C. by 1,000 mJ/cm$^2$. With a 1.5 μm spacer dispersed on one of the glass substrates and a sealing material coated on the other substrate with a seal dispenser, the substrates were assembled in a direction perpendicular to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Example 2-8

Two glass substrates with an ITO coating were spin coated each with a 2% by mass solution of a compound 1 dissolved in a cyclopentanone and a 1% by mass solution of a compound VIII dissolved in a N-methyl-2-pyrrolidinone and a 2-n-butoxy ethanol (50:50 w %) by 4,000 rpm rotational frequency for 30 seconds. The substrate spin coated with the solution of the compound 1 was dried at 180° C. for 10 minutes in an oven, and then it was exposed with a polarized ultraviolet ray at 25° C. by 100 mJ/cm$^2$. The substrate spin coated with the solution of the compound VIII was dried at 100° C. for 1 minute, and it was exposed with a polarized ultraviolet ray at 25° C. by 1,000 mJ/cm². With a 1.5 μm spacer dispersed on one of the glass substrates and a sealing material coated on the other substrate with a seal dispenser, the substrates were assembled in a direction perpendicular to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

3. Liquid Crystal Display and a Method for Manufacturing a Liquid Crystal Display of the Third Embodiment In the examples and the comparative examples of this embodiment, compounds represented by the above-mentioned formulae IV to VIII were used as the material for an alignment layer.

Example 3-1

Two glass substrates with an ITO coating were spin coated each with a 1% by mass solution of a compound IV dissolved in a N-methyl-2-pyrrolidinone and a 2-n-butoxy ethanol (50:50 w %), and a 1% by mass solution of a compound VIII dissolved in a N-methyl-2-pyrrolidinone and a 2-n-butoxy ethanol (50:50 w %) by 4,000 rpm rotational frequency for 30 seconds. The substrates were dried at 100° C. for 1 minute in an oven, and then exposed with a polarized ultraviolet ray at 25° C. by 1,000 mJ/cm². Furthermore, the substrate spin coated with the solution of the compound VIII was heated at 150° C. for 1 hour in a nitrogen atmosphere after the exposure. With a 1.5 μm spacer dispersed on one of the glass substrates and a sealing material coated on the other substrate with a seal dispenser, the substrates were assembled in a state parallel to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Comparative Example 3-1

Two glass substrates with an ITO coating were spin coated with a 1% by mass solution of a compound IV dissolved in a N-methyl-2-pyrrolidinone and a 2-n-butoxy ethanol (50:50 w %) by 4,000 rpm rotational frequency for 30 seconds. Thereafter, the substrates were dried in the same manner as in the example 1, and the exposing process was applied thereto. Furthermore, a cell was assembled in the method shown above, a liquid crystal was injected and exposed. The alignment defects such as the double domains, the zigzag defect and the hairpin defect were generated without obtaining the mono domain phase.

Comparative Example 3-2

Two glass substrates with an ITO coating were spin coated with a 1% by mass solution of a compound VIII dissolved in a N-methyl-2-pyrrolidinone and a 2-n-butoxy ethanol (50:50 w %) by 4,000 rpm rotational frequency for 30 seconds. Thereafter, the substrates were dried in the same manner as in the example 1, and an exposing process was applied thereto. After the exposure, they were heated at 150° C. for 1 hour in a nitrogen atmosphere. Furthermore, a cell was assembled in the method shown above, a liquid crystal was injected and exposed. The alignment defects such as the double domains, the zigzag defect and the hair pin defect were generated without obtaining the mono domain phase.

Example 3-2

Two glass substrates with an ITO coating were spin coated each with a 1% by mass solution of a compound V dissolved in a N-methyl-2-pyrrolidinone and a 2-n-butoxy ethanol (50:50 w %), and a 1% by mass solution of a compound VIII dissolved in a N-methyl-2-pyrrolidinone and a 2-n-butoxy ethanol (50:50 w %) by 4,000 rpm rotational frequency for 30 seconds. The substrates were dried at 100° C. for 1 minute in an oven, and then exposed with a polarized ultraviolet ray at 25° C. by 1,000 mJ/cm². Furthermore, the substrate spin coated with the solution of the compound VIII was heated at 150° C. for 1 hour in a nitrogen atmosphere after the exposure. With a 1.5 μm spacer dispersed on one of the glass substrates and a sealing material coated on the other substrate with a seal dispenser, the substrates were assembled in a state parallel to the polarized ultraviolet ray irradiation direction, and thermally pressed. As the liquid crystal, "R2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Example 3-3

Two glass substrates with an ITO coating were spin coated each with a 1% by mass solution of a compound VI dissolved in a N-methyl-2-pyrrolidinone and a 2-n-butoxy ethanol (50:50 w %), and a 1% by mass solution of a compound VIII dissolved in a N-methyl-2-pyrrolidinone and a 2-n-butoxy ethanol (50:50 w %) by 4,000 rpm rotational frequency for 30 seconds. The substrates were dried at 100° C. for 1 minute in an oven, and then exposed with a polarized ultraviolet ray at 25° C. by 1,000 mJ/cm². Furthermore, the substrate was heated at 150° C. for 1 hour in a nitrogen atmosphere after the exposure. With a 1.5 μm spacer dispersed on one of the glass substrates and a sealing material coated on the other substrate with a seal dispenser, the substrates were assembled in a state parallel to the polarized ultraviolet ray irradiation direction, and thermally pressed. As the liquid crystal, "2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Example 3-4

Two glass substrates with an ITO coating were spin coated each with a 1% by mass solution of a compound VII dissolved in a N-methyl-2-pyrrolidinone and a 2-n-butoxy ethanol (50:50 w %), and a 1% by mass solution of a compound VIII dissolved in a N-methyl-2-pyrrolidinone and a 2-n-butoxy ethanol (50:50 w %) by 4,000 rpm rotational frequency for 30 seconds. The substrates were dried at 100° C. for 1 minute in an oven, and then exposed with a polarized ultraviolet ray at 25° C. by 1,000 mJ/cm$^2$. Furthermore, the substrate was heated at 150° C. for 1 hour in a nitrogen atmosphere after the exposure. With a 1.5 μm spacer dispersed on one of the glass substrates and a sealing material coated on the other substrate with a seal dispenser, the substrates were assembled in a state parallel to the polarized ultraviolet ray irradiation direction, and thermally pressed. As the liquid crystal, "2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Example 3-5

Two glass substrates with an ITO coating were spin coated each with a 1% by mass solution of a compound IV dissolved in a N-methyl-2-pyrrolidinone and a 2-n-butoxy ethanol (50:50 w %), and a 1% by mass solution of a compound VIII dissolved in a N-methyl-2-pyrrolidinone and a 2-n-butoxy ethanol (50:50 w %) by 4,000 rpm rotational frequency for 30 seconds. The substrates were dried at 100° C. for 1 minute in an oven, and then exposed with a polarized ultraviolet ray at 25° C. by 1,000 mJ/cm$^2$. Furthermore, the substrate spin coated with the solution of the compound VIII was heated at 150° C. for 1 hour in a nitrogen atmosphere after the exposure. With a 1.5 μm spacer dispersed on one of the glass substrates and a sealing material coated on the other substrate with a seal dispenser, the substrates were assembled in a state parallel to the polarized ultraviolet ray irradiation direction, and thermally pressed. As the liquid crystal, "2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

Example 3-6

Two glass substrates with an ITO coating were spin coated each with a 1% by mass solution of a compound IV dissolved in a N-methyl-2-pyrrolidinone and a 2-n-butoxy ethanol (50:50 w %), and a 1% by mass solution of a compound VIII dissolved in a N-methyl-2-pyrrolidinone and a 2-n-butoxy ethanol (50:50 w %) by 4,000 rpm rotational frequency for 30 seconds. The substrates were dried at 100° C. for 1 minute in an oven, and then exposed with a polarized ultraviolet ray at 25° C. by 1,000 mJ/cm$^2$. Furthermore, the substrate spin coated with the solution of the compound VIII was heated at 150° C. for 1 hour in a nitrogen atmosphere after the exposure. With a 1.5 μm spacer dispersed on one of the glass substrates and a sealing material coated on the other substrate with a seal dispenser, the substrates were assembled in a state parallel to the polarized ultraviolet ray irradiation direction, and thermally pressed. As the liquid crystal, "2301" (manufactured by AZ Electronic Materials) with UCL001 (manufactured by DAINIPPON INK AND CHEMICALS, Inc.) added by 5% by mass was used. With the liquid crystal adhered on the injection opening upper part, injection was carried out at a temperature higher than the nematic phase-isotropic phase transition temperature by 10° C. to 20° C. with an oven, then it was returned slowly to the room temperature, and it was exposed by 1,000 mJ with a non polarized ultraviolet ray so as to obtain a mono domain alignment without the alignment defects.

What is claimed is:

1. A liquid crystal display comprising:
   a reactive liquid crystal side substrate having a first substrate, an electrode layer formed on the first substrate, a first alignment layer formed on the electrode layer, and a reactive liquid crystal layer with a reactive liquid crystal fixed, and formed on the first alignment layer; and
   a counter substrate having a second substrate, an electrode layer formed on the second substrate, and a second alignment layer formed on the electrode layer, wherein the reactive liquid crystal layer of the reactive liquid crystal side substrate and the second alignment layer of the counter substrate are disposed to face each other such that a liquid crystal layer including a ferroelectric liquid crystal and a polymerized product of a polymerizable monomer is sandwiched between the reactive liquid crystal side substrate and the counter substrate.

2. The liquid crystal display according to claim 1, wherein a second reactive liquid crystal layer with a reactive liquid crystal fixed on the second alignment layer is formed, and the reactive liquid crystal comprising the reactive liquid crystal layer and the reactive liquid crystal comprising the second reactive liquid crystal layer are different compositions.

3. The liquid crystal display according to claim 1, wherein the polymerizable monomer is an ultraviolet curable liquid crystal monomer.

4. The liquid crystal display according to claim 1, wherein the reactive liquid crystal shows a nematic phase.

5. The liquid crystal display according to claim 1, wherein the reactive liquid crystal has a polymerizable liquid crystal monomer.

6. The liquid crystal display according to claim 5, wherein the polymerizable liquid crystal monomer is a monoacrylate monomer or a diacrylate monomer.

7. The liquid crystal display according to claim 6, wherein the diacrylate monomer is a compound represented by a below-mentioned formula (1):

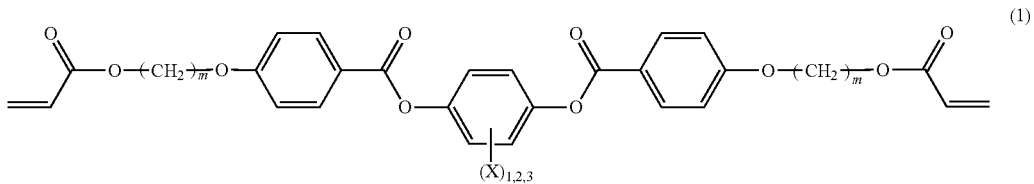

in which, X in the formula is a hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro; and m is an integer in a range of 2 to 20.

8. The liquid crystal display according to claim 6, wherein the diacrylate monomer is a compound represented by a below-mentioned formula (2):

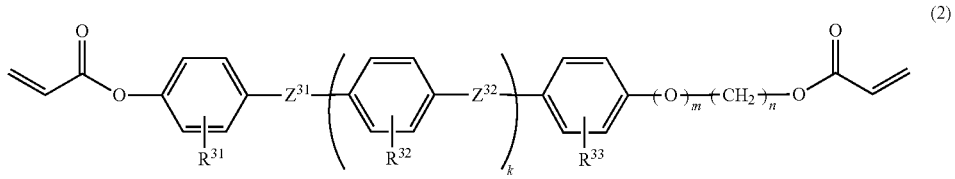

in which, $Z^{31}$ and $Z^{32}$ in the formula are each independently directly bonded —COO—, —OCO—, —O—, —CH$_2$CH$_2$—, —CH=CH—, —OCH$_2$—, —CH$_2$O—, —CH$_2$CH$_2$COO— or —OCOCH$_2$CH$_2$—; $R^{31}$, $R^{32}$ and $R^{33}$ are each independently a hydrogen or an alkyl having 1 to 5 carbon atoms; k and m are each 0 or 1; and n is an integer in a range of 2 to 8.

9. The liquid crystal display according to claim 1, wherein the first alignment layer or the second alignment layer is a photo alignment layer.

10. The liquid crystal display according to claim 4, wherein the first alignment layer or the second alignment layer is a photo alignment layer.

11. The liquid crystal display according to claim 5, wherein the first alignment layer or the second alignment layer is a photo alignment layer.

12. The liquid crystal display according to claim 6, wherein the first alignment layer or the second alignment layer is a photo alignment layer.

13. The liquid crystal display according to claim 7, wherein the first alignment layer or the second alignment layer is a photo alignment layer.

14. The liquid crystal display according to claim 8, wherein the first alignment layer or the second alignment layer is a photo alignment layer.

15. The liquid crystal display according to claim 9, wherein a constituent material for the photo alignment layer is a photoreactive type material to exhibit an anisotropy to the photo alignment layer by generating a photoreaction, or a photo-isomerization type material including a photo-isomerization-reactive compound to exhibit an anisotropy to the photo alignment layer by generating a photo-isomerization reaction.

16. The liquid crystal display according to claim 1, wherein the ferroelectric liquid crystal shows mono-stability.

17. The liquid crystal display according to claim 1, wherein the liquid crystal display is driven by an active matrix system using a thin film transistor.

18. The liquid crystal display according to claim 1, wherein the liquid crystal display is displayed by a field sequential color system.

19. A method for manufacturing a liquid crystal display comprising:

a reactive liquid crystal side substrate having a first substrate, an electrode layer formed on the first substrate, a first alignment layer formed on the electrode layer, and a reactive liquid crystal layer with a reactive liquid crystal fixed and formed on the first alignment layer; and a counter substrate having a second substrate, an electrode layer formed on the second substrate, and a second alignment layer formed on the electrode layer, wherein the reactive liquid crystal layer of the reactive liquid crystal side substrate and the second alignment layer of the counter substrate are disposed to face each other such that a liquid crystal layer including a ferroelectric liquid crystal and a polymerized product of a polymerizable monomer is sandwiched between the reactive liquid crystal side substrate and the counter substrate, and the method comprising:

a liquid crystal filling process of filling a liquid crystal layer forming composition including the ferroelectric liquid crystal and the polymerizable monomer between the reactive liquid crystal side substrate and the counter substrate;

a liquid crystal aligning process of having the ferroelectric liquid crystal in a chiral smectic C phase state; and a polymerization process of polymerizing the polymerizable monomer with the ferroelectric liquid crystal in the chiral smectic C phase state.

20. A liquid crystal display comprising:

a first photo alignment treatment substrate having a first substrate, an electrode layer formed on the first substrate, and a first photo alignment layer formed on the electrode layer; and a second photo alignment treatment substrate having a second substrate, an electrode layer formed on the second substrate, and a second photo alignment layer formed on the electrode layer, wherein the first photo alignment layer and the second photo alignment layer are disposed to face each other such that a liquid crystal layer including a ferroelectric liquid crystal and a polymerized product of a polymerizable monomer is sandwiched between the first photo alignment layer and the second photo alignment layer, and constituent materials for the first photo alignment layer and the second photo alignment layer are different compositions.

21. The liquid crystal display according to claim 20, wherein the polymerizable monomer is an ultraviolet curable liquid crystal monomer.

22. The liquid crystal display according to claim 20, wherein the respective constituent material for the first photo alignment layer and the second photo alignment layer is a photoreactive type material to exhibit an anisotropy to the first photo alignment layer and the second photo alignment layer by generating a photoreaction.

23. The liquid crystal display according to claim 20, wherein a constituent material for the first photo alignment layer is a photoreactive type material to exhibit an anisotropy to the first photo alignment layer by generating a photoreaction, and a constituent material for the second photo alignment layer is a photo-isomerization type material including a photo-isomerization-reactive compound to exhibit an anisotropy to the second photo alignment layer by generating a photo-isomerization reaction.

24. The liquid crystal display according to claim 23, wherein the photo-isomerization-reactive compound shows dichroism with different absorptions depending on a polarization direction, and generates the photo-isomerization reaction by a light irradiation.

25. The liquid crystal display according to claim 23, wherein the photo-isomerization reaction is a cis-trans isomerization reaction.

26. The liquid crystal display according to claim 23, wherein the photo-isomerization-reactive compound has an azobenzene skeleton in a molecule.

27. The liquid crystal display according to claim 23, wherein the photo-isomerization-reactive compound is a monomolecular compound having an azobenzene skeleton represented by a below-mentioned formula as a side chain:

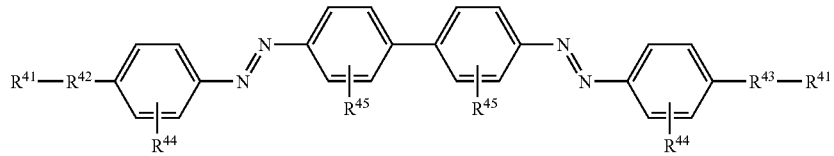

in which, each $R^{41}$ independently is a hydroxyl group; $R^{42}$ is a linking group represented by $-(A^{41}-B^{41}-A^{41})_m-(D^{41})_n-$; and $R^{43}$ is a linking group represented by $(D^{41})_n-(A^{41}-B^{41}-A^{41})_m-$, wherein $A^{41}$ is a divalent hydrocarbon group, $B^{41}$ is —O—, —COO—, —OCO—, —CONH—, —NHCO—, —NHCOO— or —OCONH—, and m is an integer from 0 to 3, $D^{41}$ is a divalent hydrocarbon group when m is 0, and $D^{41}$ is —O—, —COO—, —OCO—, —CONH—, —NHCO—, —NHCOO— or —OCONH— when m is an integer from 1 to 3, and n is 0 or 1; each $R^{44}$ is independently a halogen atom, a carboxy group, a methyl halide group, a methoxy halide group, a cyano group, a nitro group, a methoxy group or a methoxy carbonyl group provided that the carboxy group may form a salt with an alkaline metal; and each $R^{45}$ is independently a carboxy group, a sulfo group, a nitro group, an amino group or a hydroxyl group provided that the carboxy group or the sulfo group may form a salt with an alkaline metal.

28. The liquid crystal display according to claim 23, wherein the photo-isomerization-reactive compound is a polymerizable monomer having an azobenzene skeleton.

29. The liquid crystal display according to claim 28, wherein the photo-isomerization-reactive compound is the polymerizable monomer having the azobenzene skeleton represented by a below-mentioned formula as a side chain:

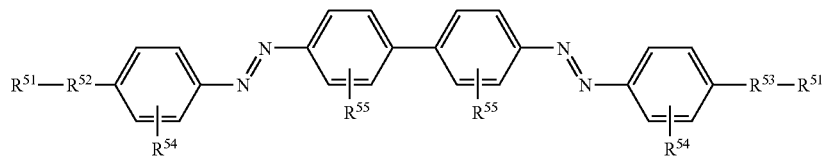

in which, each $R^{51}$ independently is a (meth)acryloyloxy group, a (meth)acrylamide group, a vinyloxy group, a vinyloxy carbonyl group, a vinylimino carbonyl group, a vinylimino carbonyloxy group, a vinyl group, an isopropenyloxy group, an isopropenyloxy carbonyl group, an isopropenylimino carbonyl group, an isopropenylimino carbonyloxy group, an isopropenyl group or an epoxy group; $R^{52}$ is a linking group represented by $-(A^{51}-B^{51}-A^{51})_m-(D^{51})_n-$; $R^{53}$ is a linking group represented by $(D^{51})_n-(A^{51}-B^{51}-A^{51})_m-$, wherein $A^{51}$ is a divalent hydrocarbon group, $B^{51}$ is —O—, —COO—, —OCO—, —CONH—, —NHCO—, —NHCOO— or —OCONH—, and m is an integer from 0 to 3, $D^{51}$ is a divalent hydrocarbon group when m is 0, and $D^{51}$ is —O—, —COO—, —COO—, —OCO—, —CONH—, —NHCO—, —NHCOO— or —OCONH— when m is an integer from 1 to 3, and n is 0 or 1; each $R^{54}$ is independently a halogen atom, a carboxy group, a methyl halide group, a methoxy halide group, a cyano group, a nitro group, a methoxy group or a methoxy carbonyl group provided that the carboxy group may form a salt with an alkaline metal; and each $R^{55}$ is independently a carboxy group, a sulfo group, a nitro group, an amino group or a hydroxyl group provided that the carboxy group or the sulfo group may form a salt with an alkaline metal.

30. The liquid crystal display according to claim 22, wherein the photoreaction is a photo-dimerization reaction or a photo-decomposition reaction.

31. The liquid crystal display according to claim 30, wherein the photoreactive type material to exhibit the anisotropy to the photo alignment layer by generating the photo-dimerization reaction has a radically polymerizable functional group, and includes a photo-dimerization-reactive compound showing dichroism with different absorptions depending on a polarization direction.

32. The liquid crystal display according to claim 31, wherein the photo-dimerization-reactive compound is a dimerization-reactive polymer containing, as its side chain, any one of a cinnamic acid ester, a coumalin, and a quinoline.

33. The liquid crystal display according to claim 31, wherein the photo-dimerization-reactive compound is at least one selected from the dimerization-reactive polymers represented by below-mentioned formulae:

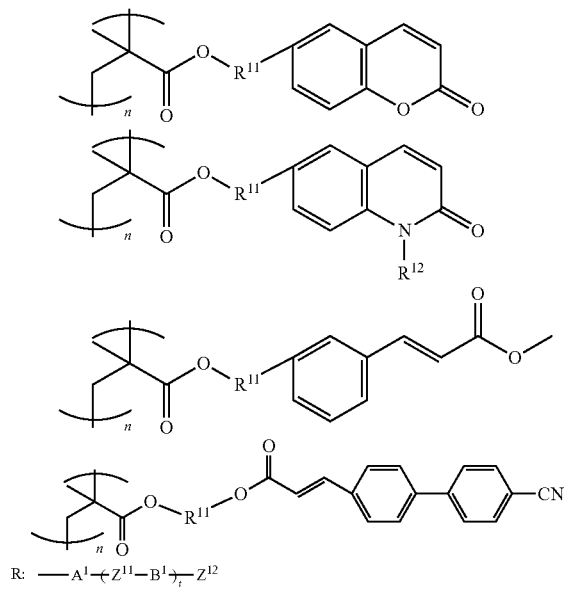

wherein $A^1$ and $B^1$: a 1,4-phenylene, a covalent single bond, a pyridine-2,5-diyl, a pyrimidine-2,5-diyl, a 1,4-cyclohexylene or a 1,3-dioxane-2,5-diyl;

$Z^{11}$ and $Z^{12}$: —$CH_2$—$CH_2$—, —COO—, —OOC—, or a covalent single bond;

t: an integer of 0 to 4;

$R^{12}$: a lower alkyl; and n: an integer of 4 to 30,000.

34. The liquid crystal display according to claim 20, wherein the ferroelectric liquid crystal shows mono-stability.

35. The liquid crystal display according to claim 20, wherein the liquid crystal display is driven by an active matrix system using a thin film transistor.

36. The liquid crystal display according to claim 20, wherein the liquid crystal display is displayed by a field sequential color system.

37. A method for manufacturing a liquid crystal display comprising:
a first photo alignment treatment substrate having a first substrate, an electrode layer formed on the first substrate, and a first photo alignment layer formed on the electrode layer; and
a second photo alignment treatment substrate having a second substrate, an electrode layer formed on the second substrate, and a second photo alignment layer formed on the electrode layer,
wherein the first photo alignment layer and the second photo alignment layer are disposed to face each other such that a liquid crystal layer including a ferroelectric liquid crystal and a polymerized product of a polymerizable monomer is sandwiched between the first photo alignment layer and the second photo alignment layer, and
wherein constituent materials for the first photo alignment layer and the second photo alignment layer are different compositions, and
the method comprising:
a liquid crystal filling process of filling a liquid crystal layer forming composition including the ferroelectric liquid crystal and the polymerizable monomer between the first photo alignment treatment substrate and the second photo alignment treatment substrate;
a liquid crystal aligning process of having the ferroelectric liquid crystal in a chiral smectic C phase state; and
a polymerization process of polymerizing the polymerizable monomer with the ferroelectric liquid crystal in the chiral smectic C phase state.

38. A liquid crystal display comprising a liquid crystal layer including a ferroelectric liquid crystal and a polymerized product of a polymerizable monomer sandwiched between two substrates, with an electrode and a photo alignment layer formed successively each on counter surfaces of the substrates,
wherein a respective constituent material for each of the photo alignment layer is a photo-isomerization type material including a photo-isomerization-reactive compound to exhibit an anisotropy to the photo alignment layer by generating a photo-isomerization reaction, and the constituent materials for the photo alignment layers are different compositions with respect to the liquid crystal layer sandwiched therebetween.

39. The liquid crystal display according to claim 38, wherein the photo-isomerization-reactive compound shows dichroism with different absorptions depending on a polarization direction, and generates the photo-isomerization reaction by a light irradiation.

40. The liquid crystal display according to claim 38, wherein the photo-isomerization reaction is a cis-trans isomerization reaction.

41. The liquid crystal display according to claim 38, wherein the photo-isomerization-reactive compound has an azobenzene skeleton in a molecule.

42. The liquid crystal display according to claim 38, wherein the photo-isomerization-reactive compound is a polymerizable monomer having an azobenzene skeleton as a side chain.

43. The liquid crystal display according to claim 38, wherein the polymerizable monomer comprising the polymerized product of the polymerizable monomer is an ultraviolet curable liquid crystal monomer.

44. The liquid crystal display according to claim 38, wherein the ferroelectric liquid crystal shows mono-stability.

45. The liquid crystal display according to claim 38, wherein the ferroelectric liquid crystal does not have a smectic A phase in its phase sequence.

46. The liquid crystal display according to claim 38, wherein the liquid crystal display is driven by an active matrix system using a thin film transistor.

47. The liquid crystal display according to claim 38, wherein the liquid crystal display is displayed by a field sequential color system.

48. A method for manufacturing a liquid crystal display comprising a liquid crystal layer including a ferroelectric liquid crystal and a polymerized product of a polymerizable monomer sandwiched between two substrates, with an electrode and a photo alignment layer formed successively each on counter surfaces of the substrates, wherein a respective constituent material for each of the photo alignment layer is a photo-isomerization type material including a photo-isomerization-reactive compound to exhibit an anisotropy to the photo alignment layer by generating a photo-isomerization reaction, and the constituent materials for the photo alignment layers are different compositions with respect to the liquid crystal layer sandwiched therebetween, and the method comprising:

a liquid crystal filling process of filling a liquid crystal layer forming composition including the ferroelectric liquid crystal and the polymerizable monomer between the substrates;

a liquid crystal aligning process of having the ferroelectric liquid crystal in a chiral smectic C phase state; and a polymerization process of polymerizing the polymerizable monomer with the ferroelectric liquid crystal in the chiral smectic C phase state.

* * * * *